United States Patent
Iguchi et al.

(10) Patent No.: US 12,381,926 B2
(45) Date of Patent: **\*Aug. 5, 2025**

(54) TRANSMISSION METHOD, RECEPTION METHOD, TRANSMISSION APPARATUS, AND RECEPTION APPARATUS

(71) Applicant: Panasonic Intellectual Property Management Co., Ltd., Osaka (JP)

(72) Inventors: Noritaka Iguchi, Osaka (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,504

(22) Filed: Mar. 20, 2024

(65) Prior Publication Data

US 2024/0223633 A1 Jul. 4, 2024

Related U.S. Application Data

(63) Continuation of application No. 17/241,356, filed on Apr. 27, 2021, now Pat. No. 11,962,632, which is a
(Continued)

(30) Foreign Application Priority Data

Nov. 10, 2015 (JP) .................. 2015-220646

(51) Int. Cl.
*H04L 65/611* (2022.01)
*H04B 7/185* (2006.01)
(Continued)

(52) U.S. Cl.
CPC ........ *H04L 65/611* (2022.05); *H04B 7/18526* (2013.01); *H04L 65/70* (2022.05);
(Continued)

(58) Field of Classification Search
CPC . H04L 65/4076; H04L 65/607; H04N 21/434; H04N 21/4305
See application file for complete search history.

(56) References Cited

U.S. PATENT DOCUMENTS 7,054,954 B2   5/2006   Kalliokulju
9,992,550 B2   6/2018   Iguchi
(Continued)

FOREIGN PATENT DOCUMENTS

EP   3 048 793   7/2016
EP   3 068 138   9/2016
(Continued)

OTHER PUBLICATIONS

International Search Report issued Mar. 8, 2016 in corresponding International Application No. PCT/JP2015/005957.
(Continued)

*Primary Examiner* — Charles C Jiang
*Assistant Examiner* — Ryan C Kavleski
(74) *Attorney, Agent, or Firm* — Wenderoth, Lind & Ponack, L.L.P.

(57) ABSTRACT

A transmission method includes: generating a frame for transfer which stores one or more first internet protocol (IP) packets storing content, and one or more second IP packets each including reference clock information which indicates a time for a playback of the content; and transmitting the generated frame through broadcasting. In the generating, header compression is performed on the one or more first IP packets and the header compression is not performed on the one or more second IP packets.

4 Claims, 49 Drawing Sheets

Related U.S. Application Data continuation of application No. 15/618,803, filed on Jun. 9, 2017, now Pat. No. 11,019,118, which is a continuation of application No. PCT/JP2015/005957, filed on Dec. 1, 2015.

(60) Provisional application No. 62/090,003, filed on Dec. 10, 2014.

(51) Int. Cl.
*H04L 65/70* (2022.01)
*H04L 69/22* (2022.01)
*H04N 21/236* (2011.01)
*H04N 21/242* (2011.01)
*H04N 21/43* (2011.01)
*H04N 21/434* (2011.01)
*H04N 21/61* (2011.01)
*H04N 21/643* (2011.01)

(52) U.S. Cl.
CPC .......... *H04L 69/22* (2013.01); *H04N 21/236* (2013.01); *H04N 21/242* (2013.01); *H04N 21/4305* (2013.01); *H04N 21/434* (2013.01); *H04N 21/6193* (2013.01); *H04N 21/64322* (2013.01)

(56) References Cited

U.S. PATENT DOCUMENTS

| | | | |
|---|---|---|---|
| 2004/0221132 | A1 | 11/2004 | Torkelsson |
| 2005/0114489 | A1 | 5/2005 | Yonge |
| 2007/0268874 | A1 | 11/2007 | Vare |
| 2014/0201798 | A1* | 7/2014 | Kazui ............. H04N 21/43072 725/116 |
| 2016/0044532 | A1 | 2/2016 | Champel |
| 2016/0192028 | A1 | 6/2016 | Iguchi |
| 2016/0359803 | A1 | 12/2016 | Kwon |
| 2017/0171070 | A1 | 6/2017 | Kwon |
| 2017/0207869 | A1 | 7/2017 | Iguchi |
| 2019/0268397 | A1 | 8/2019 | Oh |

FOREIGN PATENT DOCUMENTS

| | | |
|---|---|---|
| EP | 3 073 745 | 9/2016 |
| JP | 2012-182855 | 9/2012 |

OTHER PUBLICATIONS

Information technology—High efficiency coding and media delivery in heterogeneous environments—Part 1: MPEG media transport (MMT), ISO/IEC DIS 23008-1, Apr. 2013.
Chapter 3: "Guideline for Time Information Transmission" in ARIB Standard ARIB STD-B44 (Ver. 2.0) "Transmission System for Advanced Wide Band Digital Satellite Broadcasting", Jul. 2014.
MMT-Based Media Transport Scheme In Digital Broadcasting Systems ARIB STD-B60 ver. 1.0, Association of Radio Industries and Businesses, Jul. 2014, pp. 4 to 8 (with English translation).
Aoki et al., "Performance Evaluation of Multiplexing Schemes for IP Packets in Digital Mulitmedia Broadcasting Systems", NHK Science and Technical Research Laboratories R&D Report, Nov. 15, 2010, No. 124, pp. 32 to 43 with English Abstract.
Extended European Search Report dated Aug. 23, 2021 in European Patent Application No. 21188131.3.
"Transmission System for Advanced Wide Band Digital Satellite Broadcasting Association of Radio Industries and Business", Jul. 31, 2014 (Jul. 31, 2014), XP055314241.

* cited by examiner

DATA TYPE: IPv4 PACKET/IPv6 PACKET/COMPRESSED IP PACKET/
NULL PACKET/TRANSFER CONTROL SIGNAL (AMT AND NIT)

| DATA TYPE | DATA LENGTH 16 BITS | DATA |
|---|---|---|

FIG. 9

DATA TYPE = LONG-FORMAT NTP, DATA LENGTH = 64 BITS

| DATA TYPE | DATA LENGTH | REFERENCE CLOCK INFORMATION |
|---|---|---|

FIG. 11

DATA TYPE = IP PACKET WITH REFERENCE CLOCK

| DATA TYPE | DATA LENGTH | REFERENCE CLOCK INFORMATION | IP PACKET |
|---|---|---|---|

FIG. 12

DATA TYPE = IP PACKET

| REFERENCE CLOCK INFORMATION | DATA TYPE | DATA LENGTH | IP PACKET |
|---|---|---|---|

| CHANGE INSTRUCTION 8 | TRANSFER MODE/ SLOT INFORMATION 192 | STREAM CLASSIFICATION/ RELATIVE STREAM INFORMATION 128 | PACKET FORM/ RELATIVE STREAM INFORMATION 896 | POINTER/ SLOT INFORMATION 3840 | RELATIVE STREAM/ SLOT INFORMATION 480 | RELATIVE STREAM/ TRANSFER STREAM ID CORRESPONDENCE TABLE INFORMATION 256 | TRANSMISSION-RECEPTION CONTROL INFORMATION 8 | EXTENSION INFORMATION 3614 |

FIG. 17

| STREAM CLASSIFICATION OF RELATIVE STREAM 0 8 | STREAM CLASSIFICATION OF RELATIVE STREAM 1 8 | STREAM CLASSIFICATION OF RELATIVE STREAM 2 8 | STREAM CLASSIFICATION OF RELATIVE STREAM 3 8 | ... | STREAM CLASSIFICATION OF RELATIVE STREAM 12 8 | STREAM CLASSIFICATION OF RELATIVE STREAM 13 8 | STREAM CLASSIFICATION OF RELATIVE STREAM 14 8 | STREAM CLASSIFICATION OF RELATIVE STREAM 15 8 |
|---|---|---|---|---|---|---|---|---|

FIG. 18

| HEAD TLV INSTRUCTION | REFERENCE CLOCK INFORMATION | UNDEFINED |
|---|---|---|

FIG. 22A

| EXTENSION IDENTIFICATION 16 | EXTENSION AREA 3598 |
|---|---|

FIG. 22B

| NUMBER OF PAGES 16 | PAGE NUMBER 16 | ADDITIONAL INFORMATION CLASSIFICATION 8 | OBJECT SERVICE SPECIFICATION METHOD 8 | ADDITIONAL INFORMATION PAYLOAD 3550 |
|---|---|---|---|---|

FIG. 24A

```
EXTENSION AREA(){
    EXTENSION CLASSIFICATION: TYPE A DATA LENGTH NA
    EXTENSION CLASSIFICATION: TYPE B DATA LENGTH NB
    EXTENSION CLASSIFICATION: TYPE C DATA LENGTH NC for(i=0; i<NA; i++){
        EXTENSION CLASSIFICATION: TYPE A DATA
    }
    for(i=0; i<NB; i++){
        EXTENSION CLASSIFICATION: TYPE B DATA
    }
    for(i=0; i<NC; i++){
        EXTENSION CLASSIFICATION: TYPE C DATA
    }
}
```

FIG. 24B

```
EXTENSION AREA(){
    EXTENSION AREA NUMBER
    for(i=0; i<EXTENSION AREA NUMBER; i++){
        EXTENSION CLASSIFICATION
        EXTENSION AREA LENGTH
    }
    for(i=0; i<EXTENSION AREA NUMBER; i++){
        EXTENSION DATA
    }
}
```

FIG. 31

| | | |
|---|---|---|
| FRAME #n | BASE REFERENCE CLOCK INFORMATION | FIRST DIFFERENCE INFORMATION |
| FRAME #n+1 | BASE REFERENCE CLOCK INFORMATION | SECOND DIFFERENCE INFORMATION |
| FRAME #n+2 | BASE REFERENCE CLOCK INFORMATION | THIRD DIFFERENCE INFORMATION |

TRANSMISSION METHOD, RECEPTION METHOD, TRANSMISSION APPARATUS, AND RECEPTION APPARATUS

CROSS REFERENCE TO RELATED APPLICATIONS

This application is a continuation of U.S. application Ser. No. 17/241,356, filed Apr. 27, 2021, which is a continuation of U.S. application Ser. No. 15/618,803, filed Jun. 9, 2017, now issued as U.S. Pat. No. 11,019,118, which is a continuation of PCT Patent International Application Number PCT/JP2015/005957 filed on Dec. 1, 2015, claiming the benefit of priority of Japanese Patent Application Number 2015-220646 filed on Nov. 10, 2015, and U.S. Provisional Application No. 62/090,003 filed on Dec. 10, 2014, the entire contents of which are hereby incorporated by reference.

BACKGROUND

1. Technical Field

The present disclosure relates to a transmission method, a reception method, a transmission apparatus, and a reception apparatus.

2. Description of the Related Art

An MMT (MPEG Media Transport) scheme (refer to NPL 1: Information technology-High efficiency coding and media delivery in heterogeneous environments-Part 1: MPEG media transport (MMT), ISO/IEC DIS 23008-1) is a multiplexing scheme for multiplexing and packetizing content such as video and voice and for transmitting the content through one or more transfer channels such as broadcast and broadband. When the MMT scheme is applied to broadcasting systems, reference clock information of a transmission apparatus is transmitted to a reception apparatus, and the reception apparatus generates a system clock in the reception apparatus based on the reference clock information.

SUMMARY

It is desirable that such reception apparatus can shorten the processing delay in channel selection.

The non-limiting exemplary embodiments of the present disclosure provide a transmission method, a reception method, a transmission apparatus, or a reception apparatus, with which the processing delay in channel selection can be shortened.

The transmission method according to one aspect of the present disclosure includes: generating a frame for transfer in which one or more first internet protocol (IP) packets and one or more second IP packets are stored, the one or more first IP packets storing content, and each of the one or more second IP packets including reference clock information which indicates a time for playing back the content; and transmitting the generated frame through broadcasting. In the generating, header compression is performed on the one or more first IP packets and the header compression is not performed on the one or more second IP packets.

In addition, the reception method according to one aspect of the present disclosure includes: receiving, through broadcasting, a frame for transfer in which one or more internet protocol (IP) packets are stored, the one or more IP packets storing content and including: one or more first IP packets whose headers have been compressed; and one or more second IP packets whose headers have not been compressed, each of the one or more second IP packets including reference clock information which indicates a time for playing back the content; determining whether each of the one or more IP packets that are received is the first IP packet or the second IP packet based on whether or not a header of the IP packet has been compressed; and playing back the content stored in the one or more first IP packets, using the reference clock information stored in the each of the one or more second IP packets, based on a result of the determination.

Note that these general or specific aspects may be implemented using a system, an apparatus, a method, an integrated circuit, a computer program, or a computer-readable recording medium such as a CD-ROM. Also, these general or specific aspects may be implemented using any combination of a system, an apparatus, a method, an integrated circuit, a computer program, and a recording medium.

The present disclosure provides a transmission method, a reception method, a transmission apparatus, or a reception apparatus, with which the processing delay in channel selection can be shortened.

Further advantages and effects according to one aspect of the present disclosure are made apparent from the description and the drawings. Although such advantages and/or effects are respectively provided by the features described in several exemplary embodiments, and the description and the drawings, all of the advantages and effects need not necessarily be provided in order to obtain one or more of the same features as those described therein.

BRIEF DESCRIPTION OF DRAWINGS

FIG. 9 is a diagram illustrating an example in which a long-format NTP is stored in the TLV packet;

FIG. 11 is a diagram illustrating structure in which the reference clock information is appended immediately before an IP packet header;

FIG. 12 is a diagram illustrating structure in which the reference clock information is appended immediately before the TLV packet;

FIG. 13 is a diagram illustrating structure of a transfer slot;

FIG. 16 is a diagram illustrating structure of TMCC control information under a transfer scheme for advanced broadband satellite digital broadcast;

FIG. 17 is a diagram illustrating stream classification/relative stream information of the TMCC control information;

FIG. 18 is a diagram illustrating an example in which the reference clock information is stored in an undefined field of the slot header;

FIGS. 22A and 22B are diagrams respectively illustrating an example of a structure of TMCC extension information, and an example of the conventionally proposed bit assignment method when the extension area is used as a payload;

FIGS. 24A and 24B are diagrams respectively illustrating first and second examples of syntax when the extension classification is used;

FIG. 31 is a diagram for describing a variation of the transmission method of the difference information;

Figures 1, 2:
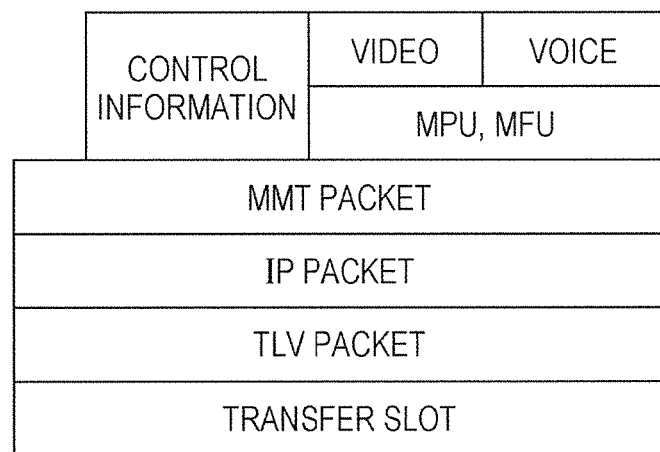
FIG. 1 is a diagram illustrating a protocol stack for performing transfer using an MMT scheme and an advanced BS transfer scheme.
FIG. 2 is a diagram illustrating data structure of a TLV packet.

DETAILED DESCRIPTION OF THE EMBODIMENTS (Underlying Knowledge Forming Basis of the Present Disclosure)

The present disclosure relates to a method and apparatus for transmitting reference clock information from a transmission side, receiving the reference clock information on a reception side, and generating (reproduction: playback) a reference clock in a hybrid delivery system using an MMT scheme which is under standardization by MPEG (Moving Picture Expert Group).

The MMT scheme is a multiplexing scheme for multiplexing and packetizing video and audio to transmit the video and audio via one or more transfer channels such as broadcast and broadband.

When the MMT scheme is applied to a broadcasting system, the reference clock on the transmission side is synchronized with an NTP (Network Time Protocol) prescribed by IETF RFC (Internet Engineering Task Force Request for Comments) 5905, and based on the reference clock, a time stamp such as PTS (Presentation Time Stamp) and DTS (Decode Time Stamp) is added to a medium. Furthermore, the reference clock information on the transmission side is transmitted to the reception side, and a reception apparatus generates the reference clock (hereinafter also referred to as a system clock) in the reception apparatus based on the reference clock information.

In the broadcasting system, a 64-bit long-format NTP capable of indicating absolute time is preferably used as the reference clock information. However, although the conventional MMT scheme prescribes storing a 32-bit short-format NTP in an MMT packet header and transferring the 32-bit short-format NTP, the conventional MMT scheme does not prescribe transferring the long-format NTP, and a receiver device side cannot acquire high-precision reference clock information.

In contrast, it is possible to define the long-format NTP as control information, such as a message, a table, or a descriptor, and to append the MMT packet header to the control information for transfer. In this case, the MMT packet is, for example, stored in an IP packet, and is transferred through a broadcast transfer channel or a broadband transfer channel.

When the MMT packet is transferred using an advanced BS transfer scheme (transmission system for advanced wide band digital satellite broadcasting) prescribed by the ARIB standard, after encapsulation of the MMT packet into the IP packet and encapsulation of the IP packet into a TLV (Type Length Value) packet, the MMT packet is stored in a transfer slot prescribed by the advanced BS transfer scheme.

When extracting a desired IP data flow from a TLV stream, the reception apparatus performs filtering of IP data flows or filtering of IP packets or UDP packets. In addition, when filtering the IP data flows, the reception apparatus needs to specify the IP data flow of a desired service and identify the packets that belong to the desired IP data flow.

However, the reception apparatus can identify the packets that belong to the desired IP data flow only after the reception of a full header. This might delay the processing until the reception apparatus firstly receives a full header, and thus the processing delay in channel selection gets longer in some cases. Moreover, in the case where the transmission intervals of the full headers are long, the processing delay in channel selection gets even longer.

The transmission method according to one aspect of the present disclosure includes: generating a frame for transfer in which one or more first internet protocol (IP) packets and one or more second IP packets are stored, the one or more first IP packets storing content, and each of the one or more second IP packets including reference clock information which indicates a time for playing back the content; and transmitting the generated frame through broadcasting. In the generating, header compression is performed on the one or more first IP packets and the header compression is not performed on the one or more second IP packets.

This enables the reception apparatus to filter the IP data flows based on whether or not the header compression has been performed. Thus, it is possible to shorten the processing delay in channel selection.

For example, in the generating, the header compression may include: (i) attaching, to a part of the one or more first IP packets, a full header which includes specification information for specifying an IP data flow to which the one or more first IP packets belong; and (ii) attaching, to a first IP packet other than the part of the one or more first IP packets, a compressed header which does not include the specification information.

For example, the reference clock information may comply with a network time protocol (NTP).

For example, the content may be stored in an MPEG media transport (MMT) packet in each of the one or more first IP packets.

For example, the frame may include one or more second transfer units, each having a fixed length, each of the one or more second transfer units may include one or more first transfer units, and each of the one or more first transfer units may include one of: the one or more first IP packets; and the one or more second IP packets.

For example, each of the one or more first transfer units may be a type length value (TLV) packet, each of the one or more second transfer units may be a slot defined under a transmission system for advanced wide band satellite digital broadcasting, and the frame may be a transfer slot defined under the transmission system for advanced wide band satellite digital broadcasting.

The reception method according to one aspect of the preset disclosure includes: receiving, through broadcasting, a frame for transfer in which one or more internet protocol (IP) packets are stored, the one or more IP packets storing content and including: one or more first IP packets whose headers have been compressed; and one or more second IP packets whose headers have not been compressed, each of the one or more second IP packets including reference clock information which indicates a time for playing back the content; determining whether each of the one or more IP packets that are received is the first IP packet or the second IP packet based on whether or not a header of the IP packet has been compressed; and playing back the content stored in the one or more first IP packets, using the reference clock information stored in the each of the one or more second IP packets, based on a result of the determination.

This enables the reception apparatus to filter the IP data flows based on whether or not the header compression has been performed. Thus, it is possible to shorten the processing delay in channel selection.

For example, the header compression may include: (i) attaching, to a part of the one or more first IP packets, a full header which includes specification information for specifying an IP data flow to which the one or more first IP packets belong; and (ii) attaching, to a first IP packet other than the part of the one or more first IP packets, a compressed header which does not include the specification information.

For example, the reference clock information may comply with a network time protocol (NTP).

For example, the content may be stored in an MPEG media transport (MMT) packet in each of the one or more first IP packets.

For example, the frame may include one or more second transfer units, each having a fixed length, each of the one or more second transfer units may include one or more first transfer units, and each of the one or more first transfer units may include one of: the one or more first IP packets; and the one or more second IP packets.

For example, each of the one or more first transfer units may be a type length value (TLV) packet, each of the one or more second transfer units may be a slot defined under a transmission system for advanced wide band satellite digital broadcasting, and the frame may be a transfer slot defined under the transmission system for advanced wide band satellite digital broadcasting.

The transmission apparatus according to one aspect of the present disclosure includes: a generator which generates a frame for transfer in which one or more first internet protocol (IP) packets and one or more second IP packets are stored, the one or more first IP packets storing content, and each of the one or more second IP packets including reference clock information which indicates a time for playing back the content; and a transmitter which transmits the generated frame through broadcasting. The generator performs header compression on the one or more first IP packets and does not perform the header compression on the one or more second IP packets.

This enables the reception apparatus to filter the IP data flows based on whether or not the header compression has been performed. Thus, it is possible to shorten the processing delay in channel selection.

The reception apparatus according to one aspect of the present disclosure includes: a receiver which receives, through broadcasting, a frame for transfer in which one or more internet protocol (IP) packets are stored, the one or more IP packets storing content and including: one or more first IP packets whose headers have been compressed; and one or more second IP packets whose headers have not been compressed, each of the one or more second IP packets including reference clock information which indicates a time for playing back the content; a determiner which determines whether each of the one or more IP packets that are received is the first IP packet or the second IP packet based on whether or not a header of the IP packet has been compressed; and a playback unit which plays back the content stored in the one or more first IP packets, using the reference clock information stored in the each of the one or more second IP packets, based on a result of the determination.

This enables the reception apparatus to filter the IP data flows based on whether or not the header compression has been performed. Thus, it is possible to shorten the processing delay in channel selection.

Exemplary embodiments will be specifically described below with reference to the drawings.

In addition, the exemplary embodiments described below are each a comprehensive or specific example. Numerical values, shapes, materials, components, placement positions and connection modes of the components, steps and a step order described in the following exemplary embodiments are exemplary, and by no means limit the present disclosure. Further, components which are not recited in the independent claims representing the uppermost generic concepts among components in the following exemplary embodiments will be described as arbitrary components.

First Exemplary Embodiment

[Basic Configuration of an MMT Scheme]

First, a basic configuration of an MMT scheme will be described. FIG. 1 illustrates a protocol stack diagram for performing transfer using the MMT scheme and an advanced BS transfer scheme.

Under the MMT scheme, information such as video and audio is stored in a plurality MPUs (Media Presentation Units) and a plurality of MFUs (Media Fragment Units), and an MMT packet header is added for MMT-packetization.

Meanwhile, under the MMT scheme, the MMT packet header is also added to control information such as an MMT message for MMT-packetization. The MMT packet header is provided with a field that stores a 32-bit short-format NTP, and this field can be used for QoS control of communication lines, etc.

MMT-packetized data is encapsulated into an IP packet having a UDP header or IP header. At this time, in the IP header or UDP header, when a set of packets with an identical source IP address, destination IP address, source port number, destination port number, and protocol classification is an IP data flow, headers of the plurality of IP packets contained in one IP data flow are redundant. Therefore, header compression of some IP packets is performed in one IP data flow.

Next, a TLV packet will be described in detail. FIG. 2 is a diagram illustrating data structure of the TLV packet.

The TLV packet stores an IPV4 packet, IPV6 packet, compressed IP packet, NULL packet, and transfer control signal, as illustrated in FIG. 2. These pieces of information are identified using an 8-bit data type. Examples of the transfer control signal include an AMT (Address Map Table) and NIT (Network Information Table). Also, in the TLV packet, a data length (byte unit) is indicated using a 16-bit field, and a value of data is stored after the data length. Since there is 1-byte header information before the data type (not illustrated in FIG. 2), the TLV packet has a total of 4-byte header area.

The TLV packet is mapped to a transfer slot under the advanced BS transfer scheme. Pointer/slot information that indicates a head position of a first packet and a tail position of a last packet which are contained in every slot are stored in TMCC (Transmission and Multiplexing Configuration Control) control information (control signal).

Figure 3:
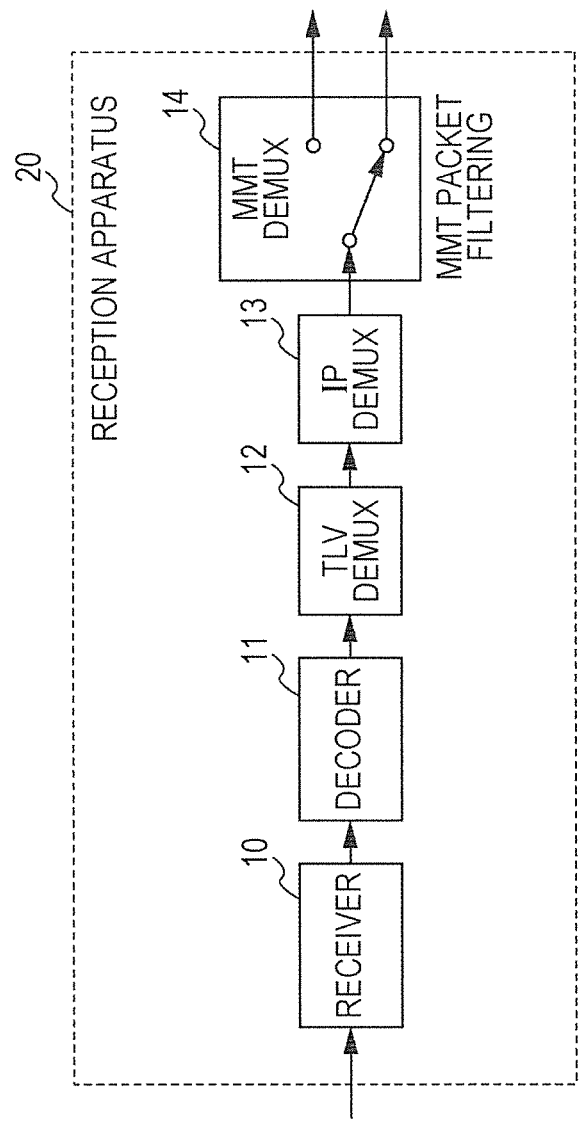
FIG. 3 is a block diagram illustrating a basic configuration of a reception apparatus.

Next, a configuration of a reception apparatus when the MMT packet is transferred by using the advanced BS transfer scheme will be described. FIG. 3 is a block diagram illustrating the basic configuration of the reception apparatus. Note that the configuration of the reception apparatus of FIG. 3 is simplified. More specific configuration will be described later individually according to a manner in which reference clock information is stored.

Reception apparatus 20 includes receiver 10, decoder 11, TLV demultiplexer (DEMUX) 12, IP demultiplexer (DEMUX) 13, and MMT demultiplexer (DEMUX) 14.

Receiver 10 receives transfer channel coded data.

Decoder 11 decodes the transfer channel coded data received by receiver 10, applies error correction and the like, and extracts the TMCC control information and TLV data. The TLV data extracted by decoder 11 undergoes DEMUX processing by TLV demultiplexer 12.

The DEMUX process performed by TLV demultiplexer 12 differs according to the data type. For example, when the data type is a compressed IP packet, TLV demultiplexer 12 performs processes such as decompressing the compressed header and passing the header to an IP layer.

IP demultiplexer 13 performs processing such as header analysis of an IP packet or UDP packet, and extracts the MMT packet for each IP data flow.

MMT demultiplexer 14 performs a filtering process (MMT packet filtering) based on a packet ID stored in the MMT packet header.

[Method for Storing the Reference Clock Information in the MMT Packet]

Under the MMT scheme described with reference to FIG. 1 to FIG. 3 described above, although the 32-bit short-format NTP can be stored in the MMT packet header and transferred, there exists no method for transferring a long-format NTP.

Hereinafter, a method for storing the reference clock information in the MMT packet will be described. First, the method for storing the reference clock information within the MMT packet will be described.

When a descriptor, a table, or a message for storing the reference clock information is defined and stored in the MMT packet as control information, an identifier indicating that the control information is the descriptor, table, or message indicating the reference clock information is indicated within the control information. Then, the control information is stored in the MMT packet on a transmission side.

This allows reception apparatus 20 to identify the reference clock information based on the identifier. Note that the reference clock information may be stored in the MMT packet by using existing descriptors (for example, CRI_descriptor( ), etc.).

Next, a method for storing the reference clock information in the MMT packet header will be described.

For example, there is a method for storing the reference clock information by using a header_extension field (hereinafter referred to as an extension field). The extension field becomes effective when an extension_flag of the MMT packet header is set to '1'.

There is such a method that an extension field type indicating data classification of data to be stored in the extension field is stored in the extension field, information indicating that the data is the reference clock information (for example, a 64-bit long-format NTP) is stored in the extension field type, and the reference clock information is stored in the extension field.

In this case, when the header_extension_flag of the MMT packet header is '1', reception apparatus 20 refers to the extension field of the MMT packet. When the extension field type indicates that the data is the reference clock information, the reference clock information is extracted and a clock is reproduced.

Note that the reference clock information may be stored in an existing header field. In addition, when there is an unused field or when there is a field unnecessary for broadcast, the reference clock information may be stored in these fields.

In addition, the reference clock information may be stored by using the existing field and the extension field together. For example, the existing 32-bit short-format NTP field and the extension field may be used together.

In order to maintain compatibility with the existing field, of the 64-bit long-format NTP, only a 32-bit section corresponding to a short-format format may be stored in the existing field, and remaining 32 bits may be stored in the extension field.

Here, the reference clock information is, for example, time when a head bit of the MMT packet in which the reference clock information is stored passes a predetermined position (for example, when the head bit is output from a specific component of a transmission apparatus). However, the reference clock information may be time when a bit of another position passes the predetermined position.

When the reference clock information is stored in the MMT packet as the control information, the MMT packet containing the control information is transmitted at predetermined transmission intervals.

When the reference clock information is stored in the extension field of the MMT packet, the reference clock information is stored in the extension field of a predetermined MMT packet header. Specifically, for example, at least one or more pieces of the reference clock information are stored in the header extension fields of the MMT packets at intervals of 100 ms.

Note that, when the reference clock information is stored in the MMT packet, the packet ID of the MMT packet that stores the reference clock information is stored in program information. Reception apparatus 20 analyzes the program information and acquires the MMT packet in which the reference clock information is stored. At this time, the packet ID of the MMT packet in which the reference clock information is stored may be prescribed in advance as a fixed value. This allows reception apparatus 20 to acquire the reference clock information without analyzing the program information.

[Operation Flow when the Reference Clock Information is Stored in the MMT Packet]

Next, an operation flow when the reference clock information is stored in the MMT packet (acquisition flow of the reference clock information) will be described.

Figure 4:
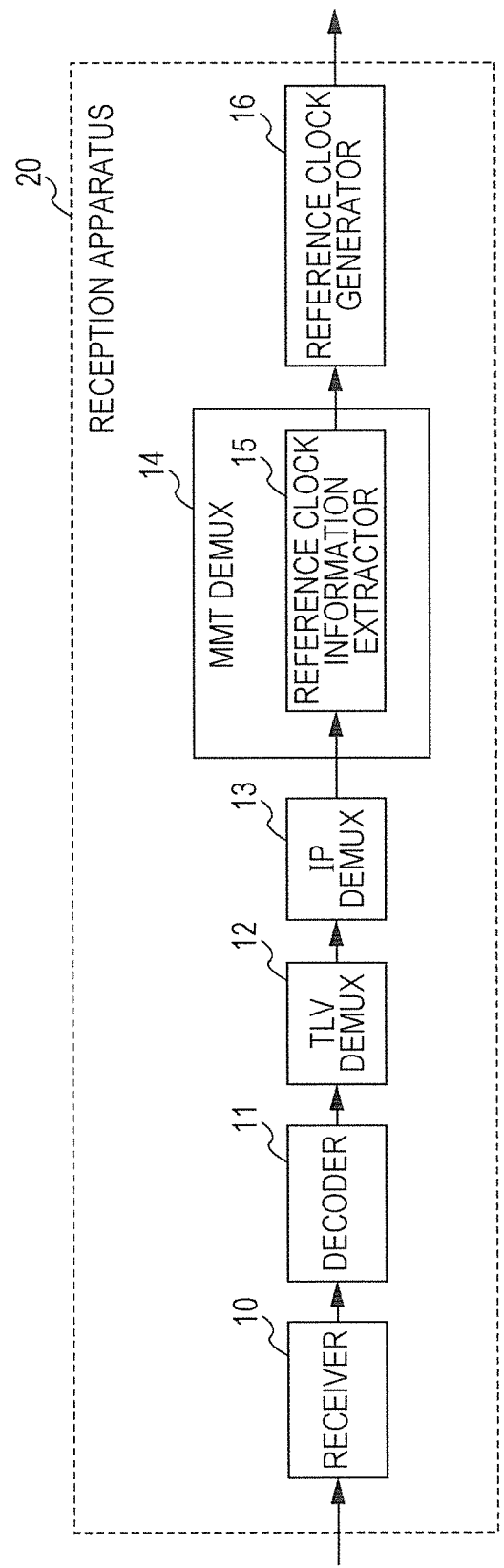
FIG. 4 is a block diagram illustrating a functional configuration of the reception apparatus when reference clock information is stored in an extension field of an MMT packet header.
Figure 5:
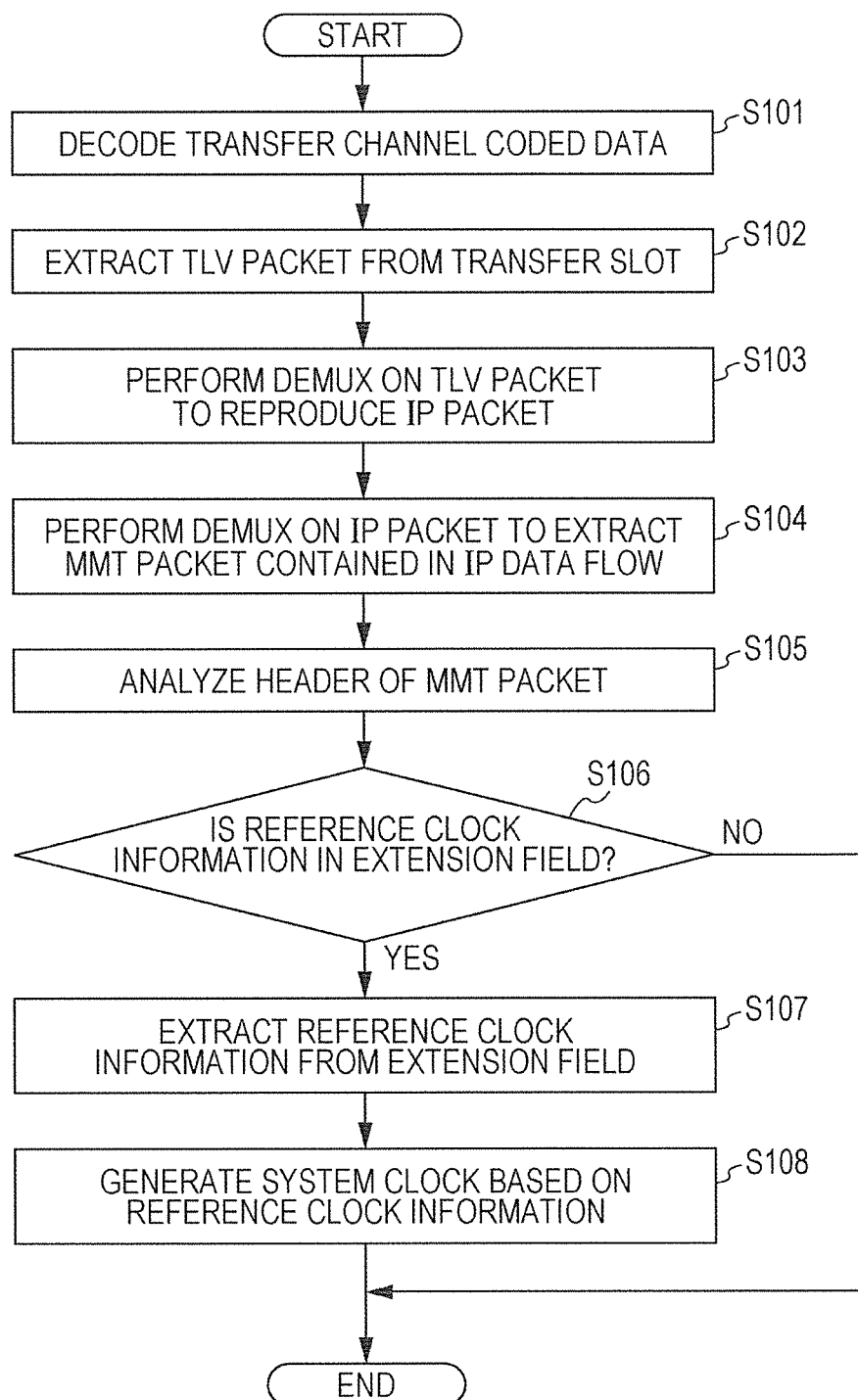
FIG. 5 is a diagram illustrating an acquisition flow of the reference clock information performed by the reception apparatus when the reference clock information is stored in the extension field of the MMT packet header.

First, the following describes the acquisition flow of the reference clock information performed by reception apparatus 20 when the reference clock information is stored in the extension field of the MMT packet header. FIG. 4 is a block diagram illustrating a functional configuration of reception apparatus 20 when the reference clock information is stored in the extension field of the MMT packet header. FIG. 5 is a diagram illustrating the acquisition flow of the reference clock information performed by reception apparatus 20 when the reference clock information is stored in the extension field of the MMT packet header.

As illustrated in FIG. 4, when the reference clock information is stored in the extension field of the MMT packet header, reference clock information extractor 15 (an example of the extractor) is provided within MMT demultiplexer 14, and reference clock generator 16 (an example of the generator) is provided downstream of MMT demultiplexer 14.

In the flow of FIG. 5, decoder 11 of reception apparatus 20 decodes the transfer channel coded data received by receiver 10 (S101), and extracts the TLV packet from the transfer slot (S102).

Next, TLV demultiplexer 12 performs DEMUX on the extracted TLV packet to extract the IP packet (S103). At this time, the header of the compressed IP packet is reproduced.

Next, IP demultiplexer 13 performs DEMUX on the IP packet, acquires the specified IP data flow, and extracts the MMT packet (S104).

Next, MMT demultiplexer 14 analyzes the header of the MMT packet, and determines whether the extension field is used and whether the reference clock information is in the extension field (S106). When there is no reference clock information in the extension field (No in S106), the process ends.

On the other hand, when the determination is made such that the reference clock information is in the extension field (Yes in S106), reference clock information extractor 15 extracts the reference clock information from the extension field (S107). Then, reference clock generator 16 generates the system clock based on the extracted reference clock information (S108). The system clock is, in other words, a clock for playing back content.

Figure 6:
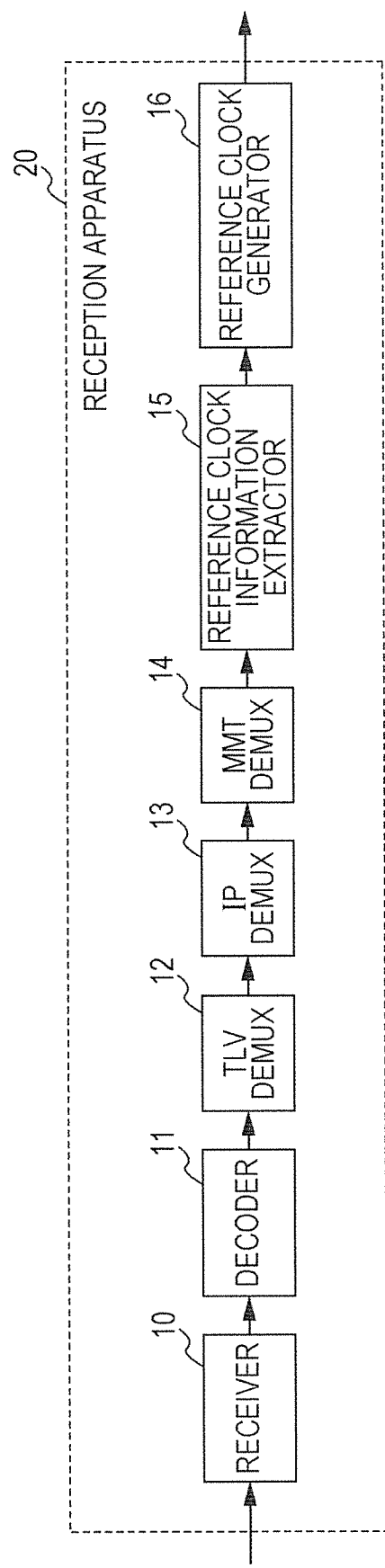
FIG. 6 is a block diagram illustrating the functional configuration of the reception apparatus when the reference clock information is stored in control information.
Figure 7:
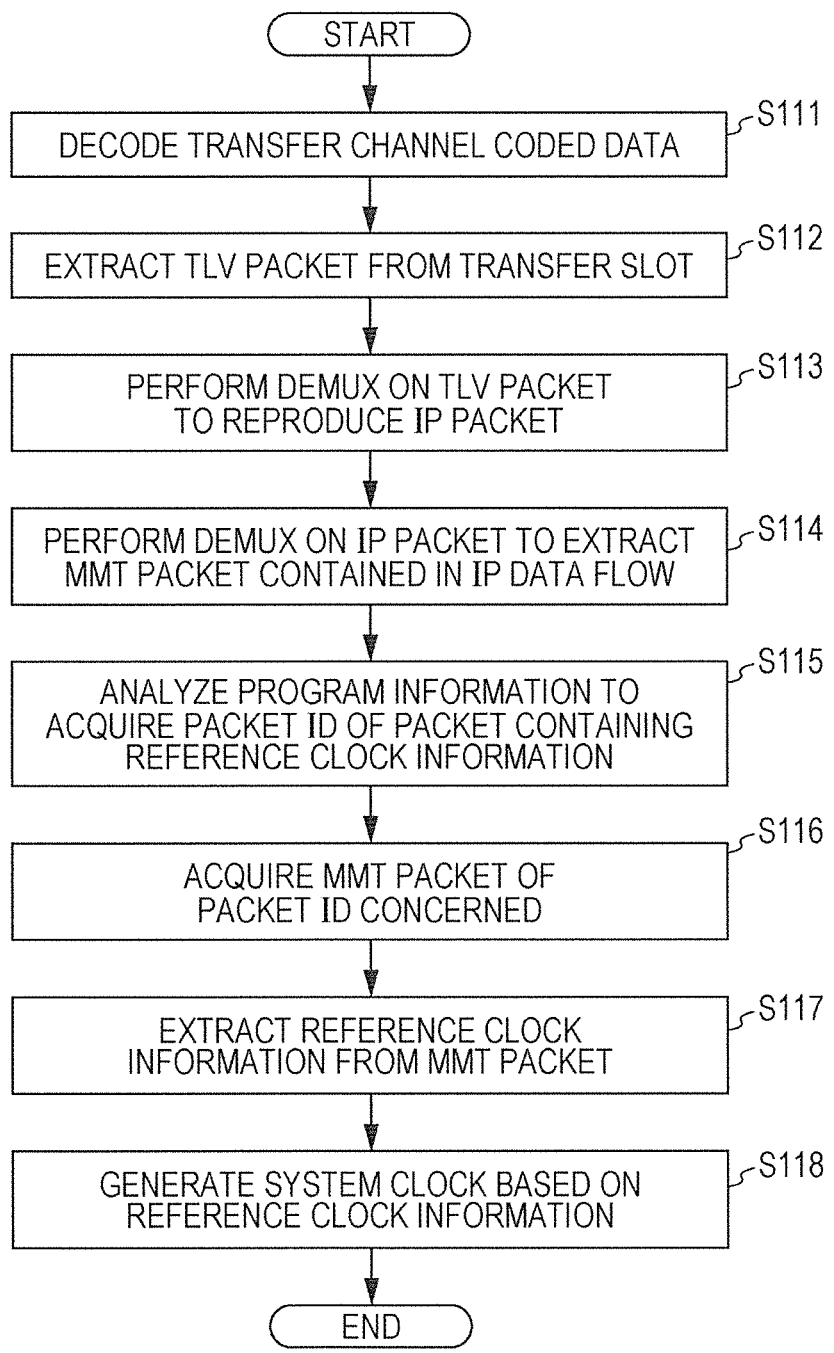
FIG. 7 is a diagram illustrating the acquisition flow of the reference clock information performed by the reception apparatus when the reference clock information is stored in the control information.

Next, the acquisition flow of the reference clock information by reception apparatus 20 when the reference clock information is stored in the control information will be described. FIG. 6 is a block diagram illustrating the functional configuration of reception apparatus 20 when the reference clock information is stored in the control information. FIG. 7 is a diagram illustrating the acquisition flow of the reference clock information performed by reception apparatus 20 when the reference clock information is stored in the control information.

As illustrated in FIG. 6, when the reference clock information is stored in the control information, reference clock information extractor 15 is disposed downstream of MMT demultiplexer 14.

In the flow of FIG. 7, the processes of step S111 to step S114 are identical to the flow of step S101 to step S104 described in FIG. 5.

Subsequently to step S114, MMT demultiplexer 14 acquires the packet ID of the packet containing the reference clock information from the program information (S115), and acquires the MMT packet of the packet ID (S116). Subsequently, reference clock information extractor 15 extracts the reference clock information from the control signal contained in the extracted MMT packet (S117), and reference clock generator 16 generates the system clock based on the extracted reference clock information (S118).

[Method for storing the reference clock information in the TLV packet]

As described in FIG. 5 and FIG. 7, when the reference clock information is stored in the MMT packet, in order to obtain the reference clock information on the reception side, reception apparatus 20 extracts the TLV packet from the transfer slot, and extracts the IP packet from the TLV packet. Furthermore, reception apparatus 20 extracts the MMT packet from the IP packet, and further extracts the reference clock information from the header or a payload of the MMT packet. Thus, when the reference clock information is stored in the MMT packet, many processes are required for acquiring the reference clock information, and longer time is required until the acquisition, in some cases.

Therefore, a method will be described for implementing a process of adding a time stamp to a medium, such as video and audio, based on the reference clock, and a process of transferring the medium by using the MMT scheme, and for performing transfer of the reference clock information by using a lower layer, lower protocol, or lower multiplexing scheme than the MMT layer.

Figure 8:
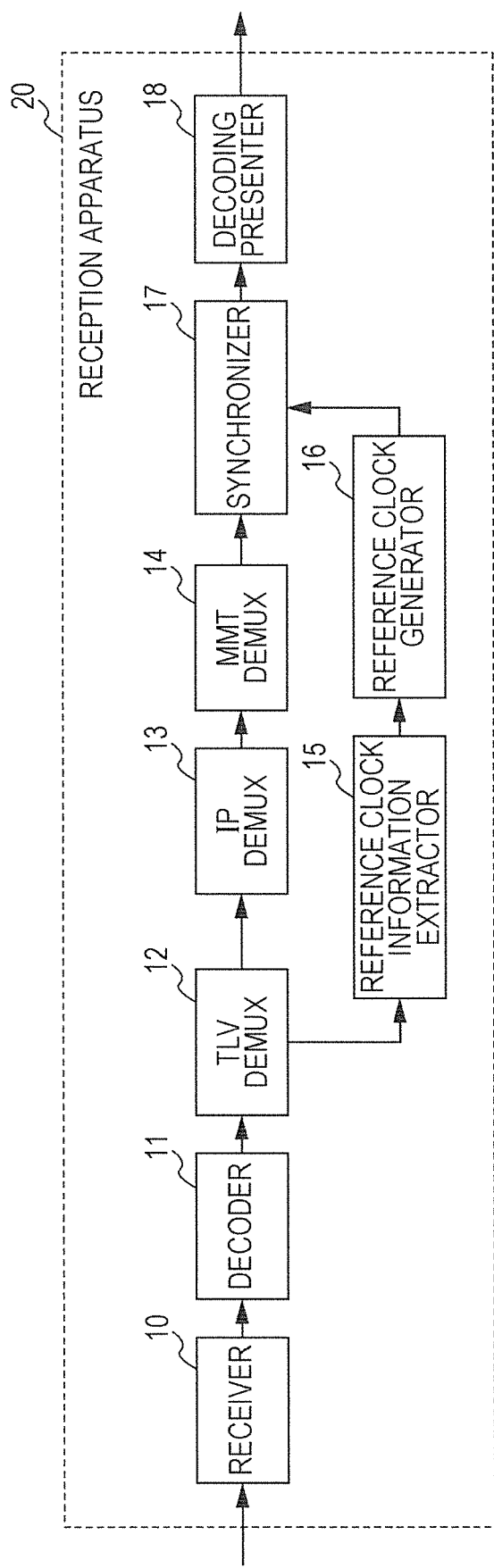
FIG. 8 is a block diagram illustrating the configuration of the reception apparatus when the reference clock information is stored in the TLV packet.

First, a method for storing the reference clock information in the TLV packet for transfer will be described. FIG. 8 is a block diagram illustrating the configuration of reception apparatus 20 when the reference clock information is stored in the TLV packet.

Reception apparatus 20 illustrated in FIG. 8 differs from reception apparatus 20 of FIG. 4 and FIG. 6 in placement of reference clock information extractor 15 and reference clock generator 16. In addition, synchronizer 17 and decoding presenter 18 are also illustrated in FIG. 8.

The TLV packet includes the 8-bit data type, 16-bit data length, and 8*N-bit data, as illustrated in aforementioned FIG. 2. In addition, 1-byte header which is not illustrated in FIG. 2 exists before the data type, as described above. Here, the data type is specifically prescribed, for example, as 0×01: IPv4 packet, 0×03: header-compressed IP packet, etc.

In order to store new data in the TLV packet, an undefined area of the data type is used to prescribe the data type. In order to indicate that the reference clock information is stored in the TLV packet, the data type describes that the data is the reference clock information.

Note that the data type may be prescribed for each kind of the reference clock. For example, the data types that indicate the short-format NTP, long-format NTP, and PCR (Program Clock Reference) may be prescribed individually. FIG. 9 is a diagram illustrating an example in which the long-format NTP is stored in the TLV packet. The long-format NTP is stored in a data field.

In this case, reference clock information extractor 15 analyzes the data type of TLV packet. When the reference clock information is stored, reference clock information extractor 15 analyzes the data length, and extracts the reference clock information from the data field.

Here, when the data length is uniquely determined by the data type, reference clock information extractor 15 may acquire the reference clock information without analyzing a data length field. For example, when the data type indicates a 64-bit long low mat NTP, reference clock information extractor 15 may extract a section from (4 bytes+1 bit)-th bit to (4 bytes+64 bits)-th bit. Also, reference clock information extractor 15 may extract only a desired bit from 64-bit data.

Figure 10:
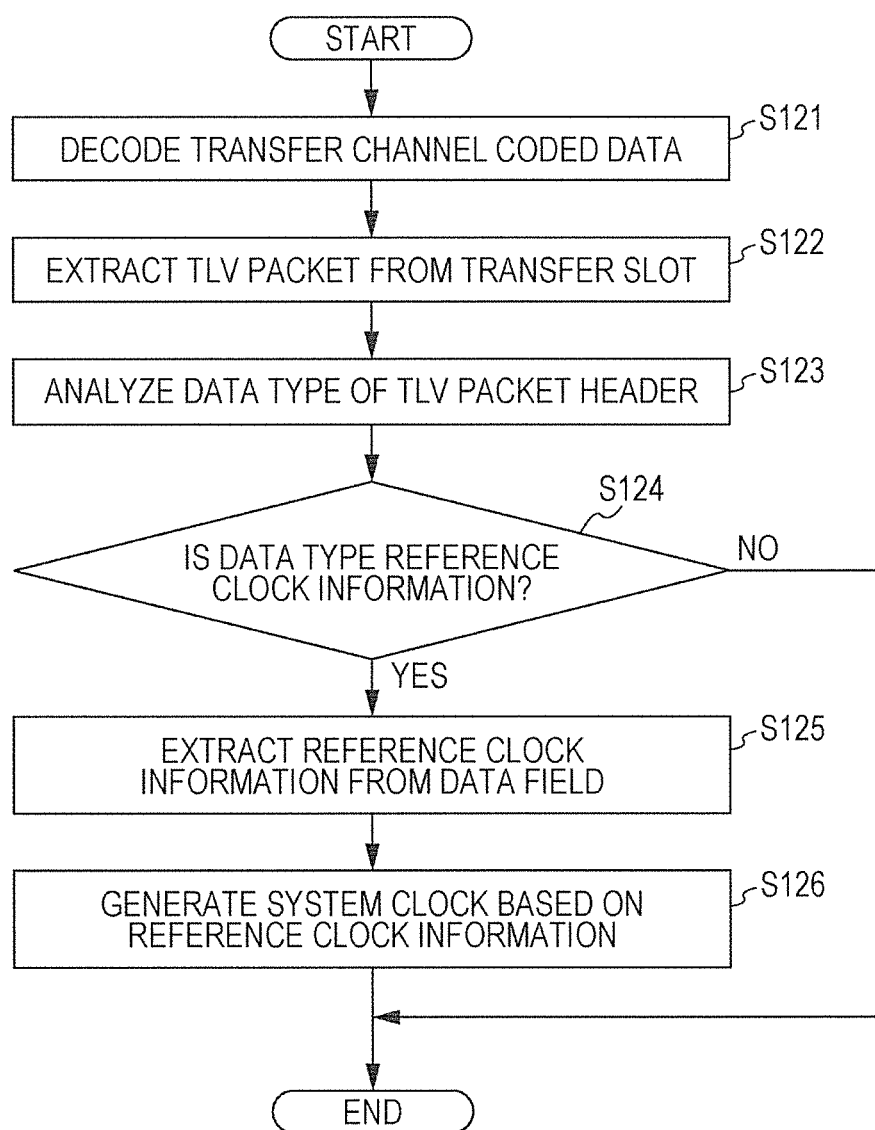
FIG. 10 is a diagram illustrating the acquisition flow of the reference clock information performed by the reception apparatus when the reference clock information is stored in the TLV packet.

Next, the operation flow of reception apparatus 20 when the reference clock information is stored in the TLV packet (acquisition flow of the reference clock information) will be described with reference to FIG. 10. FIG. 10 is a diagram illustrating the acquisition flow of the reference clock information performed by reception apparatus 20 when the reference clock information is stored in the TLV packet.

In the flow of FIG. 10, first, decoder 11 decodes the transfer channel coded data received by receiver 10 (S121), and extracts the TLV packet from the transfer slot (S122).

Next, TLV demultiplexer 12 analyzes the data type of TLV packet (S123), and determines whether the data type is the reference clock information (S124). When the data type is the reference clock (Yes in S124), reference clock information extractor 15 extracts the reference clock information from the data field of the TLV packet (S125). Then, reference clock generator 16 generates the system clock based on the reference clock information (S126). On the other hand, when the data type is not the reference clock information, (No in S124), the acquisition flow of the reference clock information ends.

In addition, in an unillustrated flow, IP demultiplexer 13 extracts the IP packet according to the data type. Then, the IP DEMUX process and MMT DEMUX process are performed on the extracted IP packet, and the MMT packet is extracted. Furthermore, synchronizer 17 outputs video data to decoding presenter 18 with timing with which the time stamp of the video data contained in the extracted MMT packet coincides with the reference clock generated in step S126. Decoding presenter 18 decodes and presents the video data.

In the transmission method described above, the type data of the TLV packet indicates that the reference clock information is stored, and the reference clock information is stored in the data field of the TLV packet. Thus, by storing and transmitting the reference clock information by using a lower layer or lower protocol than the MMT layer, the processes and time until reception apparatus 20 extracts the reference clock information can be reduced.

Also, since the reference clock information can be extracted and reproduced in a lower layer extending over the IP layers, the reference clock information can be extracted by hardware implementation. This can reduce more influence of jitter or the like than extracting the reference clock information by software implementation, and makes it possible to generate higher-precision reference clock.

Next, other methods for storing the reference clock information will be described.

When the data length is uniquely determined according to the data type in the aforementioned flow of FIG. 10, the data length field does not need to be transmitted. Here, when the data length field is not transmitted, an identifier is stored indicating that the data length field is data that is not transmitted.

Although the reference clock information is stored in the data field of the TLV packet according to the description of FIG. 10, the reference clock information may be appended immediately before or after the TLV packet. Also, the reference clock information may be appended immediately before or after data to be stored in the TLV packet. In these cases, a data type that allows specification of a position where the reference clock information is appended is added.

For example, FIG. 11 is a diagram illustrating structure in which the reference clock information is appended immediately before the IP packet header. In this case, the data type indicates an IP packet with reference clock information. When the data type indicates an IP packet with reference clock information, reception apparatus 20 (reference clock information extractor 15) can acquire the reference clock information by extracting bits of a previously prescribed predetermined length of the reference clock information from a head of the data field of the TLV packet. At this time, the data length may specify the length of data that includes the length of the reference clock information, and may specify the length that does not include the length of the reference clock information. When the data length specifies the length of data that includes the length of the reference clock information, reception apparatus 20 (reference clock information extractor 15) acquires data of a length obtained by subtracting the length of the reference clock information from the data length from immediately after the reference clock information. When the data length specifies the length of data that does not include the length of the reference clock information, reception apparatus 20 (reference clock information extractor 15) acquires data of the length specified by the data length from immediately after the reference clock information.

Figure 13:
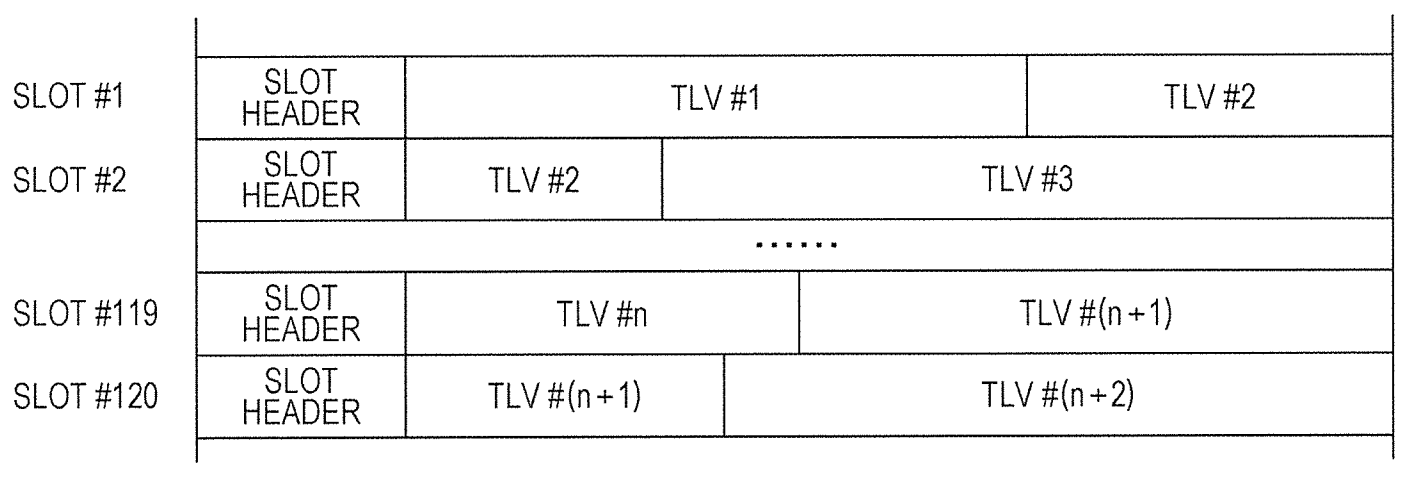

In addition, FIG. 12 is a diagram illustrating structure in which the reference clock information is appended immediately before the TLV packet. In this case, the data type is a conventional data type. An identifier indicating that the TLV packet is a TLV packet with reference clock information is stored, for example, in a slot header of the transfer slot or the TMCC control information. FIG. 13 is a diagram illustrating structure of the transfer slot, and FIG. 14 is a diagram illustrating structure of the slot header of the transfer slot.

As illustrated in FIG. 13, the transfer slot includes a plurality of slots (120 slots of Slot #1 to Slot #120 in the example of FIG. 13). A bit number contained in each slot is a fixed bit number uniquely determined based on a coding rate of error correction, each of the slots has a slot header and stores one or more TLV packets. Note that, as illustrated in FIG. 13, the TLV packet has a variable-length.

Figure 14:
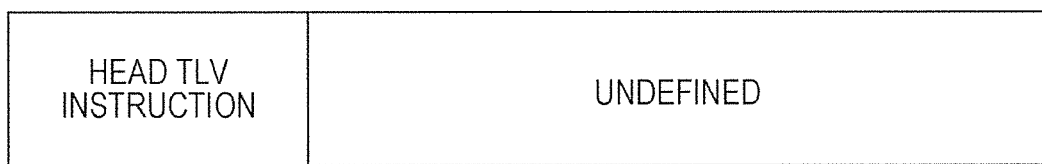
FIG. 14 is a diagram illustrating structure of a slot header of the transfer slot.

As illustrated in FIG. 14, in a head TLV instruction field (16 bits) of the slot header is stored a position of a head byte of a first TLV packet within the slot indicated with a number of bytes from a slot head except the slot header. Remaining 160 bits of the slot header is undefined. The transfer slot includes 120 slots per frame as described above, and a modulation scheme is assigned to the slots in 5-slot unit. In addition, up to 16 streams can be transferred within one frame. Note that the plurality of streams included in one transfer slot has, for example, different pieces of content (or a company that provides the content) transferred by the streams. In addition, each stream includes one or more slots, and one slot does not extend over the plurality of streams.

When the identifier indicating that the TLV packet is a TLV packet with reference clock information is stored in the slot header, for example, information that allows specification of a position of the TLV packet with reference clock information within the slot, kind of the reference clock information, data length, and the like are stored by extending (using) an undefined field of the slot header.

Note that all pieces of information including the information that allows specification of the position of the TLV packet with reference clock information, kind of the reference clock information, and data length do not need to be stored in the slot header. Only information that allows specification and reference of the TLV packet with reference clock information needs to be indicated.

Figure 15:
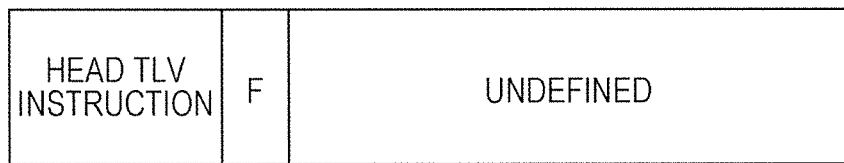
FIG. 15 is a diagram illustrating an example in which a flag is stored in an undefined area of the slot header.

For example, when definition is made such that the reference clock information is a 64-bit long-format NTP, that only one TLV packet with reference clock information can be stored in one slot, and that the one TLV packet with reference clock information is always the head TLV packet, a flag may be stored in the undefined area of the slot header. FIG. 15 is a diagram illustrating an example in which the flag is stored in the undefined area of the slot header.

In the example of FIG. 15, the flag (described as "F" in the diagram) indicating whether the reference clock information is contained in the slot is stored in the undefined area of the slot header. With such a flag, reception apparatus 20 may determine that the head TLV packet is a TLV packet with reference clock information.

In addition, the identifier (information) indicating that the TLV packet is a TLV packet with reference clock information may be stored in the TMCC control information. FIG. 16 is a diagram illustrating structure of the TMCC control information under a transfer scheme for advanced broadband satellite digital broadcast.

The information for specifying and referencing the TLV packet with reference clock information may be stored in extension information within the TMCC control information illustrated in FIG. 16, and may be stored in another place within the TMCC control information. For example, stream classification/relative stream information in the TMCC control information may be used as information for specifying and referencing the TLV packet with reference clock information. FIG. 17 is a diagram illustrating the stream classification/relative stream information in the TMCC control information.

As illustrated in FIG. 17, in the stream classification/relative stream information, the stream classification of each of 16 streams is indicated in 8 bits. That is, 1-frame transfer slot can transfer up to 16 (16-classification) streams. For example, the stream classification of an MPEG2-TS stream is "00000000", and the stream classification of a TLV stream is "00000010". However, under the current circumstances, the classifications of other streams are unassigned or undefined.

Therefore, when the stream classification of the TLV stream with reference clock is defined, for example, as "00000100" and when the relative stream is a TLV stream with reference clock, "00000100" is stored in the stream classification/relative stream information of the TMCC control information. Here, in the stream with the stream classification of "00000100", the TLV packet containing reference clock information is stored, for example, once per 5-slot unit which is a slot assignment unit, or once per frame unit.

In such structure, reception apparatus 20 analyzes the stream classification/relative stream information in the TMCC control information. When the stream classification is "00000100", reception apparatus 20 acquires the TLV packet with reference clock from the slot determined in advance.

A case is possible where the stream classification including download type TLV packets and the stream classification including stream type TLV packets, such as video and audio, are defined. In such a case, reception apparatus 20 may determine that the reference clock information is contained in the stream when the stream classification of the received stream is a stream type TLV packet. This is because the reference clock information is not usually used in reproduction of download type TLV packets.

In addition, when the information for specifying and referencing the TLV packet with reference clock information is stored in the extension information of the TMCC control information, for example, information for each of the 16 relative streams is stored in the extension area of the TMCC control information.

Also, as illustrated in FIG. 18, an area into which the reference clock information is stored may be newly defined in the undefined field of the slot header. FIG. 18 is a diagram illustrating an example in which the reference clock information is stored in the undefined field of the slot header.

Also, the reference clock information may be stored in a previously determined slot, and information indicating that the reference clock information is contained may be stored within the slot header. Here, the previously determined slot is, for example, a head slot of the transfer slot (Slot #1 in the example of FIG. 13), and the reference clock information stored in the IP packet may be contained in the head TLV packet within this slot. Also, when the plurality of streams are contained in the transfer slot, the previously determined slot may be, for example, a head slot of each stream contained in the transfer slot, and the reference clock information stored in the IP packet may be contained in the head TLV packet within this slot.

Also, information for specifying and referencing the slot header containing the reference clock information may be stored in the TMCC control information. Note that the storage method of the information for specifying and referencing the slot header containing the reference clock information in the TMCC control information is similar to the aforementioned storage method of the information for specifying and referencing the TLV packet with reference clock information, and thus description thereof will be omitted.

In this case, reception apparatus 20 analyzes the TMCC control information, and when determination is made such that the reference clock information is in the slot header, reception apparatus 20 extracts the reference clock information from the slot header.

Figure 19:
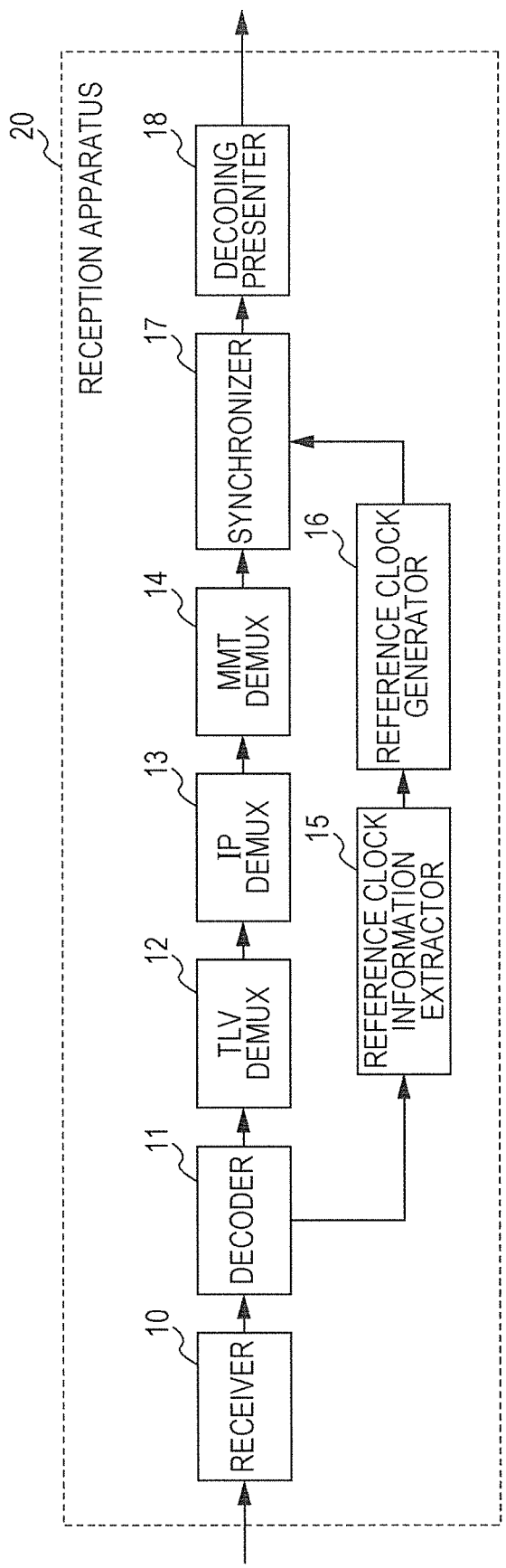
FIG. 19 is a block diagram illustrating the functional configuration of the reception apparatus when information indicating that the reference clock information is contained within the slot header is stored in TMCC control information.
Figure 20:
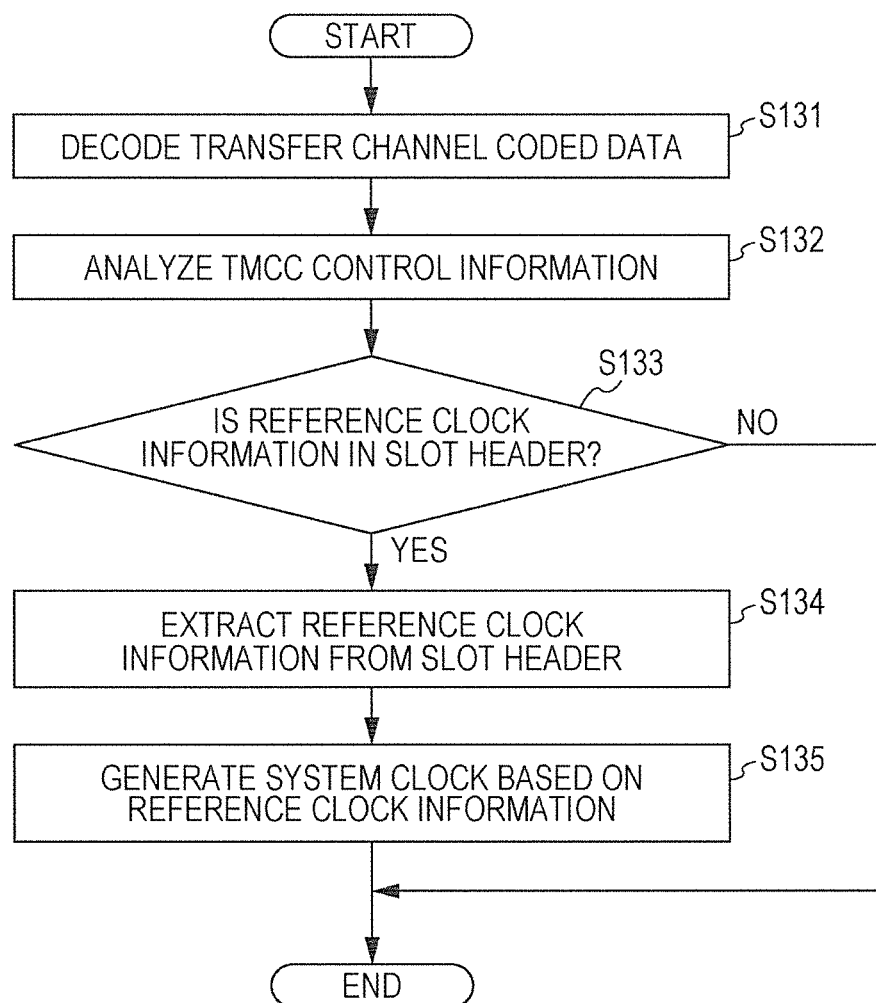
FIG. 20 is a diagram illustrating the acquisition flow of the reference clock information when the information indicating that the reference clock information is contained in the slot header is stored in the TMCC control information.

Also, the TMCC control information may store information indicating that the reference clock information is contained. FIG. 19 is a block diagram illustrating the functional configuration of reception apparatus 20 when the TMCC control information stores the information indicating that the reference clock information is contained within the slot header. FIG. 20 is a diagram illustrating the acquisition flow of the reference clock information when the TMCC control information stores the information indicating that the reference clock information is contained in the slot header.

As illustrated in FIG. 19, in reception apparatus 20 when the information indicating that the reference clock information is contained within the slot header is stored in the TMCC control information, reference clock information extractor 15 acquires the reference clock signal from the transfer slot that is output from decoder 11.

In the flow of FIG. 20, decoder 11 decodes the transfer channel coded data (S131), analyzes the TMCC control information (S132), and determines whether the reference clock information is in the slot header within the transfer slot (S133). When the reference clock information is in the slot header (Yes in S133), reference clock information extractor 15 extracts the reference clock information from the slot header (S134), and reference clock generator 16 generates the reference clock of the system (system clock) based on the reference clock information (S135). On the other hand, when the reference clock information is not in the slot header (No in S133), the acquisition flow of the reference clock information ends.

Such reception apparatus 20, which can acquire the reference clock information in the layer of the transfer slot, can acquire the reference clock information more quickly than a case where the reference clock information is stored in the TLV packet.

As described above, by storing the reference clock information in the TLV packet or transfer slot, reception apparatus 20 can reduce the processes until the acquisition of the reference clock information, and can shorten acquisition time of the reference clock information.

In addition, by storing the reference clock information in a physical layer in this way, acquisition and reproduction of the reference clock information by hardware can be implemented easily, and clock reproduction with high-precision is possible compared to the case of acquisition and reproduction of the reference clock information by software.

In addition, the aforementioned transmission method according to the first exemplary embodiment is summarized as, in the system in which the plurality of layers (protocols) exists including the IP layer, the time stamp of a medium is added based on the reference clock information in the layers upper than the IP layer, and the reference clock information is transmitted in the layers lower than the IP layer. Such a configuration facilitates processing of the reference clock information by hardware in reception apparatus 20.

Based on a similar idea, the reference clock information may be stored in a condition of not being stored in the MMT packet within the IP packet. Even in such a case, the processes for acquiring the reference clock information can be reduced as compared with the case where the reference clock information is stored in the MMT packet.

[Transmission Cycle of the Reference Clock Information]

Hereinafter, a transmission cycle of the reference clock information will be supplemented.

In the case of storing the reference clock information in the TLV packet, for example, time when the head bit of the TLV packet is transmitted on the transmission side is stored as the reference clock information. In addition, not the transmission time of the head bit but predetermined time determined differently may be stored as the reference clock information.

The TLV packet containing the reference clock information is transmitted at predetermined intervals. In other words, the TLV packet containing the reference clock information is contained in the transfer slot and is transmitted in a predetermined transmission cycle. For example, at least one or more pieces of reference clock information may be stored in the TLV packets and be transferred at intervals of 100 ms.

In addition, the TLV packets containing the reference clock information may be placed at predetermined intervals at predetermined positions of the transfer slot under the advanced BS transfer scheme. In addition, the TLV packet containing the reference clock information may be stored once every 5-slot unit which is a slot assignment unit of the TLV packet, and the reference clock information may be stored in the head TLV packet of the first slot of the 5-slot unit. That is, the TLV packet containing the reference clock information may be placed at a head within the head slot within the transfer slot (that is, immediately after the slot header).

Also, the TLV packets that contain the reference clock information may be placed at predetermined intervals at predetermined places of the transfer slot under the transfer scheme for advanced broadband satellite digital broadcast. For example, the reference clock information may be stored in the head TLV packet of the first slot once every 5-slot unit which is a slot assignment unit. That is, the reference clock information may be contained in the TLV packet positioned at a head within the head slot of each stream contained in the transfer slot. Also, the reference clock information may be stored in the first slot within the relative stream.

In addition, the transmission cycle and transmission interval of the reference clock information may be changed according to a modulation scheme or coding rate of the transfer channel coding scheme.

[Method for Acquiring the Reference Clock Information in the Upper Layer Quickly]

Next, a method will be described for shortening time to the acquisition of the reference clock information by performing batch DEMUX processing from the lower layer to the upper layer in reception apparatus 20.

Here, a method will be described for storing the reference clock information in the upper layer such as the MMT packet, and for storing in the IP packet the MMT packet in which the reference clock information is stored. In the method described below, direct reference of the MMT packet which is the upper layer is made from the lower layer such as the TLV packet, by defining a protocol for storing in the TLV packet the IP packet in which the reference clock information is stored. The reference clock information contained in the MMT packet is acquired without performance of normal DEMUX processing.

On the transmission side, the reference clock information is contained in the aforementioned control information stored in the MMT packet. The previously determined packet ID is added to the control information containing the reference clock information. Then, on the transmission side, the MMT packet containing the reference clock information is stored in a dedicated IP data flow. The previously determined source IP address, destination IP address, source port number, destination port number, and protocol classification are added.

On receipt of the transfer channel coded data generated in this way, reception apparatus 20 can extract the IP packet containing the reference clock information by TLV demultiplexer 12 acquiring the previously determined IP data flow.

Note that when the IP packet undergoes header compression, for example, an identifier indicating that the IP packet contains the reference clock information is added to a context identifier indicating identical IP data flows. The context identifier is stored in a compressed IP packet header. In this case, reception apparatus 20 can extract the IP packet containing the reference clock information with reference to the context identifier in the compressed IP packet header.

In addition, the IP packet containing the reference clock information may be prescribed not to undergo the header compression, and may be prescribed to always undergo the header compression. It may be prescribed that the previously determined context identifier is added to the IP packet containing the reference clock information, and that all the headers are compressed.

In addition, such a method is also possible that a TLV data type field defines an identifier indicating that the TLV packet is an IP packet that belongs to the IP data flow containing the reference clock information, or an identifier indicating that the TLV packet is a compressed IP packet that belongs to the IP data flow containing the reference clock information. Also, such an identifier may be defined in a field other than the TLV data type field.

When a direct reference to the reference clock information is made from the lower layer, the reference clock information is stored at a previously determined position, and packets in which the reference clock information is stored (such as the MMT packet, IP packet, and TLV packet) are packets dedicated to the reference clock information. In addition, a length of the field before the reference clock information is fixed, such as a packet header length is fixed-length.

At this time, the length of the field before the reference clock information does not need to be fixed. The length of the field before the reference clock information only needs to be specified in the lower layer. For example, when information on the length to the reference clock information includes two types, A and B, reception apparatus 20 may specify the position of the reference clock information by signaling which of A and B the length information is in the lower layer. Alternatively, positional information on the reference clock information that allows direct reference to the reference clock information in the upper layer may be stored in the lower layer on the transmission side, and reception apparatus 20 may make a reference from the lower layer based on the positional information.

The following describes a specific method for acquiring the reference clock information in the upper layer quickly.

Reception apparatus 20 determines the TLV data type. On determination that the reference clock information is contained, reception apparatus 20 acquires the reference clock information contained within the MMT packet directly from the IP packet.

Thus, reception apparatus 20 may extract the reference clock information contained in the MMT packet by extracting a bit string at a specific position from the IP packet or compressed IP packet, without analyzing the IP address, port number, or context identifier. Extracting the bit string at a specific position means, for example, extracting information of a specific length from a position that is offset by fixed-length bytes from the TLV packet header. Accordingly, the reference clock information is acquired.

The offset length of the fixed-length bytes for extracting the reference clock information is uniquely determined for each of the IP packet and the compressed IP packet. Therefore, reception apparatus 20 can acquire the reference clock information by extracting the information of the specific length from the position that is offset by the fixed-length bytes immediately after determining the TLV data type. Note that the extraction here may be performed from a position that is offset by the fixed length from a specific field of TLV, instead of from the position that is offset by the fixed length from the TLV packet header.

Note that the aforementioned method is one example, and the reference clock information in the upper layer may be acquired from the lower layer by defining another protocol or identifier. For example, an identifier indicating whether the IP packet contains the reference clock information may be stored in a field other than the TLV data type field.

In addition, for example, reference time information contained in the MMT packet may be extracted by extracting the bit string of a specific position from the IP packet or compressed IP packet without analyzing the IP address, the port number, and the context identifier.

When the IP data flow containing the reference clock information is not determined from identification information on the IP data flow, the MMT packet containing the reference clock information may be specified based on unique identification information (packet ID) added to the MMT packet containing the reference clock information. In this case, the reference clock information is extracted from the specific field as described above.

Also, it is assumed that the reference clock information contained in the MMT packet is not stored at the position determined in advance or that the position where the reference clock information contained in the MMT packet is stored cannot be specified. In such a case, reception apparatus 20 specifies the MMT packet containing the reference clock information by using the aforementioned method, specifies the position of the reference clock information based on MMT packet header information, and extracts the reference clock information.

Note that, although an example has been described above in which the MMT packet is stored in the IP packet, data to be stored in the IP packet does not need to be the MMT packet, but the data may be, for example, data that has another data structure. That is, the reference clock information may be contained in the IP packet in data structure different from data structure of the MMT packet. Even for the data with different data structure, in a similar manner to the aforementioned example, data containing the reference clock information is stored in a dedicated IP data flow, and identification information indicating that the data contains the reference clock information and identification information indicating that the data is an IP data flow containing the reference clock information are added.

Reception apparatus 20 identifies that the data is data containing the reference clock information, and that the data is an IP data flow containing data containing the reference clock information. When the reference clock information is contained, reception apparatus 20 extracts the reference clock information. Also, when the reference clock information is stored at a specific position of data, reception apparatus 20 can extract the reference clock information contained in the data with reference to the specific position from packet structure of the lower layer.

In the aforementioned example, in order to extract the reference clock information from the IP packet or the compressed IP packet, based on whether the data is the IP packet or the compressed IP packet, reception apparatus 20 extracts the reference clock information from respective fixed-length offset positions different from each other. However, in a case where it is predetermined that the IP packet containing the reference clock information does not undergo header compression, or in a case where it is predetermined that all the IP packets containing the reference clock information undergo header compression, the determination on whether the data is the IP packet or compressed IP packet made by reception apparatus 20 may be omitted. Also, determination on whether the reference clock information is contained may be made after the header of the compressed IP packet is decompressed.

Figure 21:
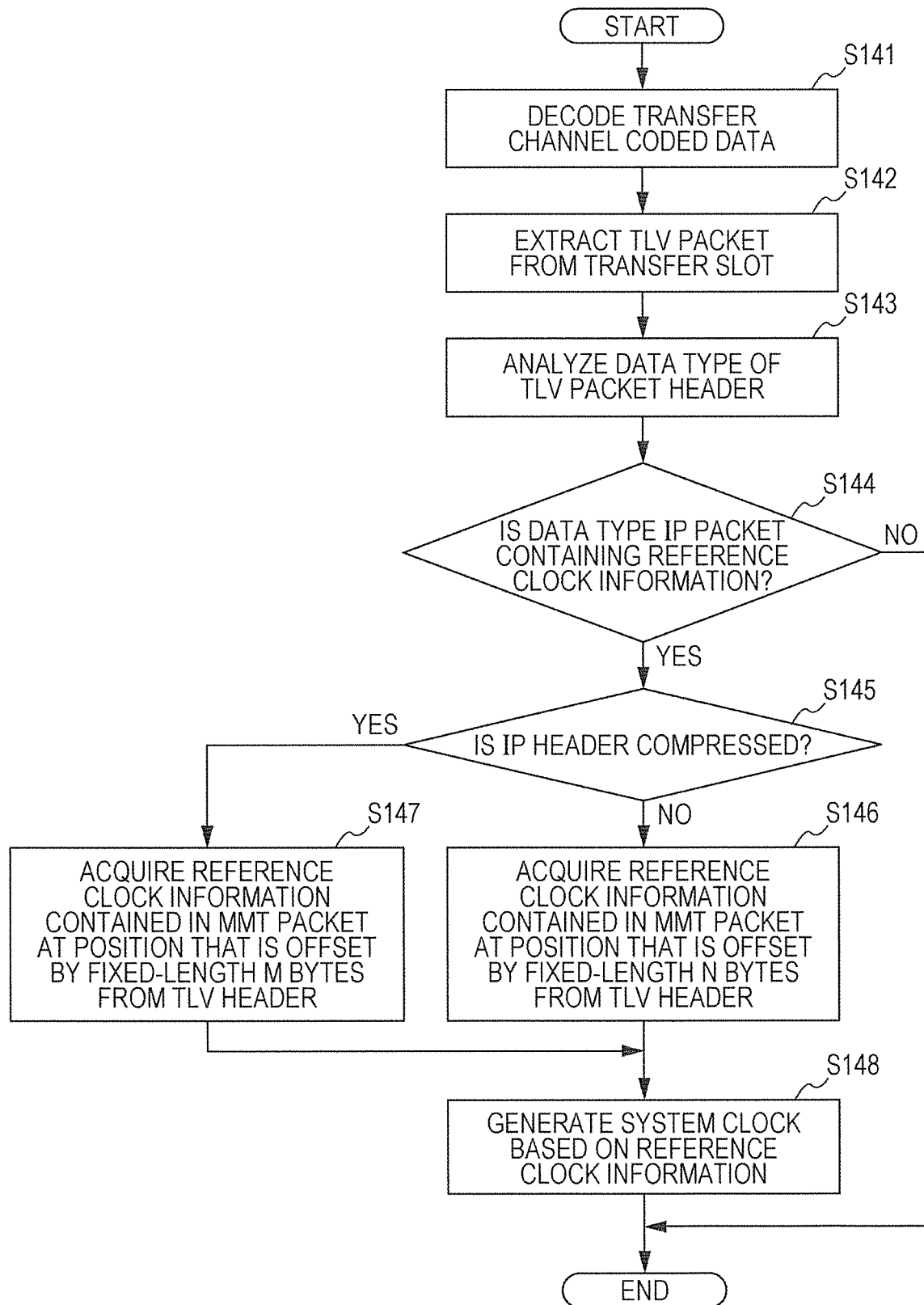
FIG. 21 is a diagram illustrating a flow of extracting a bit string at a specific position from the IP packet or compressed IP packet.

A reception method for extracting a bit string of a specific position from the IP packet or compressed IP packet will be described below with reference to the flowchart. FIG. 21 is a flowchart for extracting the bit string of a specific position from the IP packet or compressed IP packet. Note that the configuration of reception apparatus 20 in this case is similar to the block diagram illustrated in FIG. 8.

In the flow of FIG. 21, first, decoder 11 decodes the transfer channel coded data received by receiver 10 (S141), and extracts the TLV packet from the transfer channel slot (S142).

Next, TLV demultiplexer 12 analyzes the data type of TLV packet (S143), and determines whether the data type is an IP containing the reference clock information (S144). When the determination is made such that the data type is not an IP packet containing the reference clock information (No in S144), the flow ends. When the determination is made such that the data type is an IP packet containing the reference clock information (Yes in S144), the IP packet and the MMT packet are analyzed to determine whether the IP header is compressed (S145).

When the IP header is not compressed (No in S145), reference clock information extractor 15 acquires the reference clock information contained within the MMT packet at a position that is offset by fixed-length N bytes from the TLV header (S146). When the IP header is compressed (Yes in S145), reference clock information extractor 15 acquires the reference clock information contained within the MMT packet at a position that is offset by fixed-length M bytes from the TLV header (S147).

For example, when it is determined in step S145 such that the IP header is compressed, in step S146, reference clock information extractor 15 acquires the reference clock information contained in the MMT packet from the position that is offset by N bytes from the TLV header. On the other hand, when it is determined in step S145 such that the IP header is not compressed, in step S147, reference clock information extractor 15 acquires the reference clock information contained in the MMT packet from the position that is offset by M bytes from the TLV header.

Finally, reference clock generator 16 generates the system clock based on the reference clock information (S148).

Note that, since data structure of the IP packet header differs according to whether the IP packet is IPv4 or IPV6, the fixed-length N bytes and M bytes have different values.

While the normal MMT packet containing audio, video, control signal, and the like undergoes DEMUX processing in normal steps, the MMT packet containing the reference clock information undergoes batch DEMUX processing from the lower layer to the upper layer. This allows acquisition of the reference clock information in the lower layer even when the reference clock information is stored in the upper layer. That is, this can reduce the processes for acquisition of the reference clock information, shorten time to the acquisition of the reference clock information, and facilitate hardware implementation.

Second Exemplary Embodiment

Currently, as a method for using an extension area in TMCC control information (hereinafter also simply referred to as TMCC) under an advanced BS transfer scheme, ARIB (Association of Radio Industries and Businesses) is studying a method for transmitting urgent information and the like as a payload.

However, a proposed conventional method for using the extension area in the TMCC control information is limited to a method for transmitting a data payload, such as text and images, by using the TMCC control information extending over several frames. Therefore, the method for using the extension area in the TMCC control information will be limited, in some cases.

In particular, control information (control signal) that does not change in value for each frame, such as a conventional transfer mode and slot information, or control information that changes in value for each frame such as reference clock information cannot be stored in the extension area of the TMCC control information simultaneously with payload data extending over several frames.

Therefore, the second exemplary embodiment describes a method for making it possible to store data with different reception processing simultaneously in the extension area of the TMCC control information, by dividing the extension area of the TMCC control information in accordance with a classification of information and data to be stored in the extension area of the TMCC control information. Providing extensibility to the use of the extension area by such a method can enhance flexibility of extension. Also, the reception apparatus can perform reception and analysis of the TMCC control information by reception methods different for each classification based on the classification of data.

In addition, such a method allows payload data extending over several frames and payload data of only one frame to be included together in the extension area. Since the payload data of only one frame can be acquired first even while the payload data extending over several frames cannot be received, urgent information can be acquired and presented more quickly.

[Structure of TMCC Extension Information]

Structure of TMCC extension information will be described below. Note that basic structure of the TMCC control information is structure illustrated in FIG. 16. The control information to be stored in the TMCC control information is classified roughly into a first type and a second type below.

The first type of control information relates to frames, and does not change in value for each frame. A minimum update interval of such control information is a frame unit. When the value is changed, information after the change is transmitted two frames ahead. Also, when there is a change, notification is made by increment of an 8-bit change instruction. Specifically, information other than pointer information and slot information corresponds to such control information.

The second type of control information relates to frames, and changes in value for each frame. Since such control information is information that changes in value for each frame, the change instruction is not made. Specifically, such control information is the pointer information and the slot information.

FIGS. 22A and 22B are diagrams respectively illustrating an example of the structure of the TMCC extension information, and an example of a conventionally proposed bit assignment method when the extension area is used as a payload. The TMCC extension information includes 16-bit extension identification and 3598-bit extension area as illustrated in FIG. 22A. Setting a value other than all 0 in the extension identification validates the extension area.

FIG. 22B is a diagram illustrating the example of the conventionally proposed bit assignment method when the extension area is used as a payload. When the extension area is used as a payload, a number of pages includes 16 bits, and indicates over how many frames of the TMCC control information during transfer an additional information payload is transferred.

A page number includes 16 bits, and indicates in which page the TMCC control information during transfer is among the number of pages. An additional information classification includes 8 bits, and specifies the classification of the additional information. Specifically, the additional information classification is, for example, superimposed characters (subtitles), graphics, audio, and the like.

In a case of such structure, all of the extension area will be used as a payload, and control information such as the conventional TMCC control information cannot be stored in the extension area by using the extension area.

[Extension Method of the TMCC Extension Area]

Here, a method will be described for implementing storage of data with different reception processing in the TMCC extension area, by dividing the TMCC extension area in accordance with the classification of information and data to be stored in the TMCC extension area.

The classification of information or data to be stored in the TMCC extension area (hereinafter referred to as an extension classification) is classified as follows, for example.

Type A:
    Type A indicates control information that relates to frames and does not change in value for each frame.
    Minimum update interval is a frame unit. When there is a change in the value, information after the change is transmitted two frames ahead.
    Also, when there is a change, notification of the change is made by increment of the 8-bit change instruction.

Type B:
    Type B indicates control information that relates to frames and changes in value for each frame.
    Type B indicates information that changes in value for each frame, and the change instruction is not made.

Type C:
    Type C indicates information or data that is used as a payload (conventional extension scheme).
    However, for the change instruction, a change instruction field which is identical to TMCC which is not the extension area may be used, and the change instruction field may be independently prescribed in the extension area.

Figure 23:
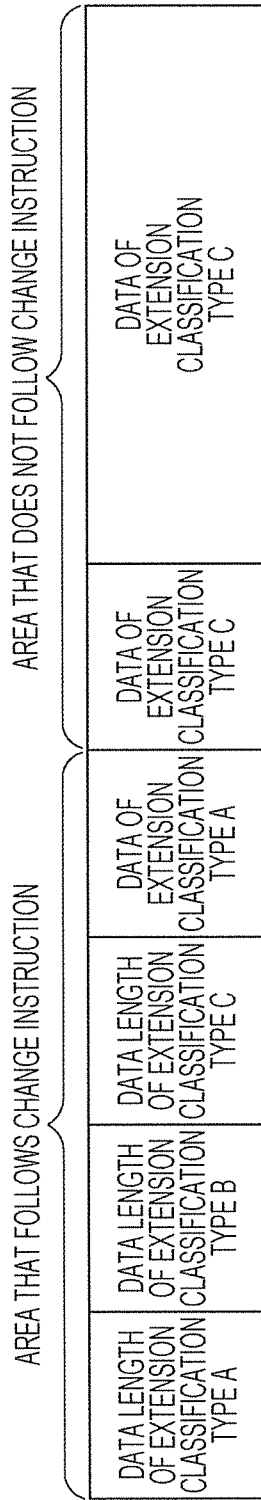
FIG. 23 is a diagram illustrating an example of data structure of an extension area in which an extension classification classified in this way is used.

FIG. 23 is a diagram illustrating an example of data structure (bit arrangement) of the extension area where the extension classification classified in this way is used. FIGS. 24A and 24B are diagrams respectively illustrating first and second examples of the syntax when the extension classification is used.

In the example of FIG. 23, only the aforementioned three types are defined as the extension classification. In addition, as illustrated in the first example shown in FIG. 24A, subsequently to storage of a data length in each of the three types of extension classification, extension data with a length indicated in the data length is stored for each extension classification. The reception apparatus extracts data with the length indicated in the data length from the extension area for each extension classification, and performs processing.

For example, regarding data of Type A, the reception apparatus acquires the data only when there is a change instruction. When there is a change in the data of Type A, the reception apparatus considers that the control information is changed, and performs processing on the control information in accordance with the change.

Also, regarding data of Type B, since the data of Type B changes in value for each frame, the reception apparatus acquires the data for every frame. For example, when the reference clock information that changes in value for each frame is stored in the TMCC control information, the reference clock information is stored in a data area of Type B.

Data of Type C contains payload information of the conventional extension scheme. Regarding the data of Type C, the reception apparatus performs operation in accordance with acquisition under the conventional extension scheme.

In the aforementioned example, details of data structure for each extension classification need to be separately prescribed. When prescribed separately, an identifier similar to the additional information classification and an object service specification method in the data of Type C illustrated in FIG. 22B may be prescribed in other types. Note that the additional information classification may be defined using a common table, and the extension identification and the additional information classification may be merged.

In addition, information that may change in the data length on the way may be considered as a classification similar to the data of Type A. In this case, when there is a change in the data length, a change instruction may be made by transmitting information after the change two frames ahead. When there is a change instruction, the reception apparatus confirms whether there is any change in the data length with reference to the data length of the extension classification.

Note that the data structure is not limited to the structure as illustrated in FIG. 23. For example, when the data length of the extension classification is fixed in advance, the data length does not need to be transmitted. Specifically, when the data length with the extension classification of Type A is fixed-length in FIG. 23, the data length with the extension classification of Type A does not need to be disposed within the data structure. In addition, when the data length with the extension classification of Type A and the data length with the extension classification of Type B are fixed-length, the data length of all types does not need to be disposed. In addition, a flag that indicates whether there is any data of the extension classification may be provided within the data structure.

In addition, syntax for using the extension classification is not limited to the syntax of the first example illustrated in FIG. 24A. For example, in the second example illustrated in FIG. 24B, an extension area number is set, and the extension classification and extension area length are stored for each extension area number. Subsequently, the extension data of the extension area number is stored.

Such structure may support addition of the extension classification in the future. In addition, since such structure enables storage of a plurality of pieces of data with identical extension classification, it is not necessary to determine details of data structure for each identical extension classification in advance. In addition, even when used as a payload (as Type C), such structure allows description of a plurality of pieces of data with different number of pages, such as video and audio in an identical frame.

Note that, in the structure of the second example illustrated in FIG. 24B, the extension area number, extension classification, and extension area length may be classifications similar to Type A. That is, these pieces of information may be prescribed to be information that follows the change instruction. Thus, continuous storage of data that follows the change instruction facilitates determination on presence of changes.

In addition, an undefined area may be provided in the extension classification in preparation for future extension. As an extension classification to be introduced in the future, for example, the following classifications are assumed.

This is a control signal to be updated for each several frames, and the change instruction is not made.

For an urgent signal, the change instruction is made in a similar manner to Type A. However, processing of value change is performed in the frame immediately after acquisition of the change instruction, instead of after acquisition of information that is two frames ahead.

Also, for the aforementioned urgent signal, an urgent flag may be transmitted using the extension classification accompanied by the change instruction, and urgent data may be transmitted using a payload. Also, the extension classification may be classified in accordance with whether to follow the change instruction.

[Detailed Configuration and Operation Flow]

Figure 25:
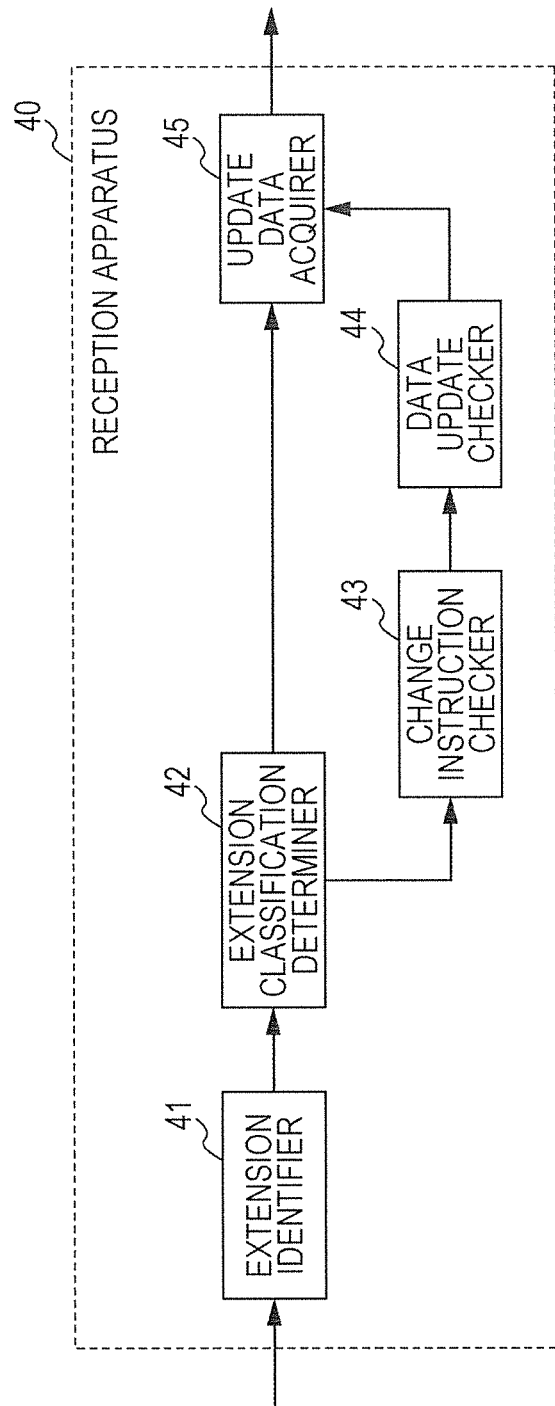
FIG. 25 is a block diagram illustrating a functional configuration of a reception apparatus according to a second exemplary embodiment.
Figure 26:
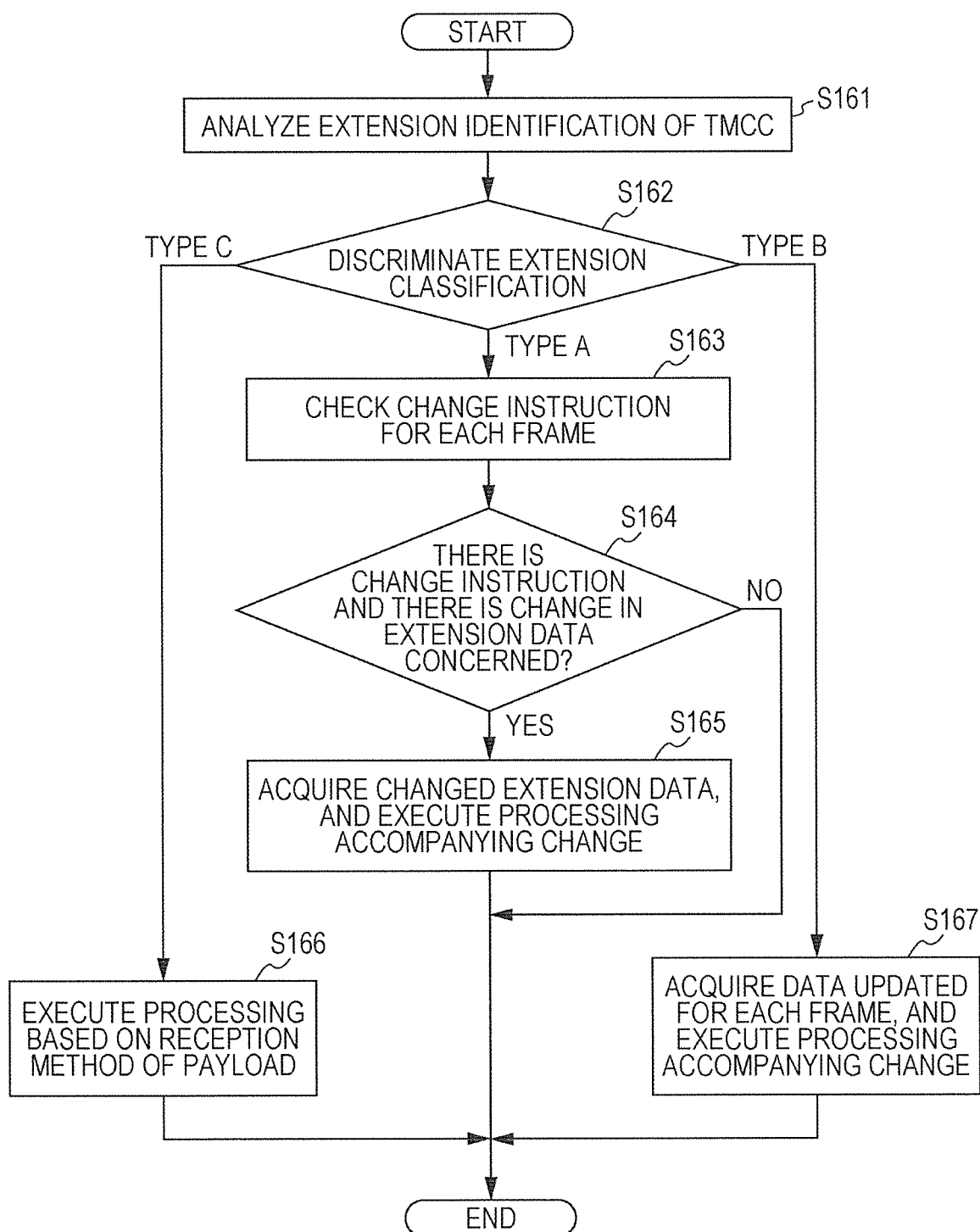
FIG. 26 is a diagram illustrating an operation flow of the reception apparatus according to the second exemplary embodiment.

A functional configuration and operation flow of the reception apparatus as described above will be described. FIG. 25 is a block diagram illustrating the functional configuration of the reception apparatus according to the second exemplary embodiment. FIG. 26 is a diagram illustrating the operation flow of the reception apparatus according to the second exemplary embodiment. Note that, in the following description, the extension classification includes only three types, Type A, Type B, and Type C, as described above.

As illustrated in FIG. 25, reception apparatus 40 includes extension identifier 41, extension classification determiner 42, change instruction checker 43, data update checker 44, and update data acquirer 45.

First, extension identifier 41 analyzes the extension identification of the TMCC control information (S161). When the extension identification is other than all 0 here, extension identifier 41 determines that the extension area is effective, and reception apparatus 40 executes the following processing for each extension area.

Next, extension classification determiner 42 discriminates (determines) the extension classification (S162). When it is discriminated that the extension classification is Type A (Type A in S162), data of an area specified by the extension area length is control information which does not change in value for each frame, the control information following a change instruction. Therefore, change instruction checker 43 checks the change instruction for each frame (S163).

Subsequently, data update checker 44 determines data update (S164). When it is determined that there is a change instruction and that there is a change in the extension data (Yes in S164), update data acquirer 45 acquires updated extension data and executes processing accompanying the change (S165).

On the other hand, when it is not determined as described above in step S164 (No in S164), update data acquirer 45 determines that there is no change in the extension data.

Also, when it is discriminated in step S162 that the extension classification is Type B (Type B in S162), update data acquirer 45 references data specified by the extension area length, acquires data updated for each frame, and executes processing accompanying the change (S167).

When it is discriminated in step S162 that the extension classification is Type C (Type C in S162), update data acquirer 45 executes processing based on the conventional reception method under the payload extension scheme (S166).

Note that, when it is discriminated that the extension area number, extension classification, and extension area length are classifications similar to Type A that follows the change instruction as described above, update data acquirer 45 checks change instructions. When there is a change instruction, update data acquirer 45 checks whether information is updated.

Note that reception apparatus 40 may determine reception processing based on the extension classification, and may determine in which processing block the data processing should be performed. Reception apparatus 40 may determine, for example, to process the data of Type A and the data of Type B by hardware, and to process the data of Type C by software.

Advantageous Effects, Etc.

As described above, the second exemplary embodiment has described the method for dividing the TMCC extension area under the advanced BS transfer scheme for each extension classification, and for storing the extension data in the TMCC extension area. In such a method, reception apparatus 40 determines the extension data processing method based on the extension classification.

This makes it possible to store a plurality of pieces of data with different reception processing in the TMCC extension area simultaneously. That is, this makes it possible to provide extensibility to the method for using the TMCC extension area.

Specifically, for example, it becomes possible to store the payload and the reference clock information in the extension area simultaneously.

Also, it becomes possible to cause the payload data extending over several frames and the payload data of only one frame to be included together in the TMCC extension area. Therefore, even while reception apparatus 40 cannot receive the payload data extending over several frames, reception apparatus 40 can first acquire the payload data of only one frame. Therefore, reception apparatus 40 can acquire and present urgent information more quickly.

Third Exemplary Embodiment

A third exemplary embodiment describes a method for transmitting a plurality of pieces of reference clock information that belong to different layers.

Summary

Figure 27:
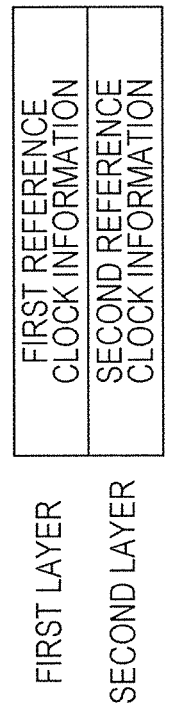
FIG. 27 is a diagram schematically illustrating an example in which the reference clock information is stored in each of a plurality of layers.

FIG. 27 is a diagram schematically illustrating an example in which the pieces of reference clock information are stored in the respective plurality of layers.

In the example of FIG. 27, a first layer is a layer upper than a second layer, and the first layer stores first reference clock information. The second layer stores second reference clock information.

A transmission apparatus basically performs MUX processing in the second layer after performing MUX processing in the first layer. Also, a reception apparatus basically performs DEMUX processing in the first layer after performing DEMUX processing in the second layer.

When storing the first reference clock information in the first layer and storing the second reference clock information in the second layer, as information that indicates a relationship between the first reference clock information and the second reference clock information, the transmission apparatus may store, for example, the following information.

As a first example, the transmission apparatus allows a transmission signal (for example, a transfer frame) to include information indicating that the plurality of pieces of reference clock information is stored within the transmission signal.

Specifically, in at least one or more layers among the layers in which the reference clock information is contained, the transmission apparatus stores information indicating that the reference clock information is stored also in layers other than the aforementioned layers.

In addition, in a layer in which the reference clock information is not contained, the transmission apparatus may indicate that the plurality of pieces of reference clock information is stored. For example, the transmission apparatus may store, in the lower layer (second layer), information that indicates whether the reference clock information is contained in the upper layer (first layer). In this case, the reception apparatus may determine whether to perform acquisition of the reference clock information and reproduction of a reference clock in the lower layer in processing in the lower layer taking into consideration whether the reference clock information is contained in the upper layer.

As a second example, the transmission apparatus allows the transmission signal to include information regarding the first reference clock information and the second reference clock information.

Specifically, the transmission apparatus stores, in each layer, information that indicates a type of the reference clock information contained in the layer concerned. Alternatively, the transmission apparatus stores, in each layer, information that indicates a type of reference clock information contained in a layer other than the layer concerned.

The reference clock information includes, for example, types such as 32-bit NTP, 64-bit NTP, and 24-bit SMPTE (Society of Motion Picture and Television Engineers) time code. The information that indicates the type of reference clock information is information that can specify a format (including information such as precision) of the reference clock information.

Note that, when it is known in advance that a predetermined type of reference clock information is contained, such information does not need to be included.

As a third example, the transmission apparatus allows the transmission signal to include information that indicates a relative relationship between the first reference clock information and the second clock information.

Specifically, the transmission apparatus allows the transmission signal to include information that indicates a relative relationship of precision of the reference clock information. For example, the transmission apparatus allows the transmission signal to include information that indicates whether precision of the second reference clock information is high or low with respect to precision of the first reference clock information.

In addition, such information that indicates the relative relationship may be information that indicates the relative relationship based on size of a total bit number of the reference clock information, and may be information that indicates the relative relationship of a dynamic range based on size of a bit number of an integer part.

Alternatively, the information that indicates the relative relationship may be information that indicates the relative relationship of precision of resolving power (resolution) based on size of a bit number of a decimal part. In addition, the information that indicates the relative relationship may be information that indicates the relative relationship of precision at a time of acquisition of the reference clock information, based on a difference in precision resulting from a difference in basic reliability of the reference clock information in the transmission apparatus, quality of a transfer channel, and throughput in transmission processing and reception processing.

In addition, the information that indicates the relative relationship may be information that indicates a difference in precision between each of the pieces of reference clock information. For example, when there is a difference in the decimal bit number, the information that indicates the relative relationship may be information that indicates the difference in the decimal bit number. The information that indicates the relative relationship may be information that indicates information that indicates whether the precision differs for each, and may be stored as the information that indicates the relative relationship only when the precision differs for each. Note that, when the relative relationship of precision is known in advance, such information that indicates the relative relationship of precision does not need to be included.

In a case where such information that indicates the relative relationship of precision is transmitted, when the transmitted information indicates that precision of the second reference clock information is low with respect to precision of the first reference clock information, the reception apparatus can perform control including avoiding performing acquisition and reproduction of the second reference clock information, performing acquisition and reproduction of the first reference clock information, and performing synchronous reproduction based on the first reference clock information. Alternatively, when the transmitted information indicates that precision of the second reference clock information is high with respect to precision of the first reference clock information, the reception apparatus can perform control including avoiding performing acquisition and reproduction of the first reference clock information, performing acquisition and reproduction of the second reference clock information, and performing synchronous reproduction based on the second reference clock information.

As a fourth example, the transmission apparatus allows the transmission signal to include information that indicates a relative relationship of time between the pieces of reference clock information. Specifically, the transmission apparatus transmits information that indicates relative time between the first reference clock information and the second reference clock information. For example, the transmission apparatus transmits the information that indicates relative time by using CRI_descriptor in an MMT scheme. Note that information may be included indicating whether the first reference clock information and the second reference clock information are generated based on an identical reference clock.

When each of the pieces of reference clock information is generated based on an identical reference clock, in the reception apparatus, there is usually a difference in acquisition timing between the first reference clock information and the second reference clock information. That is, a fixed time difference arises between each of End-to-End delays of respective pieces of the reference clock information.

Therefore, the transmission apparatus calculates a time difference $\Delta\_A$ between imparting timing of the first reference clock information and imparting timing of the second reference clock information, and stores the calculated time difference $\Delta\_A$ in the transmission signal as time corresponding to acquisition timing of the first reference clock information and the second reference clock information. The reception apparatus acquires the time difference $\Delta\_A$ from the transmission signal, and corrects the End-to-End delay difference between the first reference clock information and the second reference clock information based on the time difference $\Delta\_A$.

In addition, when each piece of the reference clock information is generated based on the reference clock of an identical format and when each piece of the reference clock information has a fixed delay difference $\Delta\_B$, the transmission apparatus stores and transmits information that indicates the fixed delay difference $\Delta\_B$ of the reference clock information. The reception apparatus acquires the delay difference $\Delta\_B$, and corrects the fixed delay difference of the reference clock based on the delay difference $\Delta\_B$.

In addition, when the reference clock on which each piece of the reference clock information is based has the fixed delay $\Delta\_B$, the transmission apparatus transmits a transmission signal that includes the fixed delay $\Delta\_B$ in the second layer, which is a lower layer.

In addition, when each piece of the reference clock information is generated based on the reference clock of an identical format, the second reference clock information may be represented with a difference from the first clock information based on the first reference clock information. In this case. The second reference clock information may be used as a base.

As a fifth example, when the plurality of pieces of reference clock information is stored, the transmission apparatus allows the transmission signal to include information on whether to use the reference clock information stored in a different layer. The transmission apparatus allows the transmission signal to include, for example, information as to instructions to use, in the first layer, the second reference clock information stored in the second layer. In this case, based on this information, the reception apparatus can decide to generate the second reference clock information and to output the generated second reference clock information in the first layer.

The information described above is stored in at least one or more layers. For example, regarding such information, the above-described information may be stored only in the first layer, and may be stored only in the second layer. Also, such information may be stored in both of the layers. Alternatively, in each layer, information regarding the reference clock information in the layer may be stored, and only information that indicates the relative relationship may be stored in at least one or more layers.

Note that the information that indicates the relative relationship is preferably stored in the lower layer (second layer). Alternatively, the information that indicates the relative relationship may be stored in a layer lower than the second layer (not illustrated in FIG. 27). The reception apparatus, which can acquire information regarding the reference clock information in the upper layer (first layer) when performing DEMUX processing in the lower layer (second layer), can perform higher-speed processing.

Note that a combination of the first layer and the second layer may be any combination. For example, the combination of the first layer and the second layer may be a combination of an MMT layer and an IP layer, a combination of an MMT layer and a transfer layer, and a combination of an IP layer and a transfer layer. In addition, for MMToverTS, the combination of the first layer and the second layer may be a combination of MMT and TS.

In addition, the aforementioned information is stored in a control signal of each layer. For example, under the MMT scheme, the aforementioned information is stored in a descriptor, table, message, or packet header information. Under an MPEG2-TS (Transport Stream) scheme, the aforementioned information is stored in a descriptor, table, section, or header information. In addition, the aforementioned information may be stored in TMCC or a slot header in the transfer layer. When a transfer scheme is DVB (Digital Video Broadcasting), the aforementioned information is stored in TPS (Transmission Parameters Signaling), L1 data, L2 data, P1 data, P2 data, and the like.

Note that the first reference clock information and the second reference clock information may be pieces of reference clock information of an identical type, and may be pieces of reference clock information of different types. Also, the first reference clock information and the second reference clock information may be pieces of reference clock information with different precision. The first reference clock information and the second reference clock information may be pieces of reference clock information based on an identical reference clock, and may be pieces of reference clock information based on different reference clocks.

In addition, the transmission apparatus may transmit three or more pieces of reference clock information, and may store the three or more pieces of reference clock information in three or more respective layers for transmission. In addition, the respective pieces of reference clock information may be stored in different fields within data structure in an identical layer. Another layer may exist between the first layer and the second layer.

The reference clock information, which is, for example, NTP, time code, and PTP (Precision Time Protocol), may be reference clock information other than these examples. In addition, the reference clock information may be another piece of information regarding time (for example, TOT (Time Offset Table) and TDT (Time Date Table)).

Figure 28:
FIG. 28 is a diagram schematically illustrating an example in which a plurality of pieces of the reference clock information is stored in one layer.

FIG. 28 is a diagram schematically illustrating an example in which a plurality of pieces of reference clock information is stored in one layer. In the example of FIG. 28, in the first layer is contained three pieces of reference clock information, that is, first reference clock information, second reference clock information, and third reference clock information.

Also in this case, the transmission apparatus may store information regarding the first reference clock information and the second reference clock information, information that indicates a relative relationship (of precision or time) between the first reference clock information and the second reference clock information, and the like.

Figure 29:
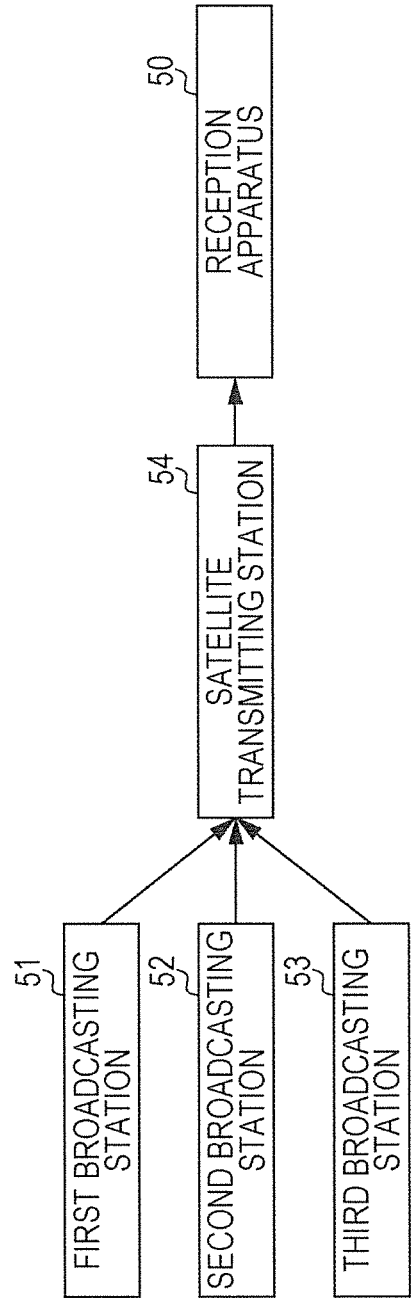
FIG. 29 is a block diagram for describing an example in which data of different broadcasting stations is stored in separate streams.

As one example, a case will be described of storing a plurality of pieces of reference clock information in TMCC. As described in FIG. 17, 16 streams can be transmitted under an advanced BS transfer scheme, and it is assumed that, for example, pieces of data of different broadcasting stations are stored in separate streams. FIG. 29 is a block diagram for describing an example in which the pieces of data of different broadcasting stations are stored in separate streams.

As illustrated in FIG. 29, each of first broadcasting station 51, second broadcasting station 52, and third broadcasting station 53 transmits data generated in each broadcasting station to satellite transmitting station 54 by using cables, such as an optical network, and radio. Satellite transmitting station 54 multiplexes the streams of respective broadcasting stations into an identical transfer channel under the advanced BS transfer scheme. Satellite transmitting station 54 stores in TMCC the pieces of reference clock information corresponding to the respective streams of the broadcasting stations, and transfers the pieces of reference clock information to reception apparatus 50.

In this case, in the example of FIG. 28, the first reference clock information corresponds to the reference clock information of first broadcasting station 51, the second reference clock information corresponds to the reference clock information of second broadcasting station 52, and the third reference clock information corresponds to third broadcasting station 53.

Meanwhile, in a case where each broadcasting station performs processing based on common reference clock information, such as NTP, each piece of reference clock information in satellite transmitting station 54 has a time difference due to a difference in the End-to-End delay caused by a reception processing delay or a transfer delay until arrival at the satellite transmitting station.

Here, when the common reference clock information to be used in each broadcasting station is NTP_base, the first reference clock information in the satellite transmitting station is denoted as NTP_base+Δ1, the second reference clock information is denoted as NTP_base+Δ2, and the third reference clock information is denoted as NTP_base+Δ3.

Figure 30:
FIG. 30 is a diagram for describing a transmission method of difference information.

In this case, as illustrated in FIG. 30, the transmission apparatus may transmit the common reference clock information NTP_base, and may transmit pieces of difference information between the respective pieces of reference clock information and the common reference clock information (Δ1, Δ2, Δ3). FIG. 30 is a diagram for describing a transmission method of the pieces of difference information. In addition, for example, out of 64-bit reference clock information, base reference clock information is represented with top 16 bits, and the difference information is represented with remaining 48 bits. This allows reduction in an amount of information (size) for transferring the reference clock information.

Note that the base reference clock information does not need to be NTP_base, but may be the earliest (with small delay) reference clock information among the plurality of pieces of reference clock information. Alternatively, the base reference clock information (reference value) may be a value smaller than a value of the earliest reference clock information.

Also, as illustrated in FIG. 31, the base reference clock information and the difference information may be transmitted at different frequencies; for example, the base reference clock information is transmitted for every frame, and the difference information is transmitted in order for every three frames. FIG. 31 is a diagram for describing a variation of the transmission method of the difference information. By the transmission method as illustrated in FIG. 31, the amount of information (size) for transferring the reference clock information can be reduced.

Reception apparatus 50 uses the base reference clock information to reproduce the base reference clock. After reproduction of the base reference clock information, reception apparatus 50 may use the difference information to generate each reference clock.

[Detailed Configuration and Operation Flow]

Figure 32:
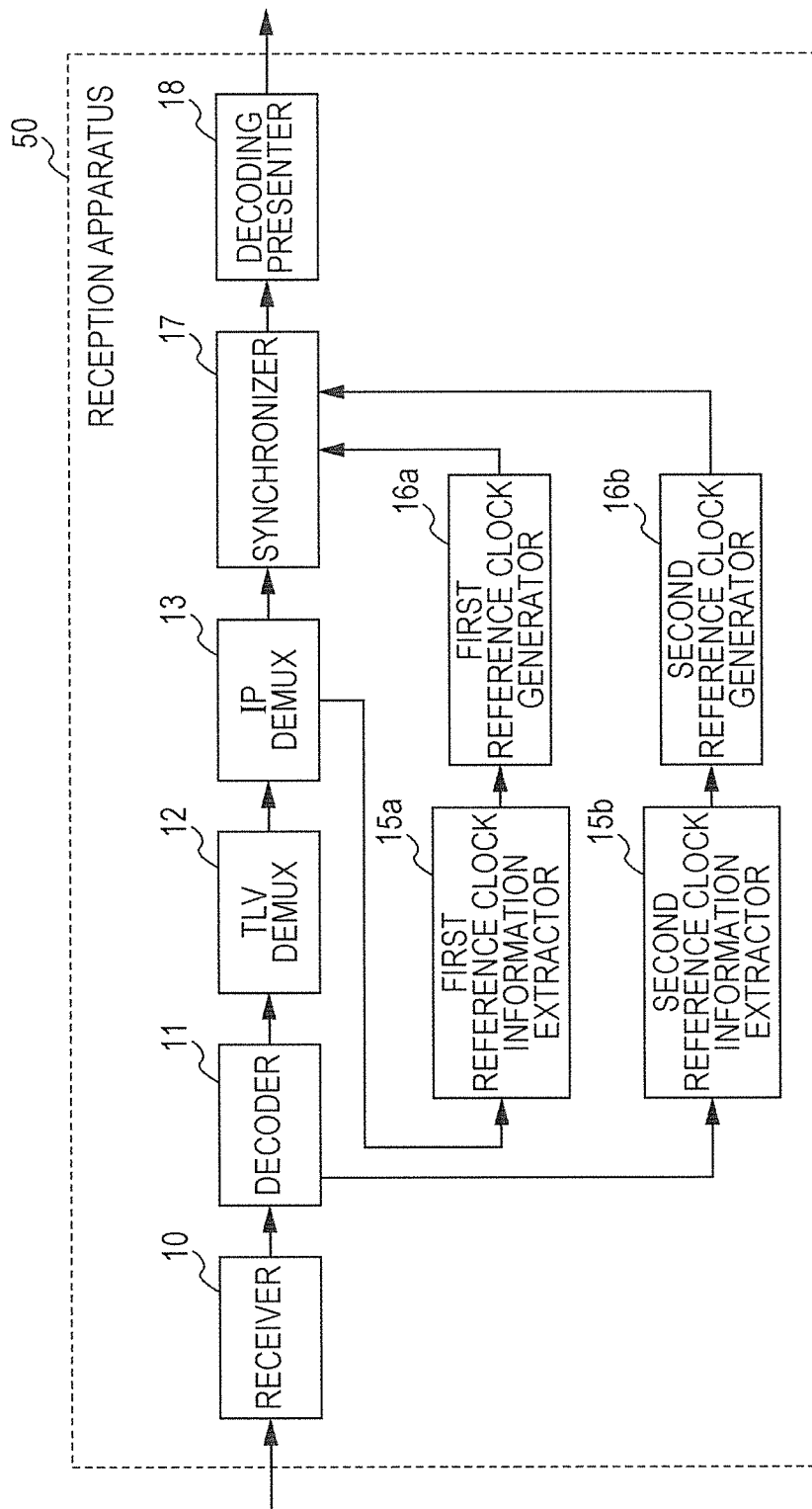
FIG. 32 is a block diagram illustrating a functional configuration of a reception apparatus according to a third exemplary embodiment.
Figure 33:
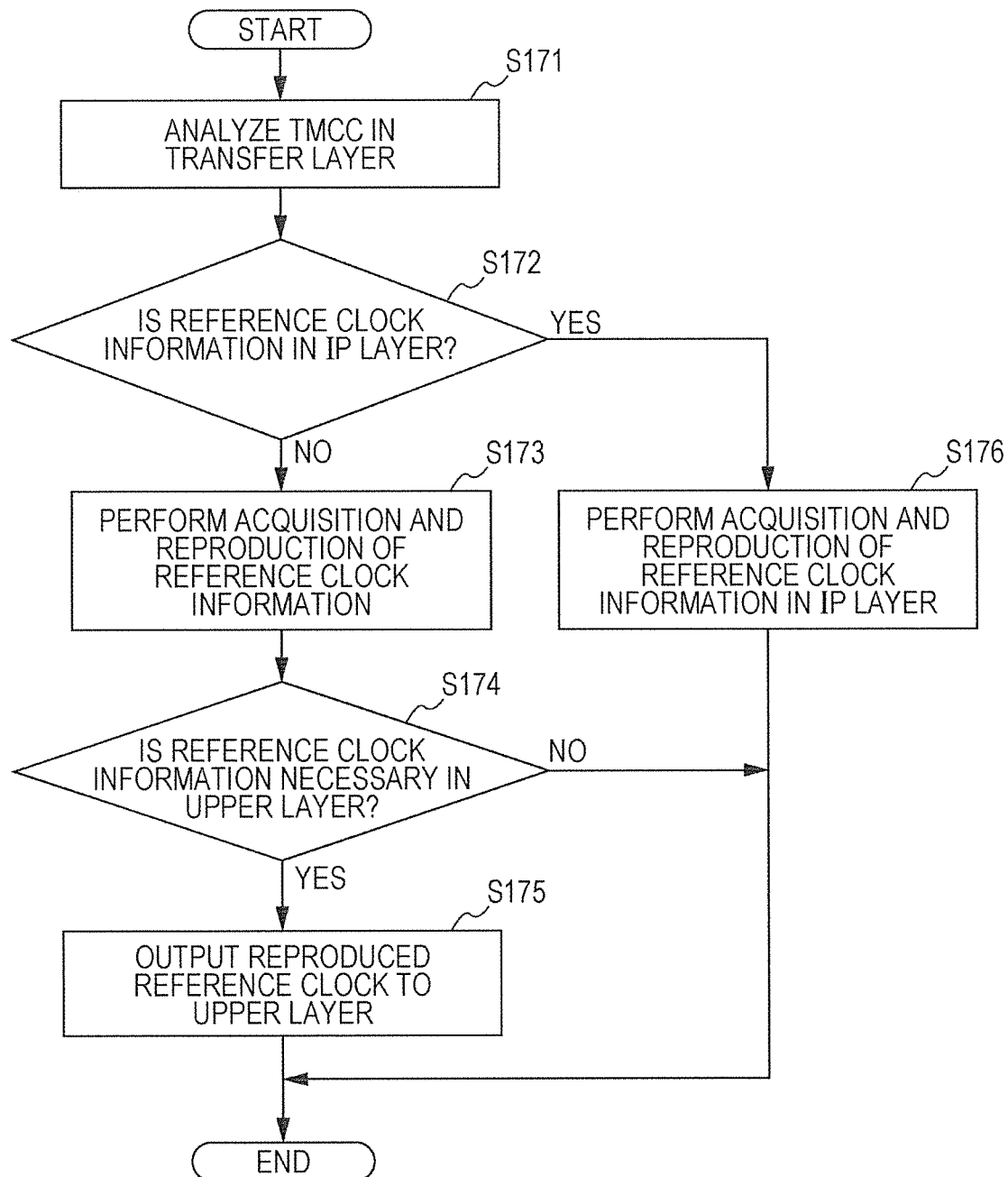
FIG. 33 is a diagram illustrating an operation flow of the reception apparatus according to the third exemplary embodiment.

Here, a functional configuration and operation flow of reception apparatus 50 will be described. FIG. 32 is a block diagram illustrating the functional configuration of reception apparatus 50. FIG. 33 is a diagram illustrating the operation flow of reception apparatus 50. Here, the following describes an example in which the reference clock information is stored in only either one of the IP layer and the transfer layer, and based on the reference clock information stored in either one of the IP layer and the transfer layer, reception apparatus 50 reproduces the reference clock.

Reception apparatus 50 includes receiver 10, decoder 11, TLV demultiplexer 12, IP demultiplexer 13, MMT demultiplexer 14, synchronizer 17, and decoding presenter 18. In addition, reception apparatus 50 includes first reference clock information extractor 15a, second reference clock information extractor 15b, first reference clock generator 16a, and second reference clock generator 16b.

A flag that indicates whether the pieces of reference clock information is in the IP layer is stored in control information of the transfer layer (such as slot header and TMCC, herein TMCC). In addition, when there is no reference clock information in the IP layer, the reference clock information is stored in the control information of the transfer layer.

In addition, in the control information of the transfer layer is stored, when there is no reference clock information in the IP layer, a flag that indicates whether the reference clock information acquired in the transfer layer is necessary for processing in the upper layer, or a flag that indicates whether the reproduced reference clock information is necessary for processing in the upper layer.

For example, when the reference clock information is 64-bit NTP, NTP is stored in a 64-bit field that indicates reference clock information. In addition, a flag that indicates whether the reference clock information is in the IP layer may be provided in the field for reference clock information. Since the reference clock information does not need to be stored in the transfer layer when the reference clock information is stored in the IP layer, the field may be utilized.

For example, in a case where a predetermined value (for example, ALL 1) is in the field for reference clock information when the reference clock information is in the IP layer, reception apparatus 50 determines that the value is not reference clock information but is the flag that indicates that the reference clock information is in the IP layer. Alternatively, a value based on a predetermined rule may be used as a flag; for example, when ALL 1 is indicated only once in the field for reference clock information, reception apparatus 50 determines that the reference clock information is in the field, and when ALL 1 is indicated continuously more often than a predetermined number of times, reception apparatus 50 determines that the reference clock information is in the IP layer.

Decoder 11 of reception apparatus 50 analyzes TMCC, which is control information, in the transfer layer, and analyzes various flags and the reference clock information (S171). Then, decoder 11 makes a determination based on the aforementioned flags (S172). When it is determined that the reference clock information is not in the IP layer (the reference clock information is in the transfer layer) (No in S172), second reference clock information extractor 15b acquires (extracts) the reference clock information in the transfer layer, and second reference clock generator 16b reproduces (generates) the reference clock.

Next, decoder 11 makes a determination on whether the reference clock reproduced in the transfer layer is necessary for processing in the upper layer (S174). When it is determined that the reference clock reproduced in the transfer layer is necessary for processing in the upper layer (Yes in S174), second reference clock generator 16b outputs the reference clock reproduced in step S174 to the upper layer (S175). When it is not determined that the reference clock reproduced in the transfer layer is necessary for processing in the upper layer (No in S174), the processing ends.

On the other hand, when it is determined that the reference clock information is in the IP layer (the reference clock information is not in the transfer layer) (Yes in S172), acquisition of the reference clock information and reproduction of the reference clock are not performed in the transfer layer. In this case, acquisition of the reference clock information and reproduction of the reference clock are performed in the IP layer by first reference clock information extractor 15a and first reference clock generator 16a, respectively (S176).

Note that, when reproduction of the reference clock is not necessary in the transfer layer, and when the upper layer does not need the reference clock, acquisition of the reference clock information and reproduction of the reference clock in the transfer layer (S173) do not need to be performed.

In addition, when the reference clock is necessary in the upper layer, instead of outputting the reproduced reference clock, the reference clock information may be passed to the upper layer, and reproduction of the reference clock may be performed in the upper layer. In addition, based on the reference clock reproduced in the transfer layer, reference clock information may be newly generated, and the generated reference clock information may be output to the upper layer.

Methods for outputting the reference clock to the upper layer include a method for outputting the reproduced reference clock as it is, and a method for storing or converting and outputting the acquired reference clock information or newly generated reference clock information into data structure to be output to the upper layer.

[Another Example of Operation Flow]

Figure 34:
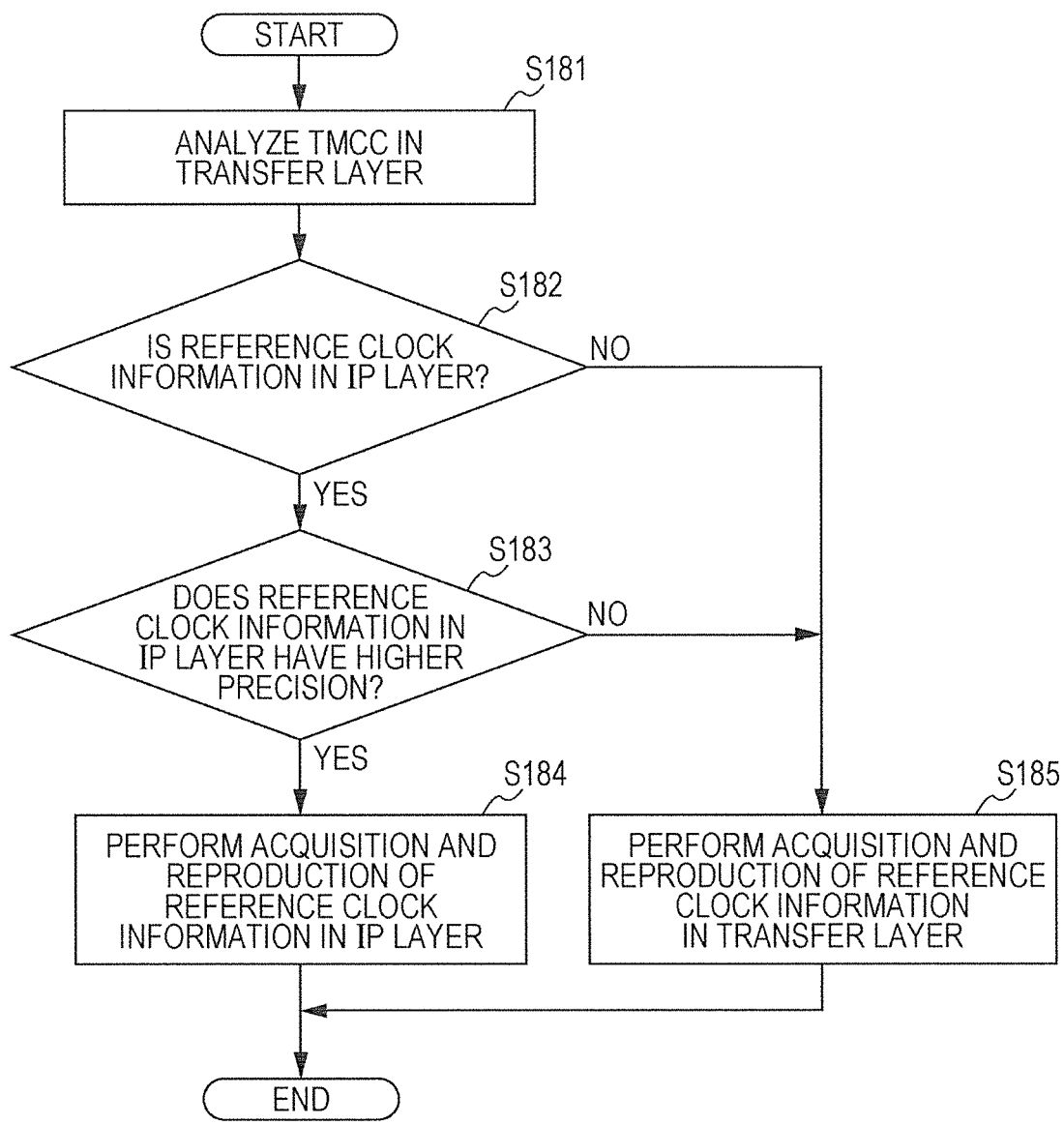
FIG. 34 is a diagram illustrating another operation flow of the reception apparatus according to the third exemplary embodiment.

Next, another operation flow of reception apparatus 50 will be described. FIG. 34 is a diagram illustrating another operation flow of reception apparatus 50. Note that the configuration of reception apparatus 50 is similar to the configuration of FIG. 32.

In the example of FIG. 34, the reference clock information may be stored in each of the IP layer and the transfer layer. When a plurality of pieces of reference clock information is stored, relative information on precision of the pieces of reference clock information is stored.

Decoder 11 analyzes TMCC (S181) and makes a determination based on the flags (S182). When it is determined that the reference clock information is not in the IP layer (No in S182), acquisition of the reference clock information and reproduction of the reference clock are performed in the transfer layer (S185).

On the other hand, when it is determined in step S182 that the reference clock information is in the IP layer (Yes in S182), decoder 11 determines which of the reference clock information in the transfer layer and the reference clock information in the IP layer has higher precision (S183). When it is determined that the reference clock information in the IP layer has higher precision than the reference clock information in the transfer layer (Yes in S183), acquisition of the reference clock information and reproduction of the reference clock are performed in the IP layer (S184). When it is determined that the reference clock information in the IP layer has lower precision than the reference clock information in the transfer layer (No in S183), acquisition of the reference clock information and reproduction of the reference clock are performed in the transfer layer (S185).

Advantageous Effects, Etc.

As described above, a plurality of pieces of reference clock information may be transmitted in one or more layers.

When the plurality of pieces of reference clock information is transmitted, reception apparatus 50 may select either one piece of the reference clock information to be used for generation of the reference clock (system clock), and may use both pieces of the reference clock information to generate the reference clock. At this time, reception apparatus 50 may select high-precision reference clock information, and may select reference clock information that can be acquired more quickly.

In addition, when the reference clock information is transmitted in a plurality of layers, information indicating that the reference clock information is transmitted in the plurality of layers may be stored on a transmission side. In addition, information indicating that the reference clock information is transmitted in the plurality of layers, or information related to the layers or protocols in which the reference clock information is transmitted may be transmitted in the lower layer. Furthermore, information that indicates a relationship between the pieces of reference clock information stored in different layers may be transmitted.

This allows reception apparatus 50 to determine that the reference clock information is contained in the upper layer during DEMUX processing in the lower layer, and to decide which reference clock information to use based on this determination. The decision on which reference clock information to use may be made based on which layer of reference clock reproduction reception apparatus 50 supports, and recommended reference clock reproduction may be specified by broadcasting stations.

When the reference clock information is transmitted in the plurality of layers, reception apparatus 50 may extract the reference clock information in the lower layer, and may extract, from the lower layer, the reference clock information contained in the upper layer. Then, reception apparatus 50 may use at least one or more pieces of extracted reference clock information to generate the reference clock.

Here, the plurality of pieces of reference clock information may be transmitted through a plurality of transfer channels. In this case, information indicating that the plurality of pieces of reference clock information is transmitted through the plurality of transfer channels, and information related to the transfer channels through which the reference clock information is transferred may be transmitted.

Other Exemplary Embodiments

While the exemplary embodiments have been described above, the present disclosure is not limited to the aforementioned exemplary embodiments.

For example, it is assumed that, in addition to the conventional 32-bit short-format NTP contained in the MMT packet header, higher-precision reference clock information is transmitted. In such a case, information for allowing the reception apparatus to use the high-precision reference clock information to reproduce the 32-bit short-format NTP is further transmitted from the transmission side. Such information is, for example, time information indicating a relative relationship between each of clocks, and a configuration for transmitting the information by using CRI_descriptor( ), etc. may be considered.

Note that, when the reception apparatus can reproduce the 32-bit short-format NTP, the conventional NTP field contained in the MMT packet header is unnecessary. Therefore, another piece of information may be stored in the NTP field, and header compression may be performed through reduction of the NTP field. When header compression is performed, information indicating that the NTP field is reduced is transmitted. When the NTP field is reduced, the reception apparatus generates the reference clock by using another piece of reference clock information, and reproduces the 32-bit short-format NTP.

In addition, when the MMT packet is transferred using a broadband transfer channel, the reception apparatus may use not the reference clock information but the 32-bit short-format NTP for QoS control. Accordingly, the reference clock information does not need to be transmitted through the broadband transfer channel. In addition, when the End-to-End delay of the broadband transfer channel is within a certain value, the reference clock information may be used for clock reproduction.

Note that although the aforementioned first exemplary embodiment has described the case where the MMT/IP/TLV scheme is used as an example, schemes other than the MMT scheme may be used as a multiplexing scheme. For example, the present disclosure may also be applied to an MPEG2-TS scheme, RTP scheme, or MPEG-DASH scheme.

In addition, methods for header compression of IP packets include ROHC (Robust Header Compression) and HCfB (Header Compression for Broadcasting).

Schemes for storing IP packets in broadcast include a GSE (Generic Stream Encapsulation) scheme, IPoverTS scheme using ULE (Unidirectional Light-weight. Encapsulation), and the like, in addition to the TLV scheme.

The present disclosure may be applied to a case where any of such schemes is used. Application of the present disclosure allows the reception apparatus to achieve shortening of time to the acquisition of the reference clock information and reduction in the processes, and to achieve high precision of the clock by hardware implementation.

Note that, while the reference clock information in the aforementioned exemplary embodiments is NTP when the multiplexing scheme is MMT, for example, when the multiplexing scheme is an MPEG2-TS scheme, the reference clock information is PCR (Program Clock Reference). Also, even when the multiplexing scheme is MMT, PTP prescribed by IEEE (Institute of Electrical and Electronics Engineers) 1588 may be transferred in an NTP form. Only some bits of NTP may be transferred. That is, the reference clock information only needs to be information indicating time that is set on a transmission side. Note that NTP does not necessarily mean an NTP value in an NTP server commonly used on the Internet.

Figure 35:
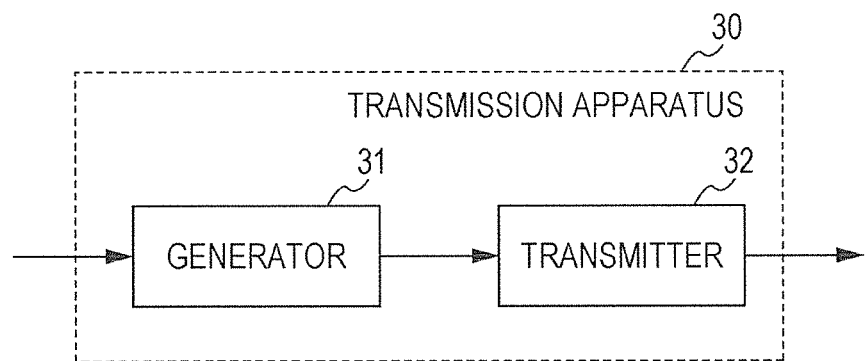
FIG. 35 is a block diagram illustrating a functional configuration of a transmission apparatus.
Figure 36:
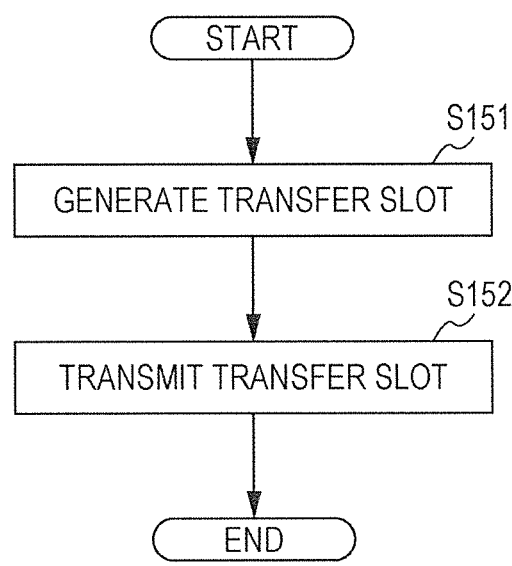
FIG. 36 is a diagram illustrating an operation flow of the transmission apparatus.

In addition, the present disclosure may be implemented as a transmission apparatus (transmission method) that transmits the transfer slot that stores the reference clock information by the aforementioned method. A configuration of such a transmission apparatus will be supplemented below. FIG. 35 is a block diagram illustrating a functional configuration of the transmission apparatus. FIG. 36 is an operation flow of the transmission apparatus.

As illustrated in FIG. 35, transmission apparatus 30 includes generator 31 and transmitter 32. Note that each component of transmission apparatus 30 is specifically implemented by a microcomputer, a processor, a dedicated circuit, or the like.

Transmission apparatus 30 is specifically a broadcasting server, and is an example of the aforementioned "transmission side" of the first exemplary embodiment.

Generator 31 generates, for example, a transfer slot that stores a plurality of slots that each store one or more TLV packets that each store an IP packet (S151 of FIG. 36).

At this time, generator 31 allows the IP packet stored in the TLV packet positioned at a head within the head slot within the transfer slot (hereinafter this IP packet is also referred to as an object IP packet) to contain the first reference clock information, such as NTP, that indicates time for playback of content (for example, broadcast content such as video and audio). At this time, the object IP packet is an IP packet that does not undergo header compression, and the first reference clock information is stored, for example, within the object IP packet in data structure different from data structure of the MMT packet.

In addition, generator 31 stores the second reference clock information that indicates time for playback of content in control information (TMCC) within the transfer slot.

Specifically, generator 31 includes a coder that codes the broadcast content, MMT multiplexer, IP multiplexer, TLV multiplexer, and the like. Here, the TLV packet is an example of a first transfer unit, the slot is an example of a second transfer unit, and the transfer slot is an example of a transfer frame.

Transmitter 32 transmits the transfer slot generated by generator 31 (transfer channel coded data containing the transfer slot) through broadcast (S152 of FIG. 36).

As also described in the aforementioned exemplary embodiments, such transmission apparatus 30 can simplify the processes by which the reception apparatus acquires the reference clock information. Therefore, this can shorten time until the reception apparatus acquires the reference clock information.

In addition, since the second reference clock information that indicates the time for playback of the content is stored in the control information within the frame, the reception apparatus can select which reference clock information to use from among the first reference clock information and the second reference clock information.

Fourth Exemplary Embodiment

The present exemplary embodiment describes a method for passing reference clock information to an upper layer and an interface thereof in a reception apparatus.

Figure 37:
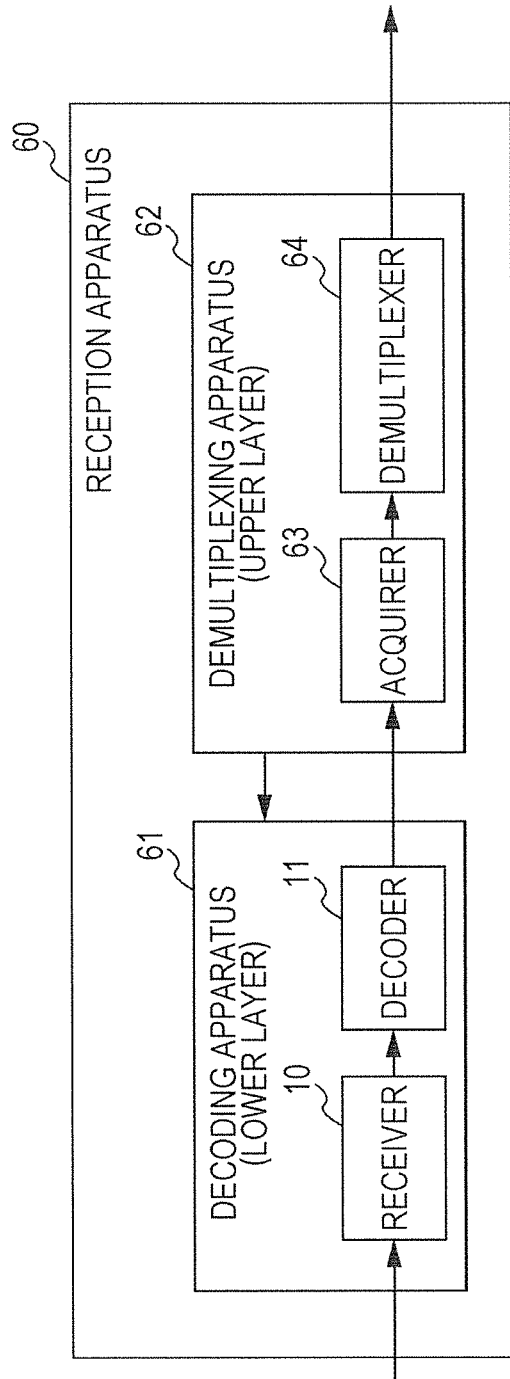
FIG. 37 is a block diagram of a reception apparatus according to a fourth exemplary embodiment.

FIG. 37 is a block diagram illustrating a configuration of reception apparatus 60 according to the present exemplary embodiment. Reception apparatus 60 includes decoding apparatus 61 that performs processes in a lower layer and demultiplexing apparatus 62 that performs processes in an upper layer. For example, decoding apparatus 61 and demultiplexing apparatus 62 are formed as different LSIs. Note that decoding apparatus 61 and demultiplexing apparatus 62 may be formed as a single LSI.

Decoding apparatus 61 includes receiver 10 and decoder 11. Receiver 10 receives transfer channel coded data. Decoder 11 extracts a TLV packet by decoding the transfer channel coded data received by receiver 10, and outputs the TLV packet to demultiplexing apparatus 62.

Demultiplexing apparatus 62 includes acquirer 63 and demultiplexer 64. Acquirer 63 acquires the TLV packet that is output from decoding apparatus 61. Demultiplexer 64 demultiplexes the TLV packet. For example, demultiplexer 64 includes processors other than receiver 10 and decoder 11 among processors illustrated in FIG. 32. Note that demultiplexer 64 may include processors other than receiver 10 and decoder 11 among processors included in reception apparatuses described in other exemplary embodiments. In addition, demultiplexer 64 does not need to include all of these processors, and may include only some of these processors. In addition, demultiplexing apparatus 62 controls output of decoding apparatus 61.

Capturing and detailed description are provided about a method by which, as described in FIG. 32 and FIG. 33, when the reference clock information is contained in the lower layer, decoding apparatus 61 of the lower layer passes the reference clock information to demultiplexing apparatus 62 without outputting a reproduced reference clock to demultiplexing apparatus 62 of the upper layer, and demultiplexing apparatus 62 reproduces the reference clock.

The following describes a method described in NPTL 2 (Chapter 3: "Guideline for Time Information Transmission" in ARIB Standard ARIB STD-B44 (Ver. 2.0) "TRANSMISSION SYSTEM FOR ADVANCED WIDE BAND DIGITAL SATELLITE BROADCASTING"), and transmission and reception of the reference clock based on data structure.

Although the aforementioned standard describes a method for storing the reference clock information in TMCC, this standard does not prescribe specific transmission time information and operations in the reception apparatus, and does not allow the reception apparatus to acquire accurate time information. For example, although this standard describes that "the reference clock information to be stored in TMCC is time when this TMCC signal leaves a transmission server", this is not a specific definition.

TMCC control information (TMCC control signal) is generated in a separate system from a main signal of a main line system for each transfer frame in a transmission apparatus. After error correction coding and an interleave process are performed, the TMCC control information is dispersively mapped in the main signal for one frame (the main signal is also a signal after the error correction coding and interleave process are performed).

Figure 38:
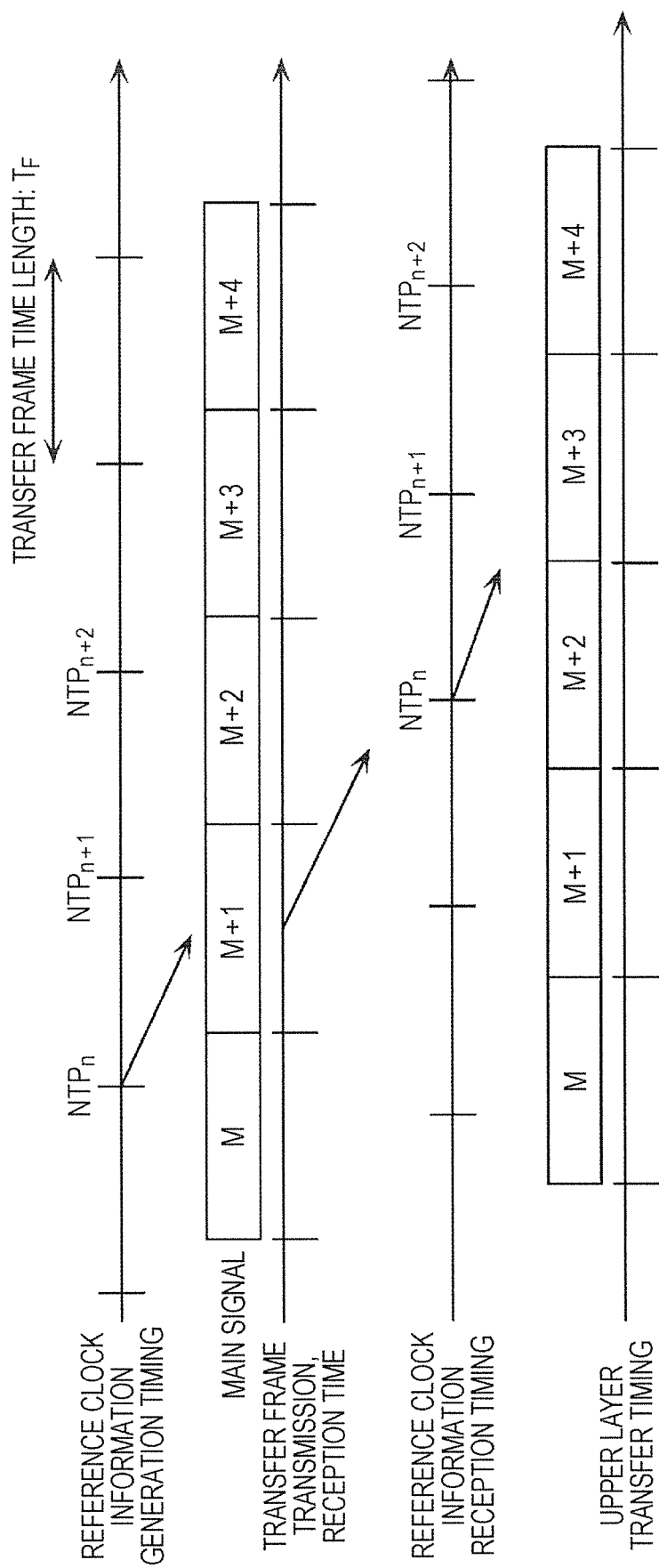
FIG. 38 is a diagram illustrating timing of a main signal and reference clock information according to the fourth exemplary embodiment.

FIG. 38 is a diagram illustrating timing of the main signal and the reference clock information.

When the reference clock information is stored in the TMCC control information, the reference clock information (NPTn, NPTn+1, . . . in FIG. 38) is generated at intervals of a transfer frame time length ($T_F$). After being generated, the reference clock information is transmitted in a transfer frame unit. At this time, during a period from generation of the reference clock information to transmission of the transfer frame, processing delay occurs caused by error correction coding, interleave process, transfer frame transmission timing, and the like. In FIG. 38, NTPn is stored in transfer frame M+1 and transferred, whereas NTPn+1 is stored in transfer frame M+2 and transferred. Here, description is provided assuming that transfer delay is 0 and transmission time and reception time of the transfer frame are identical.

The reception apparatus receives data of one transfer frame, performs the error correction process and deinterleave process, and then extracts the TMCC control information. Accordingly, reception timing of the reference clock information is delayed by one or more frames.

Similarly, processing delay also occurs in transmission and reception of the main signal of the main line system due to error correction and interleave process.

However, since delay time differs in each of transmission and reception between the main line system and a TMCC control information system, it is unclear to which time of the main line system time the time of the reference clock information acquired by the reception apparatus corresponds. In addition, timing is not prescribed at which to store in the upper layer the reference clock information acquired by the reception apparatus.

Therefore, according to the present exemplary embodiment, the reference clock information is stored in the TMCC control information by the following method.

The transmission apparatus sets, for example, time when the transfer frame of the main signal transmits a server (for example, time when a head packet of the transfer frame transmits the server) as the reference clock information to be stored in the TMCC control information.

The reception apparatus stores the reference clock information extracted from the TMCC control information at a head position of the next transfer frame, and then transfers the reference clock information to the upper layer.

By the above-described operation, a relative relationship caused by a difference in processing delay between the main line system and the TMCC control information system is an integral multiple of the transfer frame (N×$T_F$) (N is an integer).

Furthermore, correction of N×$T_F$ is performed in order to match a time relationship between the main line system and the reference clock information extracted from the TMCC control information.

When N can be uniquely determined in advance, the transmission apparatus may store the time on which the N×$T_F$ correction is performed in the TMCC control information, and the reception apparatus may correct the time. When N cannot be uniquely determined, the reception apparatus estimates N and corrects the time.

In addition, when the reference clock information is transferred in the main signal (TLV packet) in addition to the TMCC control information, the transmission apparatus stores, in the TMCC control information, time identical to time to be stored in the TLV packet. Alternatively, the transmission apparatus stores in the TMCC control information the time obtained by performing correction according to N×$T_F$ on the time to be stored in the TLV packet.

By applying correction of N×$T_F$ to time information extracted from the TMCC control information, the reception apparatus calculates the time identical to the time to be stored in the main signal, and outputs the calculated time to the upper layer.

Note that as a method for extracting the reference clock information from the TMCC control information and transferring the corrected reference clock information to the upper layer, the reception apparatus may replace and output the reference clock information within the TLV packet.

In addition, since time that serves as reference is identical between in the reference clock information stored in the TMCC control information and in the reference clock information stored in the TLV packet, it is possible to handle these pieces of reference clock information as identical information in the upper layer.

In addition, reception apparatus 60 may switch with a selecting switch or the like between a method for outputting only one of the reference clock information stored in the TMCC control information and the reference clock information stored in the TLV packet as a main signal (TLV packet), and a method for outputting both pieces of the information. In addition, demultiplexing apparatus 62 in the upper layer may select this switching in the lower layer. In addition, when decoding apparatus 61 is physically different from demultiplexing apparatus 62, one of the methods may be selected with a register or the like. In addition, when only one of the reference clock information stored in the TMCC control information and the reference clock information stored in the TLV packet is output, selection may be made which one to output.

Here, when the reference clock information is transferred in the main signal (TLV packet), the reference clock information is stored in a head TLV packet of a head slot of the TLV stream in the transfer frame. Therefore, decoding apparatus 61 can uniquely identify the TLV packet in which the reference clock information is stored in the transfer layer.

However, demultiplexing apparatus 62 of the upper layer, which cannot know boundary information of the transfer frame, can determine whether the received TLV packet contains the reference clock information after analysis of the TLV packet header and the IP packet header. Therefore, according to the present exemplary embodiment, decoding apparatus 61 of the lower layer performs signaling (notification) to demultiplexing apparatus 62 of the upper layer such that the TLV packet is a head of the TLV stream in the transfer frame, or that the TLV packet contains the reference clock information. Accordingly, demultiplexing apparatus 62 of the upper layer can detect that the TLV packet contains the reference clock information without analyzing the IP packet header.

Examples of the method for performing signaling that the TLV packet is a head of the TLV stream in the transfer frame or that the TLV packet contains the reference clock information include a method for utilizing an undefined region in a packet type of the TLV packet.

For example, when the reference clock information is contained in an IPV4 packet, decoding apparatus 61 rewrites the TLV type from the TLV type that indicates the IPV4 packet to the TLV type that indicates the IPV4 packet containing the reference clock information. Then, decoding apparatus 61 outputs the rewritten TLV packet to demultiplexing apparatus 62. In addition, when the reference clock information is contained in an IPV6 packet, decoding apparatus 61 rewrites the TLV type from the TLV type that indicates the IPV6 packet to the TLV type that indicates the IPV6 packet containing the reference clock information. Then, decoding apparatus 61 outputs the rewritten TLV packet to demultiplexing apparatus 62.

In addition, reception apparatus 60 may have a switch or the like that allows selection whether decoding apparatus 61 performs signaling to demultiplexing apparatus 62 that the TLV packet contains the reference clock information. For example, this selection may be performed by demultiplexing apparatus 62.

The above processes enable acquisition of high-precision reference clock information and clock reproduction.

Figure 39:
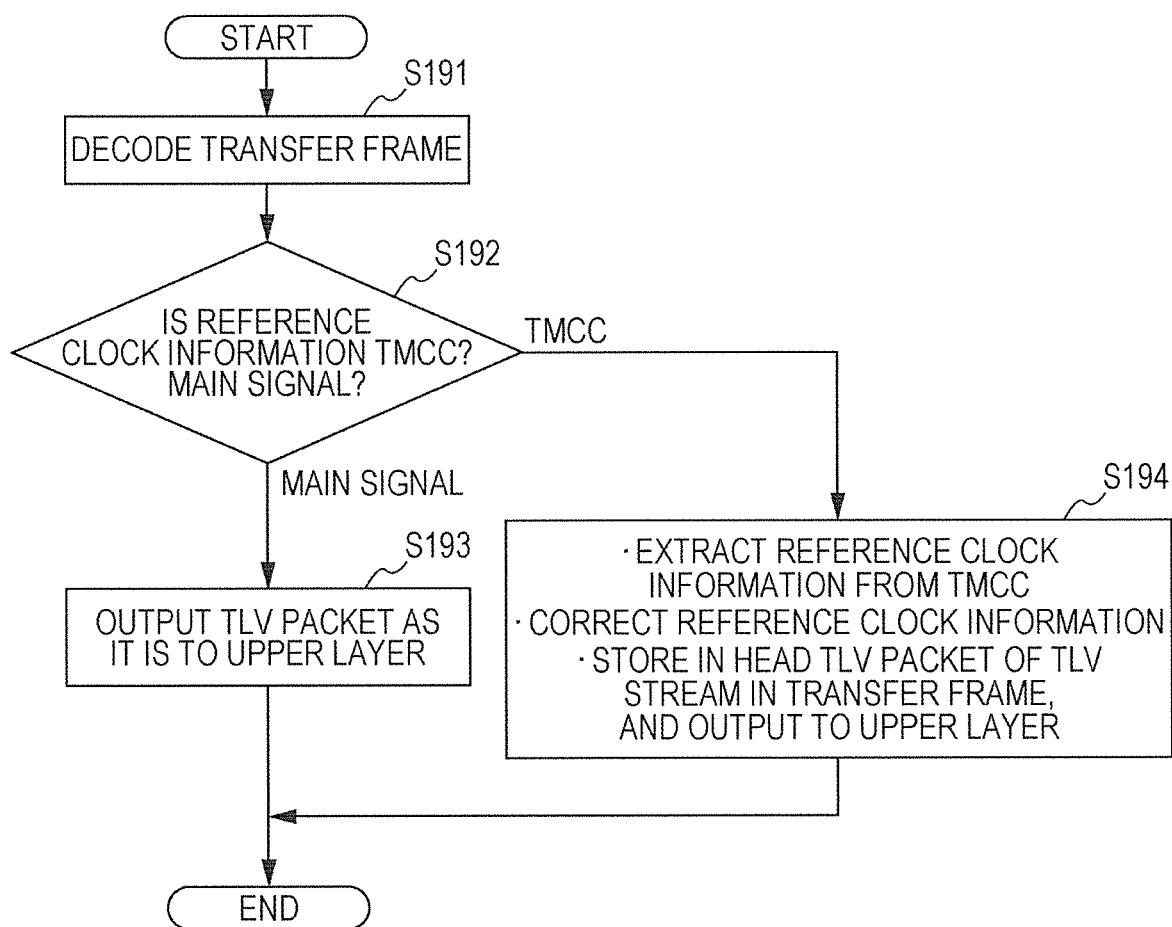
FIG. 39 is a diagram illustrating an operation flow in a decoder according to the fourth exemplary embodiment.

FIG. 39 is a diagram illustrating an operation flow in decoder 11 of reception apparatus 60.

First, decoder 11 decodes the transfer frame (S191), and subsequently determines whether the reference clock information to be processed is the reference clock information stored in TMCC or the reference clock information stored in the main signal (S192). When processing the reference clock information stored in the main signal (main signal in S192), decoder 11 outputs the TLV packet as it is to the upper layer (S193). Meanwhile, when processing the reference clock information stored in the TMCC control information (TMCC in S192), decoder 11 extracts the reference clock information from the TMCC control information, corrects the extracted reference clock information, stores the corrected reference clock information in the head TLV packet of the TLV stream in the transfer frame, and outputs the TLV packet to demultiplexing apparatus 62 (S194).

Figure 40:
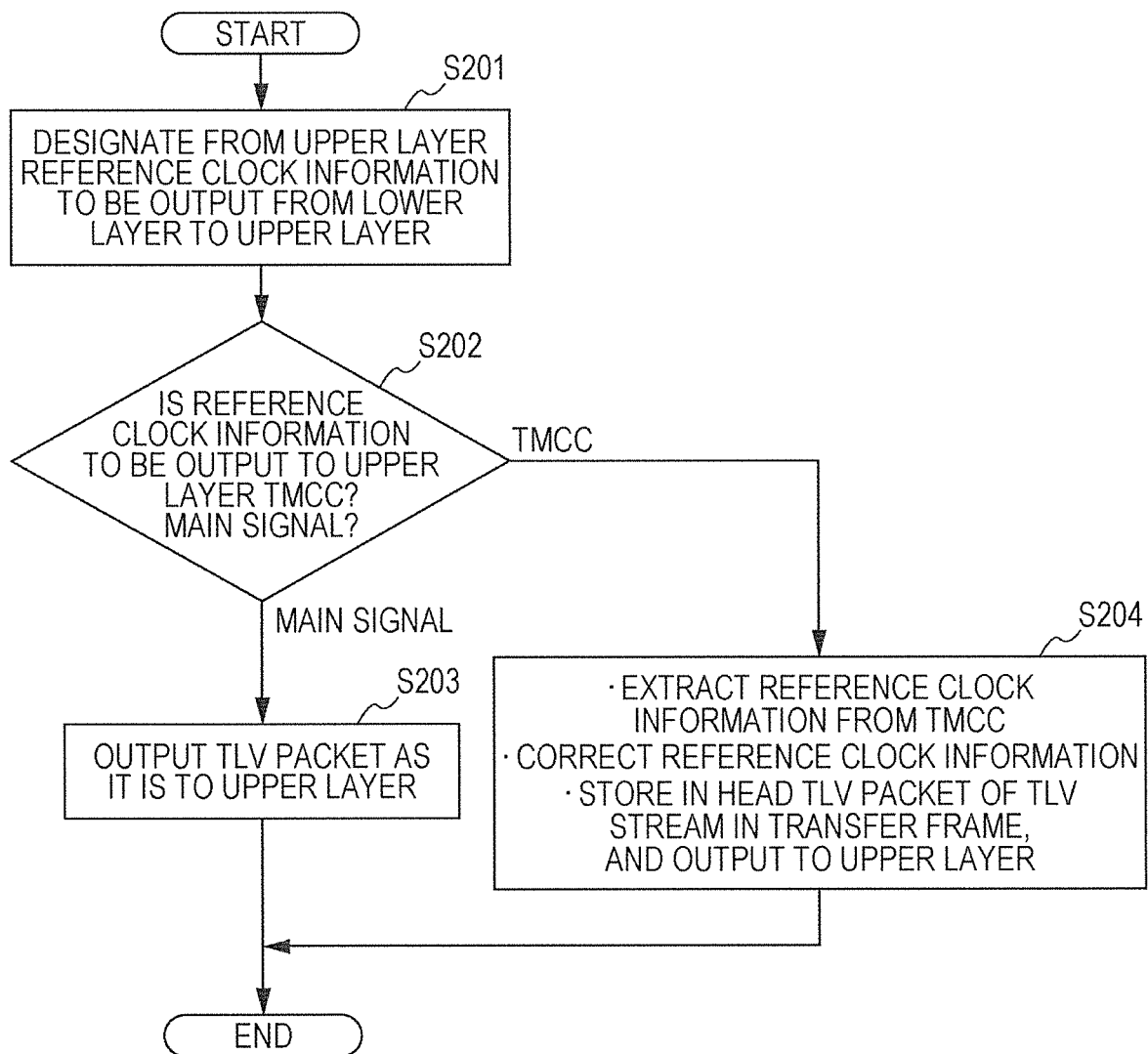
FIG. 40 is a diagram illustrating an operation flow in the reception apparatus according to the fourth exemplary embodiment.

FIG. 40 is a diagram illustrating an operation flow in reception apparatus 60 including decoder 11.

First, demultiplexing apparatus 62 (upper layer) designates the reference clock information to be output to demultiplexing apparatus 62 from decoding apparatus 61 (S201). When the reference clock information to be output to demultiplexing apparatus 62 is the reference clock information contained in the main signal (main signal in S202), decoding apparatus 61 outputs the TLV packet as it is to demultiplexing apparatus 62 (S203). Meanwhile, when the reference clock information to be output to demultiplexing apparatus 62 is the reference clock information stored in the TMCC control information (TMCC in S202), decoding apparatus 61 extracts the reference clock information from the TMCC control information, corrects the extracted reference clock information, stores the corrected reference clock information in the head TLV packet of the TLV stream in the transfer frame, and outputs the TLV packet to demultiplexing apparatus 62 (S204).

Figure 41:
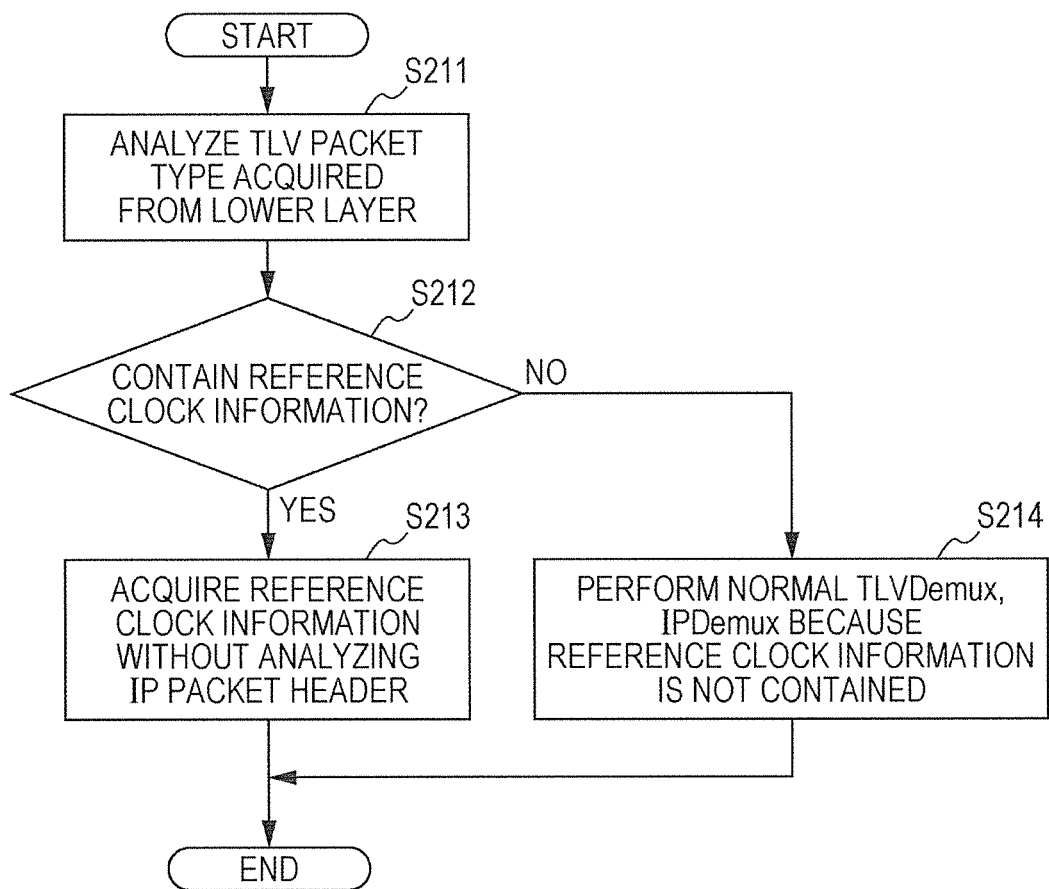
FIG. 41 is a diagram illustrating an operation flow in an upper layer according to the fourth exemplary embodiment.

FIG. 41 is a diagram illustrating an operation flow in demultiplexing apparatus 62 when decoding apparatus 61 performs signaling in the TLV packet type about whether the TLV packet contains the reference clock information.

First, demultiplexing apparatus 62 analyzes the packet type of TLV packet acquired from decoding apparatus 61 (S211) to determine whether the TLV packet contains the reference clock information (S212).

When the TLV packet contains the reference clock information (Yes in S212), demultiplexing apparatus 62 acquires the reference clock information without analyzing the IP packet header (S213). This enables reduction in processing time and reduction in the amount of processes.

Meanwhile, when the TLV packet does not contain the reference clock information (No in S212), demultiplexing apparatus 62 performs normal TLVDemux and IPDemux because the TLV packet does not contain the reference clock information (S214).

Note that when an IP data flow of broadcasting services has two types including an IP data flow that stores the MMT packet and an IP data flow that stores the reference clock information, reception apparatus 60 identifies the reference clock information in accordance with the TLV packet type, eliminating the need for analysis of the IP address. This is because, by identifying the reference clock information in accordance with the TLV packet type, there is one IP data flow that stores the reference clock information and one IP data flow that stores the MMT packet, eliminating the need for analysis of the IP address for identifying the IP data flow that stores the MMT packet.

As described above, decoding apparatus 61 and demultiplexing apparatus 62 according to the present exemplary embodiment perform the following processes.

Figure 42:
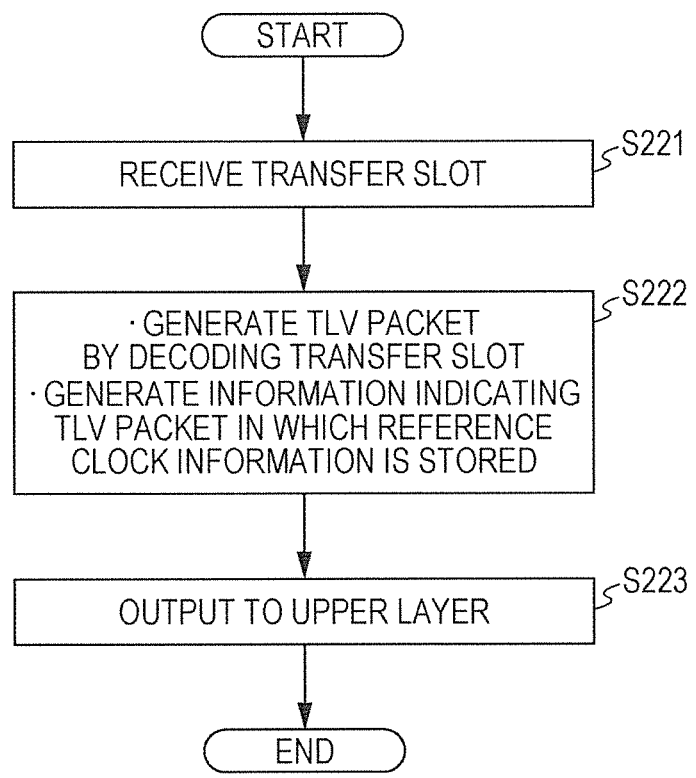
FIG. 42 is a diagram illustrating an operation flow of a decoding apparatus according to the fourth exemplary embodiment.

FIG. 42 is a diagram illustrating an operation flow in decoding apparatus 61 according to the present exemplary embodiment.

First, receiver 10 receives the transfer slot (S221). The transfer slot is a transfer frame that stores a plurality of slots (second transfer units) that each contain one or more TLV packets (first transfer units) obtained by multiplexing the content, as illustrated in FIG. 13. In addition, as described above, the TLV packet positioned at a head within the head slot within the transfer slot contains the reference clock information.

Next, decoder 11 acquires a plurality of TLV packets by decoding the transfer slot. In addition, decoder 11 further generates information for identifying the TLV packet positioned at a head within the head slot within the transfer slot (S222).

Specifically, decoder 11 stores information indicating that the TLV packet contains the reference clock information as management information (packet type) of the TLV packet stored in the TLV packet positioned at a head within the head slot within the transfer slot. Alternatively, the information for identifying the TLV packet positioned at a head within the head slot within the transfer slot is information that indicates the TLV packet positioned at a head within the head slot within the transfer slot among the plurality of TLV packets within the transfer slot.

That is, decoder 11 generates the information for identifying the TLV packet positioned at a head within the head slot within the transfer slot, and notifies the information to demultiplexing apparatus 62. Specifically, decoder 11 adds the information within the TLV packet, or notifies the information to demultiplexing apparatus 62 by another signal.

Next, decoder 11 outputs the TLV packet containing the information, or the TLV packet and the information to demultiplexing apparatus (S223).

Figure 43:
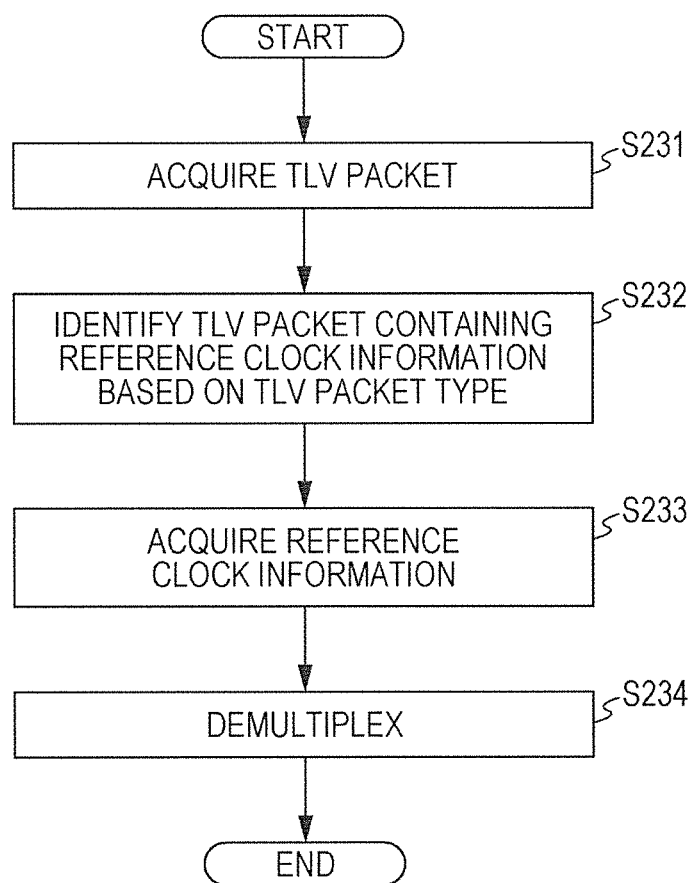
FIG. 43 is a diagram illustrating an operation flow of a demultiplexing apparatus according to the fourth exemplary embodiment.

FIG. 43 is a diagram illustrating an operation flow in demultiplexing apparatus 62 according to the present exemplary embodiment.

First, acquirer 63 acquires the transfer slot from decoding apparatus 61 (S231). Here, when each of the TLV packets contains the reference clock information, the TLV packet contains the management information (packet type) indicating that the TLV packet contains the reference clock information.

Demultiplexer 64 identifies the TLV packet containing the reference clock information based on the management information (S232), and acquires the reference clock information from the identified TLV packet (S233). In addition, demultiplexer 64 acquires the content by demultiplexing the plurality of TLV packets (S234).

As described above, in reception apparatus 60 according to the present exemplary embodiment, the information for identifying the TLV packet containing the reference clock information is notified from decoding apparatus 61 to demultiplexing apparatus 62. This allows demultiplexing apparatus 62 to acquire the reference clock information without analyzing the IP packet header and the like, achieving reduction in the amount of processes and high speed.

Fifth Exemplary Embodiment

The present exemplary embodiment provides a supplementary description of the method, which has been described with reference to FIG. 11 to FIG. 17, for storing a TLV packet that contains reference clock information into a head TLV in the first slot of each relative stream of a transfer frame (transfer slot). Here, one transfer frame includes one or plural relative streams.

The pointer/slot information in the TMCC control signal shown in FIG. 16 indicates a head location of the first packet and an end location of the last packet, included in each slot. A top pointer value indicates the location of the first byte of the first packet in the slot by the number of bytes counted from a slot header excluding the slot header. Note that "0xFFFF" indicates that the first byte is absent. A last pointer value indicates the value obtained by adding 1 to the number of bytes counted from a slot header excluding the slot header up to the final byte of the last packet, in the slot, of which the placement has been completed. Note that "0xFFFF" indicates that the final byte is absent.

Figure 45:
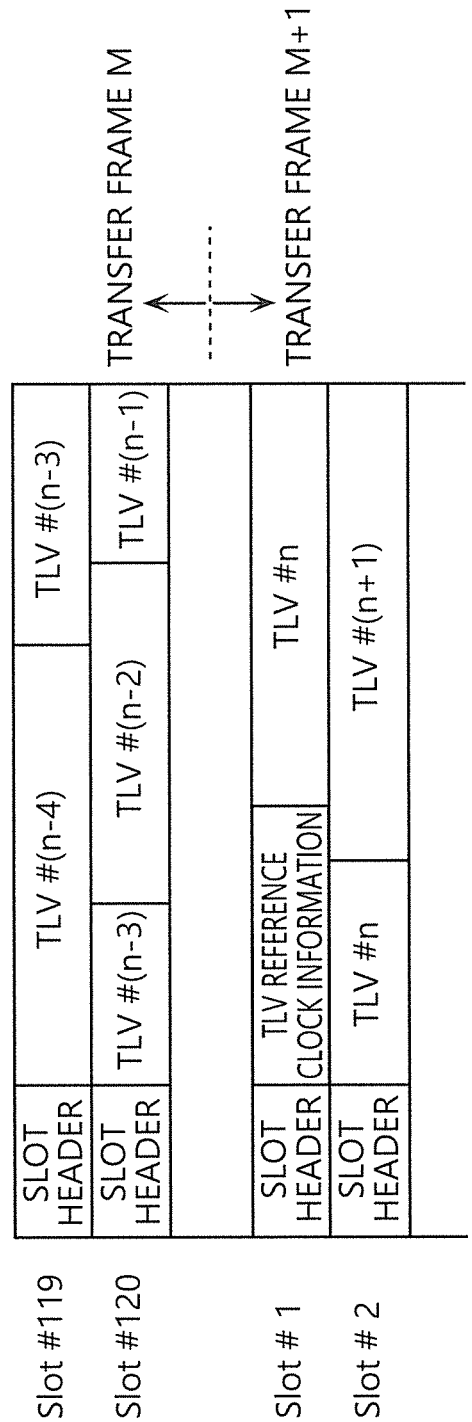
FIG. 45 shows a structure of the transfer frame according to the fifth exemplary embodiment.

For example, in the example of Slot #120 shown in FIG. 45, the top pointer indicates the first byte location of TLV #(n−2) whereas the last pointer indicates the value (first byte location of TLV #(n−1)) obtained by adding 1 to the final byte location of TLV #(n−2).

In the case where a TLV packet containing reference clock information is stored in the head of the first slot for each relative stream, the top pointer value in the slot/pointer information of the slot indicates 0. Naturally, a TLV packet is not stored across the frames, and shall be stored so that the location of the final byte of the last TLV packet stored in the last slot of each relative stream (hereinafter referred to as "final TLV packet") corresponds to the location of the final byte of the last slot of each relative stream (hereinafter referred to as "frame boundary of each relative stream").

Figure 44:
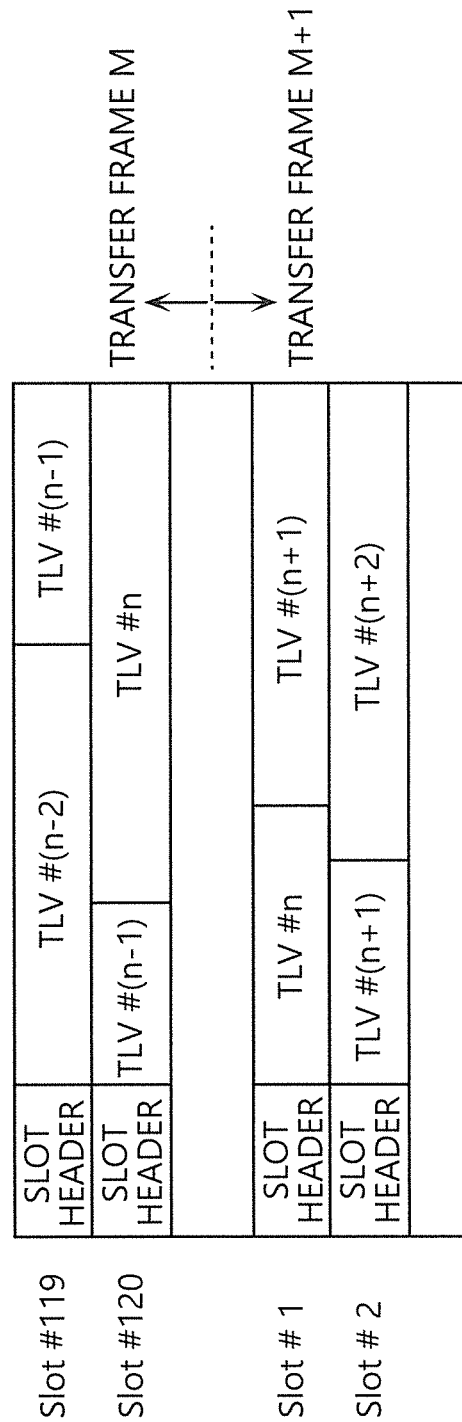
FIG. 44 shows a structure of a transfer frame according to a fifth exemplary embodiment.

FIG. 44 shows a structure of the transfer frame that does not include reference clock information, and FIG. 45 shows a structure of the transfer frame that includes reference clock information in the head of the first slot.

Here, the case where one frame is made up of 120 slots and all of the 120 slots make one relative stream is shown as an example. Slot #120 is the last slot of the relative stream of the transfer frame M, Slot #1 is the first slot of the relative stream of the transfer frame M+1, and the final byte of Slot #120 of the transfer frame M and the first byte, excluding the slot header, of Slot #1 of the transfer frame M+1 are the frame boundary of the TLV stream.

In FIG. 44, TLV #n is placed across the frames. In contrast, in FIG. 45, the TLV packet is not placed across the frames because the reference clock information is placed in the first slot (Slot #1) of the relative stream. In other words, the final byte of Slot #120 of the transfer frame M shall be placed so that its location corresponds to the location of the final byte of TLV #(n−1).

Here, transfer control information, an IP packet, or a compressed IP packet is stored in a TLV packet which has a variable-length packet size. When the variable-length TLV packets are sequentially placed into fixed-length transfer frames, the end of the final TLV packet does not coincide with a frame boundary in some cases. In such case, by placing a TLV packet having a data type that is NULL, the final byte of the final TLV packet can be adjusted to coincide with the frame boundary. Here, the NULL packet having the data type NULL is a packet for storing the data which is invalid and is not used in the reception apparatus.

Figure 46:
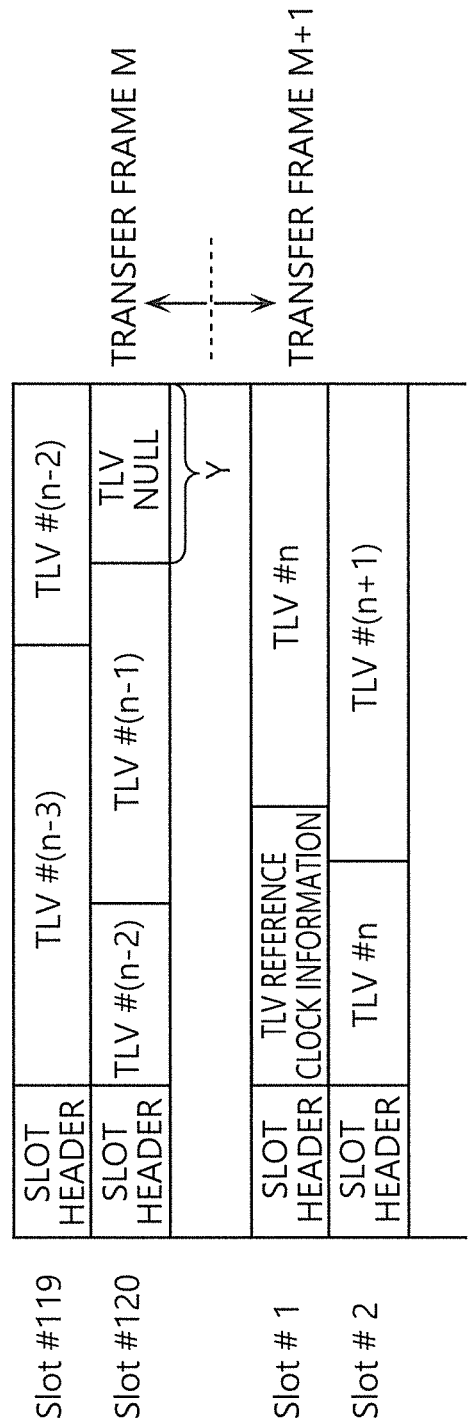
FIG. 46 shows a structure of the transfer frame according to the fifth exemplary embodiment.

As shown in FIG. 46, the TLV packets are placed into the frames for each relative stream. After the TLV packet TLV #(n−1) has been placed into a frame, a NULL packet is placed instead of the packet TLV #n because the packet TLV #n cannot be placed into the same frame. Accordingly, the final byte of the NULL packet coincides with the frame boundary.

However, in some cases, due to the data structure of the TLV packet, the restrictions on the transmission apparatus or the reception apparatus, and the like, minimum and maximum values might be provided for the size of the TLV packet. For example, because the header of the TLV packet is 4 bytes, even when NULL of 0 bytes is placed in the payload of the TLV packet, the TLV packet size is 4 bytes. Therefore, the minimum value of the TLV packet size in this case is 4 bytes. Moreover, due to the restrictions on the transmission apparatus or the reception apparatus, or the restrictions defined by the standards, the minimum value may also be restricted to a greater number of bytes (for example, 20 bytes). Similarly, the maximum value of the TLV packet size can be restricted in some cases.

For example, when the minimum value of the TLV packet is X_min bytes, the maximum value is X_max bytes, and the remaining bytes up to the frame boundary after the packet TLV #(n−1) has been placed is Y bytes, a NULL packet cannot be placed when Y<X_min. For example, when X_min is 4 bytes, a NULL packet cannot be placed when the remaining bytes is less than 4 bytes.

The following describes the method according to the present exemplary embodiment.

In the present exemplary embodiment, in the operation of sequentially placing TLV packets into a transfer frame and placing a NULL packet in the end, the remaining bytes up to a frame boundary and the numbers of bytes of at least two or more TLV packets to be stored are considered in advance so that the NULL packet is placed appropriately.

For example, a NULL packet is placed according to the following rules.

Figure 47:
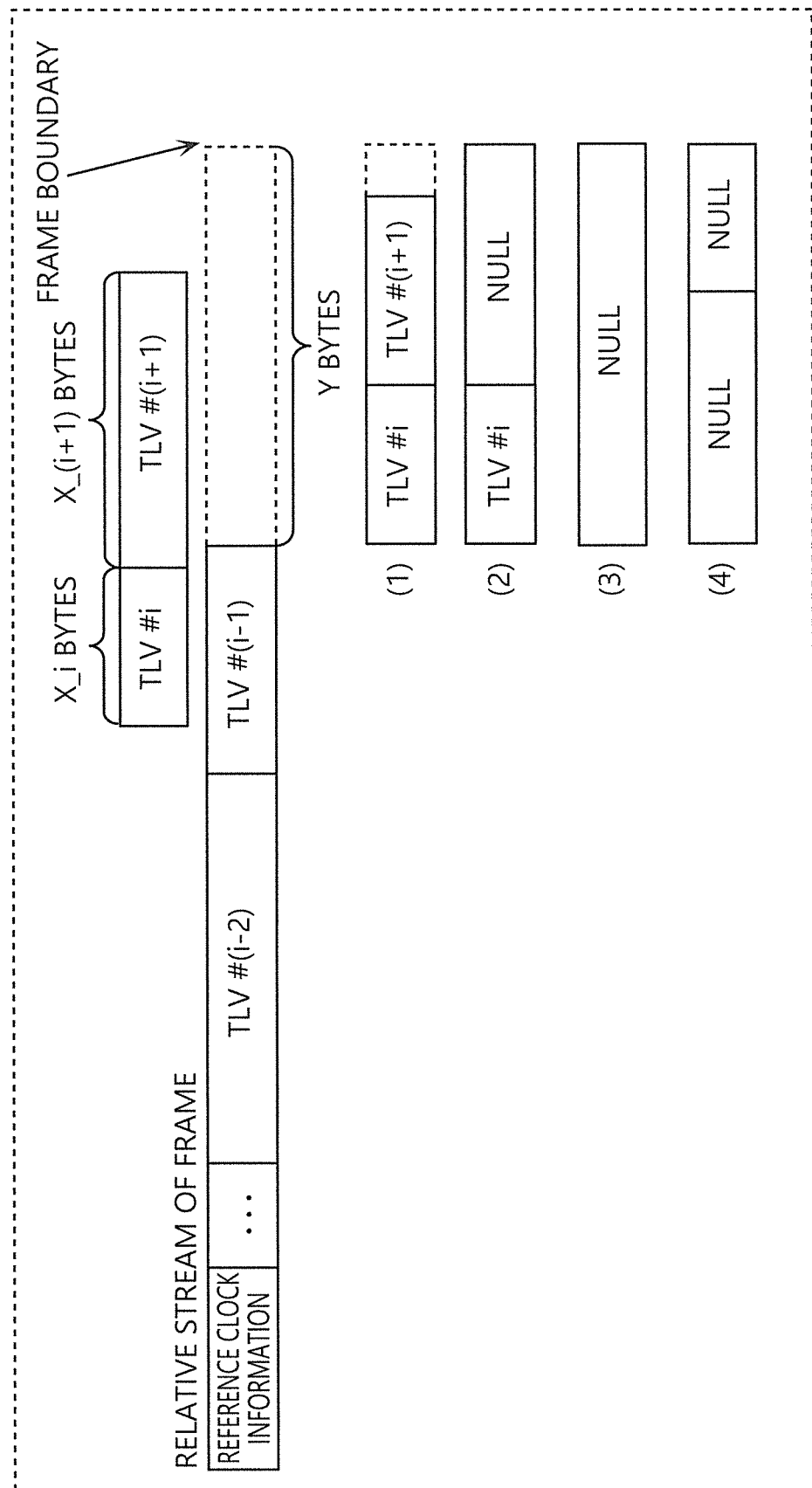
FIG. 47 is a diagram illustrating a transmission method according to the fifth exemplary embodiment.
Figure 48:
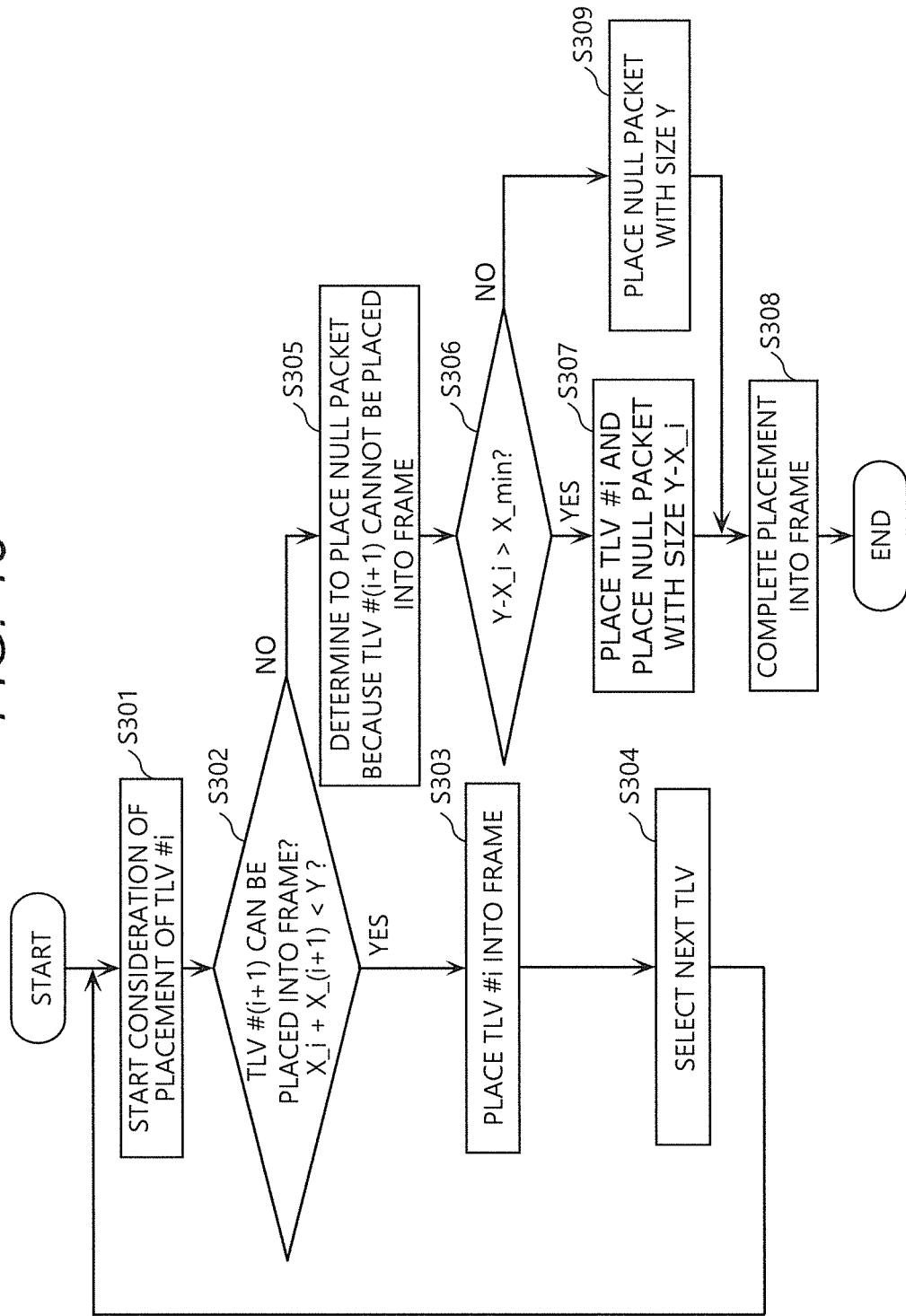
FIG. 48 is a diagram illustrating an operation flow in a transmission apparatus according to the fifth exemplary embodiment.

FIG. 47 is a diagram for illustrating the transmission method according to the present exemplary embodiment. In the relative stream of the frame, it is assumed that the remaining bytes up to the frame boundary is Y, the minimum packet size of the TLV packet is X_min bytes, the maximum packet size of the TLV packet is X_max bytes, the size of the TLV packet (TLV #i) to be placed is X_i bytes, and the size of the next TLV packet (TLV #(i+1)) is X_(i+1). FIG. 48 is a flowchart showing the operation performed by the transmission apparatus according to the present exemplary embodiment.

First, the transmission apparatus considers a placement of TLV #i that is a current TLV packet to be processed, into a frame (S301). Next, the transmission apparatus judges whether or not TLV #(i+1) that is the TLV packet following TLV #i can be placed into the frame (S302). Specifically, the transmission apparatus judges whether the total size of TLV #i and TLV #(i+1) is smaller than the remaining bytes. In other words, the transmission apparatus judges whether X_i+X_(i+1)<Y is satisfied.

In the case where TLV #(i+1) can be placed into the frame (Yes in S302), the transmission apparatus places TLV #i into the frame (S303), as shown in (1) in FIG. 47. Next, the transmission apparatus selects TLV #(i+1) following TLV #i (S304) and performs the processing of Step S301 and the subsequent processing for the selected TLV #(i+1). In this case, i in each processing is incremented by 1.

In contrast, in the case where TLV #(i+1) cannot be placed into the frame (No in S302), the transmission apparatus determines to place a NULL packet into the remaining area (S305).

Next, the transmission apparatus judges whether the remaining area after the placement of TLV #i is greater than the minimum value of the TLV packet (S306). Namely, the transmission apparatus judges whether Y−X_i>X_min is satisfied.

In the case where the remaining area after the placement of TLV #i is greater than the minimum value of the TLV packet (Yes in S306), the transmission apparatus places TLV #i into the frame, generates a NULL packet with the size Y−X_i, places the generated NULL packet after TLV #i in the frame (S307), and completes the placement of the TLV packet into the frame (S308), as shown in (2) in FIG. 47.

In contrast, in the case where the remaining area after the placement of TLV #i is smaller than the minimum value of the TLV packet (No in S306), the transmission apparatus does not place the packet TLV #i but places a NULL packet of Y bytes into the frame (S309), as shown in (3) in FIG. 47, and completes the placement of the TLV packet into the frame (S308).

Note that, although not shown in FIG. 48, in the case where Y>X_max is satisfied, the transmission apparatus may place two or more NULL packets into the frame, as shown in (4) in FIG. 47.

As has been described above, in the case where a minimum value of a variable-length NULL packet size is restricted when variable-length TLV packets are stored into a fixed-length data area (or the number of slots), in a frame, which is defined for each relative stream, the transmission apparatus according to the present exemplary embodiment always monitors, for instance, the numbers of bytes of at least two variable-length TLV packets and the remaining bytes up to a frame boundary. Thus, the final TLV packet can be adjusted to coincide with the frame boundary.

Note that the example in FIG. 47 illustrates the method for placing a TLV packet after considering in advance the remaining bytes up to a frame boundary and the numbers of bytes of the two TLV packets to be placed. However, the transmission apparatus may place a NULL packet after considering the numbers of bytes of three or more TLV packets.

In addition, in the example in FIG. 47, the transmission apparatus judges whether it is the end of a frame in Step S302, and in the case where it is the end of a frame (No in S302), the transmission apparatus places a NULL packet only or both the packet TLV #i and a NULL packet according to whether the remaining area after the placement of TLV #i is greater than the minimum value of the TLV packet. However, in the case of not judging in advance whether it is the end of a frame, the transmission apparatus can place a NULL packet after considering the number of bytes of only one TLV packet (TLV #i).

For example, in the case where: (1) the size of TLV #i is smaller than the remaining bytes Y; and (2) the remaining area Y-Xi after the placement of TLV #i is greater than the minimum value of the TLV packet, the transmission apparatus may place TLV #i, and in the case where at least one of (1) and (2) is not satisfied, the transmission apparatus may not place the packet TLV #i but place a NULL packet.

Note that, as shown in FIG. 47, by judging in advance whether it is the end of a frame, the amount of processing performed by the transmission apparatus can be reduced because the occurrence frequency of the processing in Step S305 and the subsequent processing can be lowered.

Moreover, as is apparent from FIG. 46 and so on, the TLV packet that has not been placed into a target frame is placed into the next frame in the frame boundary. Specifically, this TLV packet is placed immediately after the TLV packet that contains the reference clock information of the next frame.

The following describes a variation of the present exemplary embodiment.

The transmission apparatus may perform padding instead of placing a final TLV packet to coincide with a frame boundary. Here, in the case where a TLV packet that contains reference clock information is stored in a head of the first slot of each relative stream of a transfer frame, it is obvious that the TLV packet is not placed across the frames. Therefore, it is defined that padding is performed onto an area from the last pointer value (the value obtained by adding 1 to the final byte of a final TLV packet) up to a frame boundary. In this case, the reception apparatus can determine, by the last pointer value, the number of bytes required for padding.

Figure 49:
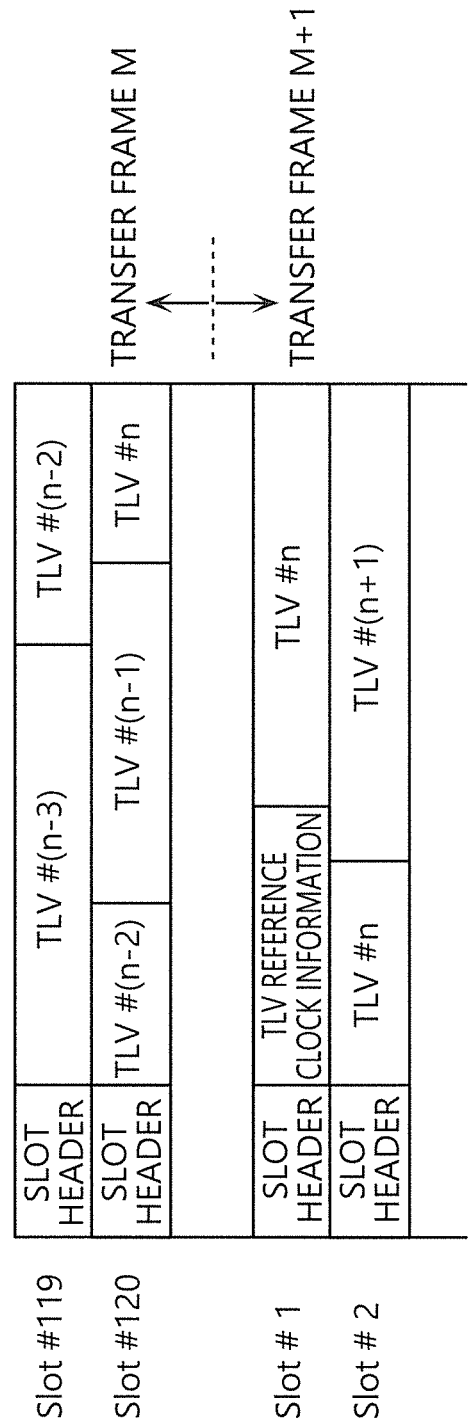
FIG. 49 is a diagram showing a structure of the transfer frame according to the fifth exemplary embodiment.

Moreover, as shown in FIG. 49, the transmission apparatus may place, into a transfer slot, a TLV packet that does not contain reference clock information beyond (across) reference clock information while placing the TLV packet that always contains reference clock information into a head of the first slot of each relative stream.

In FIG. 49, TLV #n is placed across the frames. In addition, TLV #n is placed across the TLV packet that contains reference clock information. In this case, the location and the size of the TLV packet that contains reference clock information are already known. Therefore, the top pointer value may indicate the byte obtained by adding 1 to the final byte of the TLV packet that contains reference clock information or may indicate the first byte of a TLV packet other than the TLV packet that contains reference clock information, instead of the first byte (=0) of the TLV packet that contains reference clock information.

Moreover, up to 16 relative streams are stored in a transfer frame and a TLV packet that contains reference clock information is placed in each of the relative streams. In the case where a reference clock that is common to plural relative streams is provided, the same information is always stored in a head of each relative stream of the frame.

Therefore, in the case of judging that the reference clock is provided, a demodulator of the reception apparatus judges that the respective reference clocks indicate the same bit (value), and performs the processing of averaging the bits. This can improve the ability to correct errors.

Moreover, in the case where the data that is the same as the reference clock information stored in the TLV packet is stored in the area for the TMCC control information, the reception apparatus judges that the reference clock information of the TMCC control information and the reference clock information of the TLV packet indicate the same bit, and performs the same processing as described above. This can improve the ability to correct errors.

Furthermore, because the reception quality of the TMCC control information is high, the reception apparatus may replace the reference clock information of the TLV packet with the reference clock information of the TMCC control information.

In such case, in order to improve the error correction ability, the reference clock information of the TMCC control information and the reference clock information of the TLV packet that contains reference clock information need to indicate the same bit. Therefore, scrambling or power spread may not be performed onto the TLV packet that contains reference clock information. Scrambling sequence may be identically set for each relative stream and the TLV packet that contains reference clock information may be scrambled with the same scrambling sequence.

Sixth Exemplary Embodiment

The present exemplary embodiment describes the methods for shortening the processing delay in channel selection.

In the first method, the reception apparatus starts filtering IP data flows without using full headers. In order to enable the reception apparatus to start such a filtering, CIDs respectively corresponding to each of the IP data flows are previously set. Alternatively, the information for the reception apparatus to specify CID(s) is transmitted.

At the same time when a desired service is specified through the channel selection operation by a viewer, the reception apparatus receives an AMT, and determines the IP data flow of the desired service and the CID corresponding to the IP data flow, based on the information in the AMT. When having determined the CID, the reception apparatus can perform the filtering of the IP data flows, and thus the processing delay in channel selection can be shortened. In addition, the amount of reception processing can be reduced.

In the second method, in the case where a TLV stream includes one IP data flow transferring MMT packets (also referred to as MMTP packets) and a total of two IP data flows including this IP data flow and an IP data flow transferring NTP packets are included in the TLV stream, it is defined that header compression is always performed on the IP data flow transferring MMT packets and is always not performed on the IP data flow transferring NTP packets.

The reception apparatus performs, using a data type in a TLV packet, the filtering of the IP data flows based on whether or not the header of an IP packet has been compressed. Thus, the filtering of the IP data flows becomes unnecessary, and the processing delay in channel selection can be shortened. In addition, the amount of reception processing can be reduced.

First, the details of the IP packets and IP header compression (HCfB: Header Compression for Broadcasting) defined in the ARIB STD-B32 will be described with reference to FIG. 50.

As has been described with reference to FIG. 2, a TLV packet can store an IPV4 packet, an IPV6 packet, a compressed IP packet, and so on. Moreover, the type of the IP packet stored in the TLV packet is identified using the data type included in the header of the TLV packet. The compressed IP packet has a header structure which differs according to a context identification header type (hereinafter referred to as CID type).

CID type=0x20 indicates that a header of the compressed IP packet is a partial IPv4 header and has a context identifier (hereinafter referred to as CID), a header excluding a part of the fields in the IPV4 packet header, and so on. The partial IPv4 header includes IP data flow specification information. The IP data flow specification information indicates a destination IP address, a source IP address, a destination port number, a source port number, and a protocol type, and in the case of IPV6 header, a next header is indicated instead of the protocol type. Note that, in FIG. 50, the header information indicated by the hatching in dots includes the IP data flow specification information. The CID is an identifier for identifying the same IP data flows, and the same CID is allocated for the compressed IP packets having the same IP data flow specification information.

CID type=0x21 indicates that the header includes a CID and identification field in the IPV4 header, but does not include the IP data flow specification information.

CID type=0x60 indicates that the header has a CID and a header excluding a part of the fields in the IPV6 header, and also includes the IP data flow specification information.

CID type=0x61 indicates that the header includes only a CID and does not include an IP header. This CID type is normally used for the IPV6 packets only, but may also be used for the IPV4 packets. Hereinafter, the description will be provided under the assumption that this CID type is used only for the IPV6 packets.

Note that a 4-bit sequence number and a CID type are indicated in all of the CID-typed headers of the compressed IP packets, although not shown in the diagram. Moreover, a header that includes the IP data flow specification information (CID type=0x20 or 0x60) is referred to as full header whereas a header that does not include the IP data flow specification information (CID type=0x21 or 0x61) is referred to as compressed header.

Figure 51:
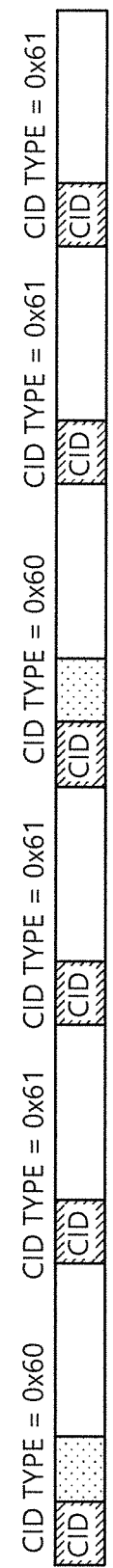
FIG. 51 is a diagram for illustrating the header compression according to the sixth exemplary embodiment.

Although a part of the fields in some of the IP packets is excluded from a full header, the reception apparatus can reconfigure the IP header (IP header extension) of the same packets for completion based on the information in the TLV header, and the like. On the contrary, a compressed header does not include the IP data flow specification information, and thus with a single packet, the IP header extension cannot be realized. The reception apparatus obtains necessary information based on the header information of the full header having the same CID as that of the compressed header, for example. FIG. 51 is a diagram showing a method of multiplexing compressed packets. This is an example of compressing the headers of the IPV6 packets of the same IP data flow, and in the TLV packet header that is not shown in the diagram, the data type indicating that the TLV packet is a compressed IP packet is indicated. In the case of compressing the headers of the IPV6 packets, either of CID type=0x60 or CID type=0x61 is used. As these packets belong to the same IP data flow, the same value is indicated in the respective CIDs. Note that the following description provides an example of the IPV6 packets; however, the same applies to the case of the IPV4 packets.

In the example shown in FIG. 51, a full header is transmitted once every three packets and a compressed header is transmitted for the remaining two packets. Thus, by regularly inserting a full header and compressing the remaining headers, overhead of headers can be reduced.

After having received a full header, the reception apparatus extends the full header based on the information in the TLV header, and the like. In addition, since a compressed header needs to be extended together with a full header, the reception apparatus extends the compressed header after the reception of the full header having the same CID as that of the compressed header. Moreover, after the header extension, the reception apparatus performs the filtering of the IP packets or UDP packets based on the IP data flow specification information.

Note that the header extension is not necessarily required and an implementation method without the header extension has also been considered. In such case, with the filtering using the CIDs, the operation equivalent to the filtering of the IP packets or UDP packets can be performed. In this case, the reception apparatus separately creates a correspondence table in which the IP data flow specification information and a CID are associated with each other, and filters the packets each having the CID corresponding to a desired IP data flow.

However, such a method requires some solutions for the following problems. In a TLV stream, plural IP data flows are included, and an IP data flow transferring NTP packets and an IP data flow transferring MMT packets are included at least. The number of the IP data flows transferring MMT packets may be one or plural depending on the case. Furthermore, an IP data flow exclusively used for transferring MMT-SI that is control information may be included in the TLV stream, in some cases.

When extracting a desired IP data flow from a TLV stream, the reception apparatus performs filtering of IP data flows or filtering of IP packets or UDP packets. In addition, when filtering the IP data flows, the reception apparatus needs to specify the IP data flow of a desired service and identify the packets that belong to the desired IP data flow.

However, the reception apparatus can identify the packets that belong to the desired IP data flow only after the reception of a full header. This might delay the processing until the reception apparatus firstly receives a full header, and thus the processing delay in channel selection gets longer. Furthermore, in the case where the transmission intervals of the full headers are long, the processing delay in channel selection gets even longer. For example, when the transmission intervals of the full headers are N seconds, the processing delay in channel selection gets longer by N seconds at the most.

The following describes the first method for shortening the processing delay in channel selection. The reception apparatus starts filtering IP data flows without using full headers. In order to enable the reception apparatus to start such a filtering, CIDs corresponding to each of the IP data flows are previously set.

For example, fixed values are previously set for the CIDs according to the type of the IP data flow, as follows: the IP data flow of the NTP is set as CID=0; the IP data flow of service 1 is set as CID=1; the IP data flow of service 2 is set as CID=2; the IP data flow of service 3 is set as CID=3; and the IP data flow exclusively used for SI is set as CID=20, etc.

In the case where plural services are included in a TLV stream, regularity is defined so that the correspondence between a service ID and a CID can be uniquely determined. For example, by setting the low N bits of a service ID to the same value as the value indicated by a CID, the service ID can be associated with the CID.

This enables the reception apparatus to determine the CID of a desired IP data flow at the same time when the desired IP data flow is specified through the channel selection operation by the viewer. Thus, the IP data flow specification information becomes unnecessary and the reception apparatus can start the filtering of the IP data flows without waiting for the reception of a full header. Accordingly, the processing delay in channel selection can be shortened.

Note that the following method may be used as an alternative method. Instead of previously determining the CIDs corresponding to each of the IP data flows, the information indicating the correspondence between an IP data flow and a CID may be multiplexed onto a broadcast signal and then transferred, for instance. It is desirable, for example, to include this information into the control information that can be processed before the start of the filtering of the IP data flows. This information is stored, for example, into an address map table (AMT) which is transfer control information stored in a TLV packet. As an alternative example, the control information as such that can be processed before the start of the filtering of the IP data flows may be stored into a PLT or an MPT which is MMT-SI, or the like.

The AMT is a table for storing a destination IP address and a source IP address for each service. The AMT does not include a destination port number, a source port number, a protocol type, etc., therefore, the reception apparatus cannot specify an IP data flow that corresponds to each service, using the AMT. Nevertheless, by setting the port numbers and the protocol type to known values, it is possible to make use of the AMT as the information for specifying an IP data flow. Alternatively, private_data_byte area included in the AMT may be extended so that the port numbers and the protocol type can be specified.

In the case of using the AMT as a table for specifying the IP data flow with respect to a service, with the method as described above, the information indicating a CID corresponding to an IP data flow is further included into a signal. For example, the CID corresponding to the IP data flow is indicated in private_data_byte included in the AMT.

At the same time when a desired service is specified through the channel selection operation by the viewer, the reception apparatus receives an AMT, and specifies the IP data flow and the CID which correspond to the desired service, based on the information in the AMT. When having specified the CID, the reception apparatus can perform the filtering of the IP data flows, and thus the processing delay in channel selection can be shortened. Moreover, the amount of reception processing can be reduced.

Note that in the case of using the above-described method, full headers may not necessarily be transmitted and only compressed IP packets may be transferred. In this case, further effect of header compression can be gained.

Note that the AMT is a table indicating information per service, therefore, such AMT can indicate neither the information on the IP data flow exclusively used for SI (MMT-SI) nor the information on the IP data flow transferring NTP packets. Therefore, the CID of the IP data flow exclusively used for SI or the CID of the IP data flow transferring NTP packets may be set to a fixed value that is previously defined, and the CID corresponding to each service may be indicated in the AMT. Alternatively, the AMT may be extended so that the CIDs other than those associated with the respective services can be specified.

Note that in the case where the number of services included in a TLV stream is not plural, the IP data flow specification information and the CIDs may not necessarily be indicated in the AMT.

Furthermore, the reception apparatus may perform the channel selection operation without using full headers only in the case where the IP data flow specification information and the CIDs are described in the AMT.

Next, the second method of shortening the processing delay in channel selection will be described.

In the second method, the number of IP data flows transferring MMT packets in a TLV stream is limited to one. The case where the IP data flow transferring NTP packets and the IP data flow transferring MMT packets are stored one for each and the IP data flow exclusively used for SI is not stored in the TLV stream will be described below.

In this case, the processing delay in channel selection can be shortened even with the use of the first method; however, with the method indicated below, the reception apparatus can start IP filtering earlier although the information for specifying IP data flow and CID is not transmitted.

In the case where the number of the IP data flows transferring MMT packets in a TLV stream is one, a total of two IP data flows including this IP data flow and an IP data flow transferring NTP packets are included in the TLV stream. Here, it shall be defined that header compression is always performed on the IP data flow transferring MMT packets and is always not performed on the IP data flow transferring NTP packets.

It is possible to restrain jitter fluctuation by not performing the header compression on the IP data flow transferring NTP packets. Moreover, by always performing the header compression on the IP data flow transferring MMT packets, the effect of reducing the overhead can be enhanced.

The reception apparatus determines whether or not the header of an IP packet has been compressed, using the data type in the TLV packet, and performs the filtering of the IP data flows based on the determination result.

More specifically, in the case where the header of the IP packet has been compressed (data type=header compressed packet), the reception apparatus determines that the IP packet belongs to the IP data flow transferring MMT packets. In the case where the header of the IP packet has not been compressed (data type=IPV4 packet or IPV6 packet), the reception apparatus determines that the IP packet belongs to the IP data flow transferring NTP packets.

With the processing as described above, the IP header extension, the filtering using the IP addresses or UDP addresses, the filtering using the CIDs, and the like are unnecessary, and thus the reception apparatus can reduce the delay that occurs until the reception of a full header. Moreover, without the use of the AMT, the delay until the reception of the AMT can be shortened. Furthermore, the amount of reception processing can also be reduced.

Note that in the case of using the above-described method, full headers may not necessarily be transmitted and only compressed IP packets may be transferred. In this case, further effect of header compression can be gained.

Moreover, the reception apparatus can separately obtain a full header and analyze the IP data flow specification information.

The following describes other variations.

(1) Even in the case where plural services are included and an IP data flow exclusively used for SI is stored in a TLV stream, it may be defined that header compression is always performed on the IP data flow transferring MMT packets and is always not performed on the IP data flow transferring NTP packets. Even in this case, the reception apparatus can determine that the TLV packet that is not subjected to the header compression is an NTP packet. Thus, the filtering of the IP data flow that includes NTP packets becomes unnecessary, which enables the reduction in the amount of reception processing and also the shortening of the time to start the processing such as a clock reproduction using the NTP packets, and so on.

(2) In the case where the reception apparatus has a memory with a sufficient capacity, it is possible to shorten the processing delay in channel selection without using the first and second methods for shortening the processing delay in channel selection.

The reception apparatus starts filtering IP data flows based on the CIDs in the state where it is before the reception of a full header and a desired IP data flow cannot be specified, for instance. Here, the reception apparatus accumulates all the data that has been filtered. After that, the reception apparatus receives a fill header, specifies a desired IP data flow, and specifies the CID corresponding to the desired IP data flow. Then, after that, the reception apparatus discards the data other than the data that has the specified CID from among the accumulated data, and performs high-speed processing of the data having the specified CID. Thus, it is possible to shorten the processing delay in channel selection.

(3) It may be defined that only the IP data exclusively used for SI out of the IP data flow transferring MMT packets is not subjected to header compression.

In the case where the data type in a TLV packet header indicates a header compressed packet, the reception apparatus determines that the IP packet belongs to the IP data flow transferring MMT packets, excluding the IP data flow exclusively used for SI. In the case where the data type in the TLV packet header indicates an IPV4 packet or an IPV6 packet (in the case where the header of an IP packet is not compressed), the reception apparatus determines that the IP packet belongs to the IP data flow transferring NTP packets or the IP data flow exclusively used for SI.

Moreover, in the case where the IP data flow specification information is previously determined for the IP data flow transferring NTP packets and for the IP data flow transferring MMT packets that is exclusively used for SI, the reception apparatus can determine, at the same time when the TLV packet header is filtered and also based on the IP data flow specification information, whether the IP data flow is the one transferring NTP packets or the one exclusively used for SI.

In the description so far, the case where the reception apparatus sequentially receives the TLV packets of a TLV stream has been described as an example.

The case where the TLV packets of the TLV stream are sequentially received is, for example, the case where the reception apparatus sequentially inputs, as TLV packets and for the TLV packet processing, the TLV packets obtained in a transfer layer.

In the transfer layer, one or more TLV streams and plural TLV packets are stored in one transfer frame. The reception apparatus receives the plural TLV packets at a burst in the transfer layer processing. After having received the TLV packets per TLV stream in the transfer layer, the reception apparatus performs IP header compression and extension of a desired TLV stream.

In the case where the full IP packets that have not been compressed and have been obtained through the above-described processing are sequentially input for the IP packet processing, when the IP data flow in the TLV stream included in the transfer frame includes at least one or more TLV packets each having a full header, the reception apparatus can perform header extension onto all the IP data flows in one transfer frame.

In order to realize the abovementioned processing, it is defined that at least one or more full headers shall be transferred with respect to the IP data flow in the TLV stream included in the transfer frame. This enables the reception apparatus to perform header extension at one time in the transfer layer. Therefore, the reception apparatus does not need to await the header extension or the reception of a full header in the subsequent processing, and thus the processing delay in channel selection can be shortened.

Moreover, by previously determining the location of the TLV packet that includes a full header in the TLV stream of the transfer frame, the reception apparatus can easily obtain the full header. For example, it is defined that the TLV packet positioned at the head in the TLV stream included in the transfer frame always has a full header. Note that it may be defined that in the case where a head TLV packet in the TLV stream is always an NTP packet, the second TLV packet always has a full header. Alternatively, other rules may be defined.

Figure 52:
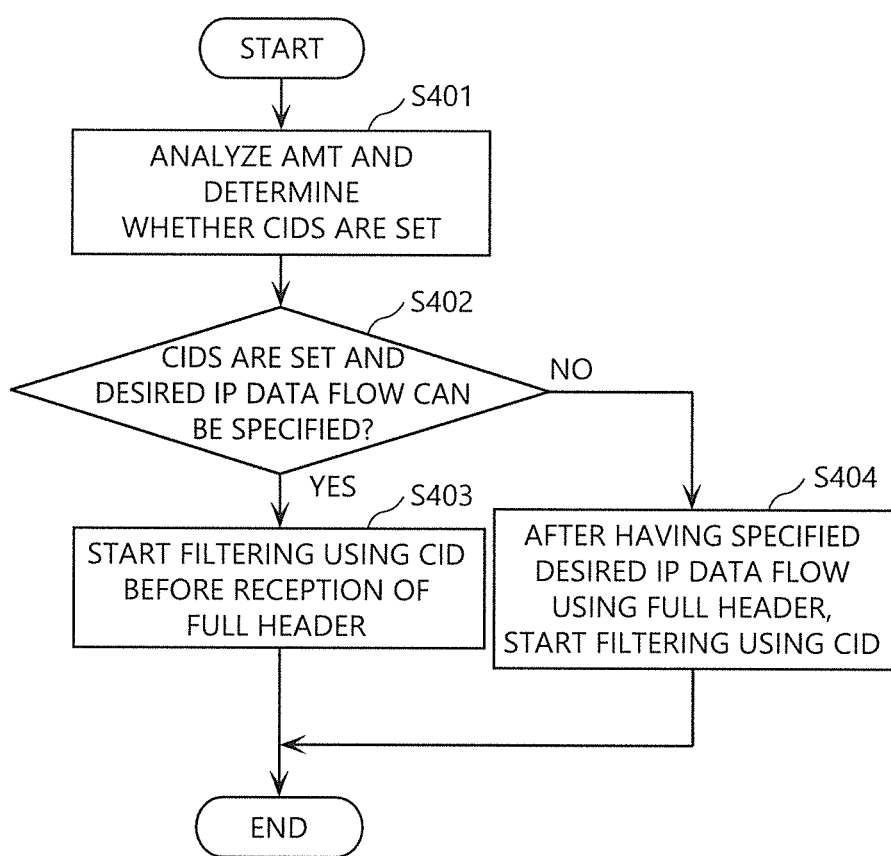
FIG. 52 is a diagram showing an operation flow of the reception apparatus according to the sixth exemplary embodiment.

The following describes a flow of the processing performed by the reception apparatus. FIG. 52 is a flowchart showing the reception processing performed by the reception apparatus using the above-described first method (CIDs are previously set).

First, the reception apparatus analyzes an AMT and determines whether or not the CIDs are previously set (S401). In the case where the CIDs are previously set and a desired IP data flow can be specified (Yes in S402), the reception apparatus obtains the CID of the desired IP data flow using the AMT and starts the filtering of the IP data flows before the reception of a full header (S403).

On the contrary, in the case where the CIDs are not previously set (No in S402), the reception apparatus specifies the desired IP data flow after having received a full header and starts the filtering of the IP data flow (S404).

Figure 53:
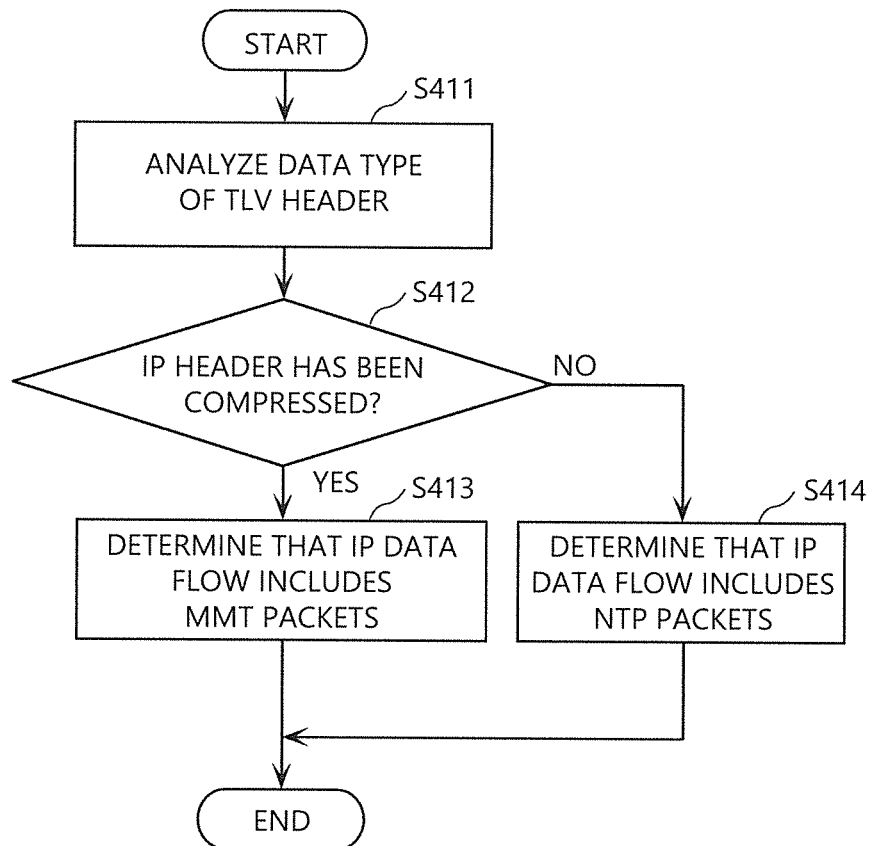
FIG. 53 is a diagram showing an operation flow of the reception apparatus according to the sixth exemplary embodiment.

FIG. 53 is a flowchart showing the reception processing performed by the reception apparatus using the above-described second method (header compression is always performed on the IP data flow transferring MMT packets and is always not performed on the IP data flow transferring NTP packets).

First, the reception apparatus analyzes the data type in a TLV packet and determines whether or not the header of the IP packet stored in the TLV packet has been compressed (S411). In the case where the header of the IP packet has been compressed (Yes in S412), the reception apparatus determines that the IP packet belongs to the IP data flow transferring MMT packets (S413). On the contrary, in the case where the header of the IP packet has not been compressed (No in S412), the reception apparatus determines that the IP packet belongs to the IP data flow transferring NTP packets (S414).

Note that, in the processing of a TLV stream, the analysis on the IP data flows using compressed IP headers or IP packet headers is unnecessary.

Figure 54:
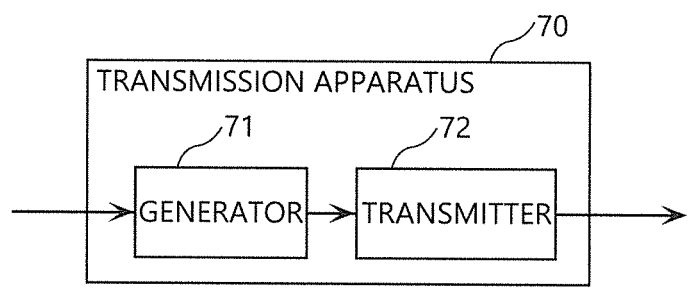
FIG. 54 is a block diagram showing the transmission apparatus according to the sixth exemplary embodiment.

As has been described above, the transmission apparatus according to the present exemplary embodiment transmits content through broadcasting. FIG. 54 is a block diagram showing transmission apparatus 70 according to the present exemplary embodiment. Transmission apparatus 70 includes generator 71 and transmitter 72.

Figure 55:
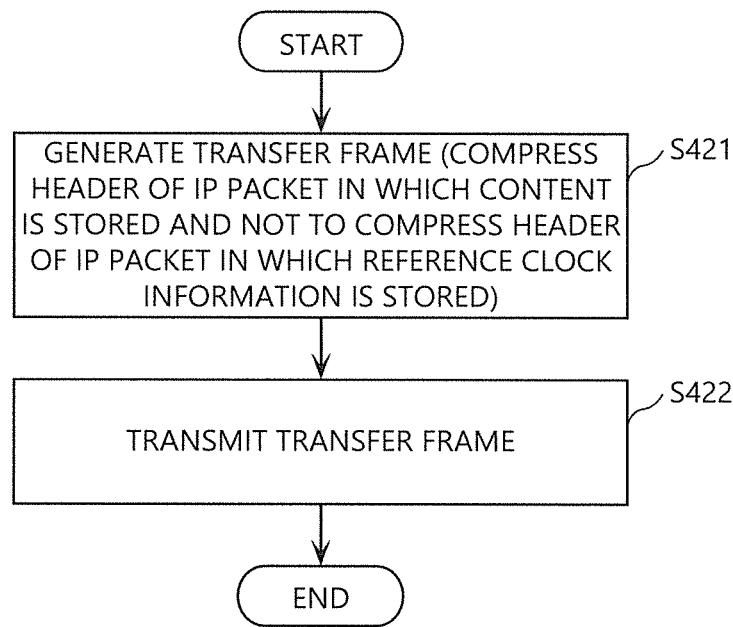
FIG. 55 is a diagram showing an operation flow of the transmission apparatus according to the sixth exemplary embodiment.

FIG. 55 is a flowchart showing the transmission method employed by transmission apparatus 70 according to the present exemplary embodiment.

First, generator 71 generates a frame for transfer (transfer frame) which stores the first IP packets in which content (e.g., MMT packets) is stored and the second IP packets each including reference clock information (e.g., NTP) indicating a time for the playback of the content (S421). More specifically, generator 71 performs header compression on the first IP packets and does not perform it on the second IP packets.

Figure 50:
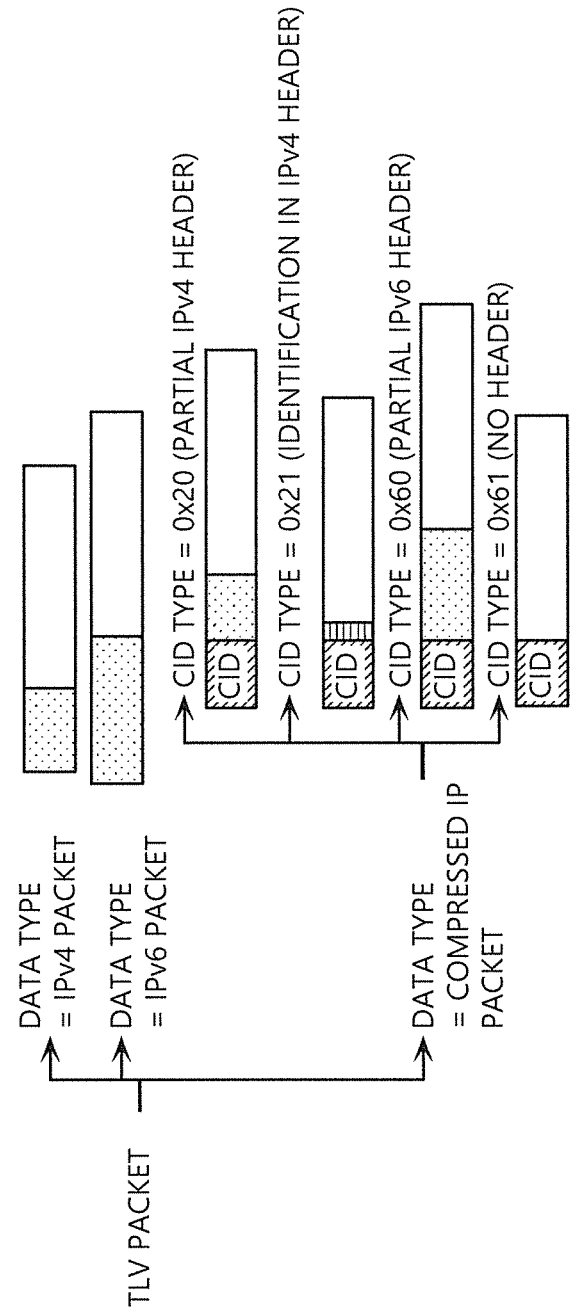
FIG. 50 is diagram for illustrating header compression according to a sixth exemplary embodiment.

To be more specific, as shown in FIGS. 50 and 51, generator 71 attaches, as the header compression processing, the following: a full header which includes the specification information for specifying the IP data flow to which one or more first IP packets belong, to a part of the one or more first IP packets; and a compressed header which does not include the specification information to the first IP packet other than the part of the one or more first IP packets.

Next, transmitter 72 transmits the frame generated by generator 71 (S422).

Figure 56:
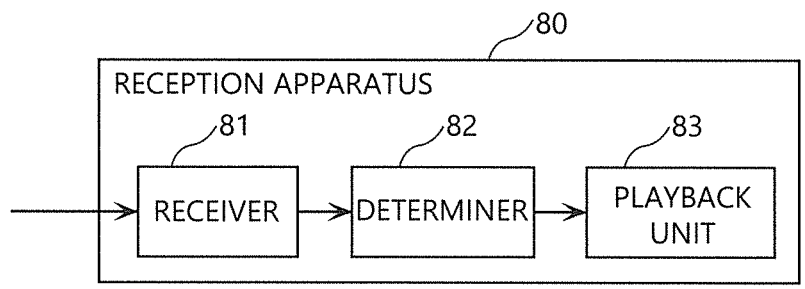
FIG. 56 is a block diagram showing the reception apparatus according to the sixth exemplary embodiment.

As has been described above, the reception apparatus according to the present exemplary embodiment receives the content through broadcasting. FIG. 56 is a block diagram showing reception apparatus 80 according to the present exemplary embodiment. Reception apparatus 80 includes receiver 81, determiner 82, and playback unit 83.

Figure 57:
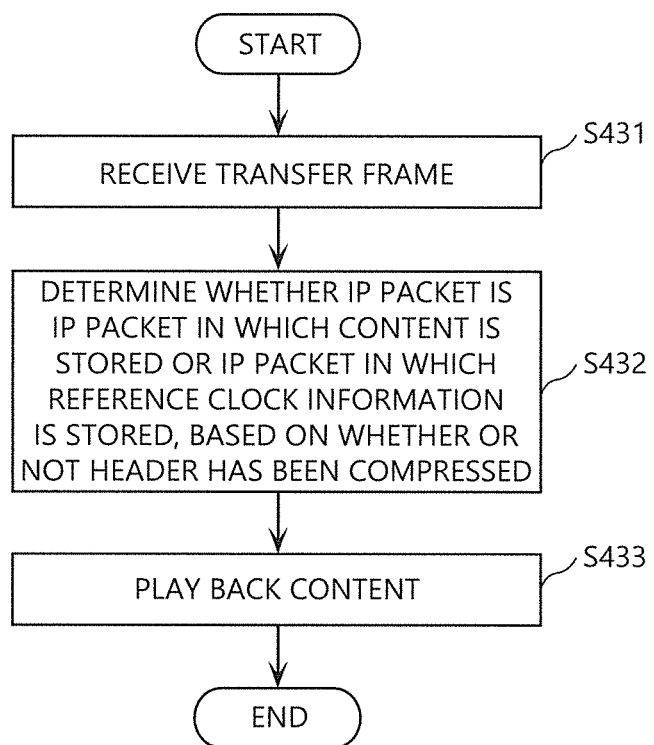
FIG. 57 is a diagram showing an operation flow of the reception apparatus according to the sixth exemplary embodiment.

FIG. 57 is a flowchart showing the reception method employed by reception apparatus 80 according to the present exemplary embodiment. First, receiver 81 receives a frame for transfer (transfer frame) which stores: the first IP packets storing content (e.g., MMT packets), whose headers have been compressed; and the second IP packets, each of which includes the reference clock information (e.g., NTP) indicating a time for the playback of the content and whose headers have not been compressed (S431).

Next, determiner 82 determines whether the IP packet is the first IP packet or the second IP packet based on whether or not the header of the IP packet has been compressed (S432). To be more specific, a full header which includes the specification information for specifying the IP data flow to which one or more first IP packets belong is attached to a part of the one or more first IP packets; and a compressed header which does not include the specification information is attached to the first IP packet other than the part of the one or more first IP packets, as the header compression processing, as shown in FIGS. 50 and 51. Moreover, determiner 82 determines the IP packet whose header has been compressed to be the first IP packet and determines the IP packet whose header has not been compressed to be the second IP packet.

Next, playback unit 83 plays back the content stored in the first IP packets using the reference clock information stored in the respective second IP packets, based on the determination result.

As shown in FIG. 50, whether or not the IP header has been compressed is indicated in the information (data type) included in the header of the TLV packet.

In other words, in Step S421, generator 71 stores the information indicating that the header of the first IP packet has been compressed, into the header of the TLV packet in which the first IP packet is stored, and stores the information indicating that the header of the second IP packet has not been compressed, into the header of the TLV packet in which the second IP packet is stored.

In Step S432, determiner 82 determines whether the IP packet stored in the TLV packet is the first IP packet or the second IP packet based on the information stored in the header of the TLV packet.

With the processing as described above, the reception apparatus can filter the IP data flows based on whether or not the header compression has been performed. Thus, it is possible to shorten the processing delay in channel selection.

The following is included as various exemplary embodiments according to the present disclosure.

The transmission method according to the first disclosure includes: generating a frame for transfer in which one or more first internet protocol (IP) packets and one or more second IP packets are stored, the one or more first IP packets storing content, and each of the one or more second IP packets including reference clock information which indicates a time for playing back the content; and transmitting the generated frame through broadcasting. In the generating, header compression is performed on the one or more first IP packets and the header compression is not performed on the one or more second IP packets.

The transmission method according to the second disclosure is the transmission method according to the first disclosure, and the header compression includes: (i) attaching, to a part of the one or more first IP packets, a full header which includes specification information for specifying an IP data flow to which the one or more first IP packets belong; and (ii) attaching, to a first IP packet other than the part of the one or more first IP packets, a compressed header which does not include the specification information.

The transmission method according to the third disclosure is the transmission method according to the first disclosure, and the reference clock information complies with a network time protocol (NTP).

The transmission method according to the fourth disclosure is the transmission method according to the first disclosure, and the content is stored in an MPEG media transport (MMT) packet in each of the one or more first IP packets.

The transmission method according to the fifth disclosure is the transmission method according to the first disclosure, and the frame includes one or more second transfer units, each having a fixed length, each of the one or more second transfer units includes one or more first transfer units, and each of the one or more first transfer units includes one of: the one or more first IP packets; and the one or more second IP packets.

The transmission method according to the sixth disclosure is the transmission method according to the fifth disclosure, and each of the one or more first transfer units is a type length value (TLV) packet, each of the one or more second transfer units is a slot defined under a transmission system for advanced wide band satellite digital broadcasting, and the frame is a transfer slot defined under the transmission system for advanced wide band satellite digital broadcasting.

The reception method according to the seventh disclosure includes: receiving, through broadcasting, a frame for transfer in which one or more internet protocol (IP) packets are stored, the one or more IP packets storing content and including: one or more first IP packets whose headers have been compressed; and one or more second IP packets whose headers have not been compressed, each of the one or more second IP packets including reference clock information which indicates a time for playing back the content; determining whether each of the one or more IP packets that are received is the first IP packet or the second IP packet based on whether or not a header of the IP packet has been compressed; and playing back the content stored in the one or more first IP packets, using the reference clock information stored in the each of the one or more second IP packets, based on a result of the determination.

The reception method according to the eighth disclosure is the reception method according to the seventh disclosure, and the header compression includes: (i) attaching, to a part of the one or more first IP packets, a full header which includes specification information for specifying an IP data flow to which the one or more first IP packets belong; and (ii) attaching, to a first IP packet other than the part of the one or more first IP packets, a compressed header which does not include the specification information.

The reception method according to the ninth disclosure is the reception method according to the seventh disclosure, and the reference clock information complies with a network time protocol (NTP).

The reception method according to the tenth disclosure is the transmission method according to the seventh disclosure, and the content is stored in an MPEG media transport (MMT) packet in each of the one or more first IP packets.

The reception method according to the eleventh disclosure is the reception method according to the seventh disclosure, and the frame includes one or more second transfer units, each having a fixed length, each of the one or more second transfer units includes one or more first transfer units, and each of the one or more first transfer units includes one of: the one or more first IP packets; and the one or more second IP packets.

The reception method according to the twelfth disclosure is the transmission method according to the eleventh disclosure, and each of the one or more first transfer units is a type length value (TLV) packet, each of the one or more second transfer units is a slot defined under a transmission system for advanced wide band satellite digital broadcasting, and the frame is a transfer slot defined under the transmission system for advanced wide band satellite digital broadcasting.

The transmission apparatus according to the thirteenth disclosure includes: a generator which generates a frame for transfer in which one or more first internet protocol (IP) packets and one or more second IP packets are stored, the one or more first IP packets storing content, and each of the one or more second IP packets including reference clock information which indicates a time for playing back the content; and a transmitter which transmits the generated frame through broadcasting. The generator performs header compression on the one or more first IP packets and does not perform the header compression on the one or more second IP packets.

The reception apparatus according to the fourteenth disclosure includes: a receiver which receives, through broadcasting, a frame for transfer in which one or more internet protocol (IP) packets are stored, the one or more IP packets storing content and including: one or more first IP packets whose headers have been compressed; and one or more second IP packets whose headers have not been compressed, each of the one or more second IP packets including reference clock information which indicates a time for playing back the content; a determiner which determines whether each of the one or more IP packets that are received is the first IP packet or the second IP packet based on whether or not a header of the IP packet has been compressed; and a playback unit which plays back the content stored in the one or more first IP packets, using the reference clock information stored in the each of the one or more second IP packets, based on a result of the determination.

Note that in the aforementioned exemplary embodiments, components may each include dedicated hardware or may be implemented through execution of a software program suitable for each component. The components may be each implemented by a program execution unit, such as a CPU and a processor, reading and executing the software program recorded in a recording medium such as a hard disk and a semiconductor memory.

In addition, the components may be circuits. These circuits may constitute one circuit as a whole, or may be different circuits. In addition, each of these circuits may be a general-purpose circuit, or may be a dedicated circuit.

For example, in each of the aforementioned exemplary embodiments, processes executed by a specific processor may be executed by another processor. In addition, order of the plurality of processes may be changed, and the plurality of processes may be executed in parallel.

Moreover, each of the functional blocks used for the descriptions of each of the above-described exemplary embodiments are typically realized as an LSI which is an integrated circuit having an input terminal and an output terminal. These functional blocks may be individually integrated into one chip or may be integrated into one chip so as to include a part or all of the functional blocks. Although LSI is mentioned here, it may also be referred to as IC, system LSI, super LSI, or ultra LSI depending on the difference in the degree of integration.

Moreover, the ways to achieve integration are not limited to the LSI, and the integration may be realized using a dedicated communication circuit or a general-purpose processor. A field programmable gate array (FPGA) which is programmable after the manufacturing of LSIs or a reconfigurable processor which can reconfigure the connection or configuration of the circuit cells in an LSI may be used for the integration.

Furthermore, with the advancement in semiconductor technology or a different technology deriving from the semiconductor technology, a brand-new technology may replace the LSIs. In that case, the functional blocks may be naturally integrated using such a technology. One possibility is an application of biotechnology.

The reception apparatus (reception method) and transmission apparatus (transmission method) according to one or more aspects have been described above based on the exemplary embodiments. However, the present disclosure is not limited to these exemplary embodiments. The present exemplary embodiments to which various modifications conceivable by a person skilled in the art are made and aspects that are made by combining elements of different exemplary embodiments may also be within the scope of the one or more aspects as long as such aspects do not depart from the gist of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The transmission method and the reception method according to the present disclosure are applicable to the broadcasting system in which an MMT scheme is used.

What is claimed is:

1. A transmission method comprising:
coding video content;
configuring one or more transfer units that each include the coded video content; and
transmitting the one or more transfer units as a transmission signal, the transmission signal including first control information, second control information, and the one or more transfer units, wherein the first control information includes information used for the second control information, and the second control information is provided for each of the one or more transfer units,
wherein in at least one transfer unit among the one or more transfer units, the second control information of the transfer unit contains clock information used for reproduction of the video content,
wherein the information indicating that the clock information is contained within a header of the transfer unit is stored in the first control information, and
wherein the clock information is transmitted cyclically,
wherein when the information indicates that the clock information is not contained within the header of the transfer unit, the second control information of the transfer unit does not contain the clock information and an amount of data corresponding to the clock information is compressed.

2. A reception method comprising:
receiving a transmission signal, the transmission signal including one or more transfer units that each include coded video content, first control information, and second control information;
decoding the coded video content; and
extracting clock information used for reproduction of the video content from at least one transfer unit among the one or more transfer units,
wherein the first control information includes information used for the second control information, the second control information being provided for each of the one or more transfer units,
wherein in the at least one transfer unit among the one or more transfer units, the second control information of the transfer unit contains the clock information used for reproduction of the video content,
wherein the information indicating that the clock information is contained within a header of the transfer unit is stored in the first control information, and
wherein the clock information is transmitted cyclically,
wherein when the information indicates that the clock information is not contained within the header of the transfer unit, the second control information of the transfer unit does not contain the clock information and an amount of data corresponding to the clock information is compressed.

3. A transmission apparatus comprising:
coding circuitry which, in operation, codes video content;
configuration circuitry which, in operation, configures one or more transfer units that each include the coded video content; and
transmission circuitry which, in operation, transmits the one or more transfer units as a transmission signal, the transmission signal including first control information, second control information, and the one or more transfer units,
wherein the first control information includes information used for the second control information, and the second control information is provided for each of the one or more transfer units,
wherein in at least one transfer unit among the one or more transfer units, the second control information of the transfer unit contains clock information used for reproduction of the video content,
wherein the information indicating that the clock information is contained within a header of the transfer unit is stored in the first control information, and
wherein the clock information is transmitted cyclically,
wherein when the information indicates that the clock information is not contained within the header of the transfer unit, the second control information of the transfer unit does not contain the clock information and an amount of data corresponding to the clock information is compressed.

4. A reception apparatus comprising:
reception circuitry which, in operation, receives a transmission signal, the transmission signal including one or more transfer units that each include coded video content, first control information, and second control information;
decoding circuitry which, in operation, decodes the coded video content; and
extraction circuitry which, in operation, extracts clock information used for reproduction of the video content from at least one transfer unit among the one or more transfer units,
wherein the first control information includes information used for the second control information, the second control information being provided for each of the one or more transfer units,
wherein in the at least one transfer unit among the one or more transfer units, the second control information of the transfer unit contains the clock information used for reproduction of the video content,
wherein the information indicating that the clock information is contained within a header of the transfer unit is stored in the first control information, and
wherein the clock information is transmitted cyclically,
wherein when the information indicates that the clock information is not contained within the header of the transfer unit, the second control information of the transfer unit does not contain the clock information and an amount of data corresponding to the clock information is compressed.

* * * * *